(12) United States Patent
Yamamoto et al.

(10) Patent No.: US 8,502,774 B2
(45) Date of Patent: Aug. 6, 2013

(54) INPUT APPARATUS, CONTROL APPARATUS, CONTROL SYSTEM, CONTROL METHOD, AND HANDHELD APPARATUS

(75) Inventors: Kazuyuki Yamamoto, Kanagawa (JP); Hidetoshi Kabasawa, Saitama (JP); Kenji Hachisu, Tokyo (JP); Hideaki Kumagai, Kanagawa (JP); Katsuhiko Yamada, Tokyo (JP); Takashi Masuda, Tokyo (JP); Kunihito Sawai, Kanagawa (JP)

(73) Assignee: Sony Corporation, Tokyo (JP)

( * ) Notice: Subject to any disclaimer, the term of this patent is extended or adjusted under 35 U.S.C. 154(b) by 356 days.

(21) Appl. No.: 12/671,543

(22) PCT Filed: Aug. 8, 2008

(86) PCT No.: PCT/JP2008/064298
§ 371 (c)(1),
(2), (4) Date: Feb. 1, 2010

(87) PCT Pub. No.: WO2009/020204
PCT Pub. Date: Feb. 12, 2009

(65) Prior Publication Data
US 2011/0032185 A1    Feb. 10, 2011

(30) Foreign Application Priority Data

Aug. 8, 2007  (JP) .................................. 2007-206489
May 2, 2008  (JP) .................................. 2008-120773

(51) Int. Cl.
*G06F 3/033*    (2006.01)
(52) U.S. Cl.
USPC ............................ 345/157; 345/161; 345/163

(58) Field of Classification Search
USPC .......................................... 345/157, 163, 161
See application file for complete search history.

(56) References Cited

U.S. PATENT DOCUMENTS

| 5,554,980 | A | * | 9/1996 | Hashimoto et al. | ........... 345/158 |
| 2006/0028446 | A1 | * | 2/2006 | Liberty et al. | ................ 345/158 |
| 2007/0097077 | A1 | * | 5/2007 | Ishikawa et al. | .............. 345/163 |

FOREIGN PATENT DOCUMENTS

| JP | 2001005606 A | * | 1/2001 |
| JP | 2001-056743 | | 2/2001 |
| JP | 3264291 | | 12/2001 |
| JP | 2007-122475 | | 5/2007 |

OTHER PUBLICATIONS

International Search Report (PCT/JP2008/064298) Dated Oct. 28, 2008.

* cited by examiner

*Primary Examiner* — Latanya Bibbins
(74) *Attorney, Agent, or Firm* — K&L Gates LLP

(57) ABSTRACT

To provide an input apparatus, a control apparatus, a control system, and a control method that are capable of restricting a movement of a pointer on a screen by a user operation even while the input apparatus is moving. In a state where a movement button is not pressed by a user, an MPU of an input apparatus is not outputting a movement command or is outputting a movement command with a displacement amount set to 0. In other words, even when the user holds the input apparatus and moves it, a pointer does not move on a screen. As a result, a movement of the pointer unintended by the user can be restricted. When the movement button is pressed, that is, when a first operation signal is input via a first switch, the MPU starts outputting the movement command. By receiving the movement command, an MPU of a control apparatus controls display of the pointer so as to start the movement of the pointer that corresponds to the movement command.

10 Claims, 69 Drawing Sheets

(A)

(B)

(A)

(B)

(A)

(B)

Reference cycle T₀ (reference cycle T₀ = command output cycle T')

(A)

Case where t₁ has elapsed since cancel of input of light-receiving signal

First cycle T₁

(B)

Case where t₂ has elapsed since cancel of input of light-receiving signal

Second cycle T₂

(C)

(A)

Case where disturbance light is large (B)

(A)

(B)

INPUT APPARATUS, CONTROL APPARATUS, CONTROL SYSTEM, CONTROL METHOD, AND HANDHELD APPARATUS

TECHNICAL FIELD

The present invention relates to a 3-dimensional operation input apparatus for operating a GUI (Graphical User Interface), a control apparatus for controlling the GUI based on operational information, a control system including those apparatuses, a control method, and a handheld apparatus.

BACKGROUND ART

Pointing devices, particularly a mouse and a touchpad, are used as controllers for GUIs widely used in PCs (Personal Computers). Not just as HIs (Human Interfaces) of PCs as in related art, the GUIs are now starting to be used as an interface for AV equipment and game machines used in living rooms etc. with, for example, televisions as image media. Various pointing devices that a user is capable of operating 3-dimensionally are proposed as controllers for the GUIs of this type (see, for example, Patent Documents 1 and 2).

Patent Document 1 discloses an input apparatus including biaxial angular velocity gyroscopes, that is, two angular velocity sensors. Each angular velocity sensor is a vibration-type angular velocity sensor. For example, upon application of an angular velocity with respect to a vibrating body piezo-electrically vibrating at a resonance frequency, Coriolis force is generated in a direction orthogonal to a vibration direction of the vibrating body. The Coriolis force is in proportion with the angular velocity, so detection of the Coriolis force leads to detection of the angular velocity. The input apparatus of Patent Document 1 detects angular velocities about two orthogonal axes by the angular velocity sensors, generates, based on the angular velocities, a command signal as positional information of a cursor or the like displayed by a display means, and transmits it to the control apparatus.

Patent Document 1: Japanese Patent Application Laid-open No. 2001-56743 (paragraphs [0030] and [0031], FIG. 3)

Patent Document 2: Japanese Patent No. 3,264,291 (paragraphs [0062] and [0063])

DISCLOSURE OF THE INVENTION

Problems to be Solved by the Invention

Since such a 3-dimensional operation input apparatus is actually moved 3-dimensionally, it is considered that a frequency of movement including a movement unintended by the user is higher in the 3-dimensional operation input apparatus than a mouse that is moved within a 2-dimensional plane, for example. Examples of the movement of the input apparatus unintended by the user include movements that are caused when a user moves the input apparatus to an arbitrary place such as a desk, a table, and a floor to place it there after using it. In other words, in addition to the movement of the input apparatus for the user to intentionally move the pointer, the pointer also moves in accordance with the movement unintended by the user. There may be a case where the user wishes to stop the movement of the pointer when the input apparatus is moved unintentionally.

In view of the circumstances as described above, it is an object of the present invention to provide an input apparatus, a control apparatus, a control system, a control method, and a handheld apparatus that are capable of restricting a movement of a pointer on a screen by a user operation even while the input apparatus is moving.

Incidentally, the input apparatuses are generally provided with, in addition to detection of a positional change by various sensors, a command input key mainly typified by left and right buttons or a wheel button of a mouse. When issuing some kind of a command to an icon as an operation target, a user operates the pointing device to place a pointer on an arbitrary icon and presses the command input key. However, there are cases where, when the user inputs the command input key using the 3-dimensional operation input apparatus, the pointing device itself is moved by an operation caused when the command input key is pressed, and the pointer is consequently moved according to the pointing device. As a result, there arises a problem that operations unintended by the user are made, like the pointer is moved from the icon as the operation target and a command cannot be issued, or, though intended for a click operation, by the pointer moving while the user is pressing the button, a drag operation is made.

To solve the problems as described above, Patent Document 2 discloses processing in which, while an enter operation is being made by the pointing device (remote commander), that is, while the button is pressed, the pointer is not moved. However, there is a problem that although, if an enter operation signal is generated over a predetermined time period, the PC processes it as a drag operation, if operations of the pointer are stopped during the entire time period during which the enter code is input, the PC cannot carry out processing of the drag operation on the contrary. For solving this problem, Patent Document 2 also discloses processing in which a predetermined time period is counted from a point enter information is input, and a display output of the pointer is stopped only during that time period.

The PC and the like, however, often recognizes a command when the user releases the pressed button and the enter code is thus canceled. Therefore, there is a fear that, depending on the way the button is released, the pointer may move from the icon before the PC issues a command. In this case, the PC cannot issue a command.

Moreover, as described above, since the PC recognizes a command when the enter code is canceled, when the pointing device is moved during a double click, there is a fear that the PC may erroneously judge that a drag has been made.

Another object of the present invention is to provide a technique of an input apparatus, a control apparatus, and the like with which an operational feeling can be improved in a case where a user uses the input apparatus to input an operation signal via an operation section.

Means for Solving the Problems

For attaining the objects above, according to the present invention, there is provided an input apparatus controlling a movement of a pointer on a screen, including: a casing; a sensor to detect a movement of the casing and output a detection signal corresponding to the movement of the casing; a movement command output means for outputting a movement command that corresponds to a displacement amount of the pointer on the screen based on the detection signal; a first switch capable of making a switch in accordance with an operational input to the input apparatus; and an output control means for controlling the output of the movement command for making a switch between the movement of the pointer and a stop of the movement of the pointer in accordance with the switch by the first switch.

In the present invention, by the operational input by the user to the input apparatus via the first switch, a movement command that corresponds to the displacement amount of the casing and is used for starting the movement of the pointer is output. Accordingly, since the pointer can be moved when the user wishes to move it, at a time an operational input is not made via the first switch, the movement of the pointer can be stopped.

The control of the output of the movement command refers to, in a case where the movement of the pointer is to be stopped, for example, either a stop of an output of a movement command or an output of a movement command with the displacement amount of the pointer set to 0.

In the present invention, the output control means controls the output of the movement command so that, when a first operation signal from the first switch is input, the movement of the pointer is started. Conversely, the output control means may control the output of the movement command so that, when a first operation signal from the first switch is input, the output of the movement command is stopped or the movement command with the displacement amount set to 0 is output.

In the present invention, the input apparatus further includes a determination command output means that includes a second switch and outputs, while the first operation signal is being input, a determination command corresponding to an input of a second operation signal to the input apparatus by the second switch. In the present invention, the determination command is output by the user inputting, while the first switch is connected and the first operation signal is thus input, the second operation signal to the input apparatus via the second switch. Accordingly, the pointer can be moved due to the connection of the first switch and the determination command can be output due to the connection of the second switch, with the result that the user can perform intuitional operations.

Alternatively, in a state where the input of the first operation signal is canceled, a determination command may be output from the second switch. Accordingly, though a drag operation cannot be made, an operation corresponding to the determination command of the user can positively be made on a UI such as an icon as a target, with the result that an unintentional operation can be prevented from being made and footwork becomes lighter.

The determination command is, for example, a command for executing predetermined processing with a UI such as an icon (excluding pointer) on the screen as a target and is typically a command for selecting the UI, though not limited thereto.

In the present invention, the input apparatus further includes an operation section that includes a two-step action for successively inputting the first operation signal and the second operation signal.

Accordingly, since the user can successively carry out two operations with a single operation section, intuitiveness of the user can be additionally improved.

Examples of the operation section include a push button, a bar-type operation section that is operated with one end as a fulcrum, a slide-type operation section, and a rotary-type operation section. Of those, a rotary shaft of the rotary-type operation section may be provided in any direction with respect to the casing. The following buttons can be exemplified as the push button.

For example, the operation section includes a push button capable of supporting the first switch and the second switch by a linear push. Alternatively, the operation section includes a first button as a push button that includes the first switch, a second button as a push button that is provided physically apart from the first button and includes the second switch, and a surface button capable of successively pressing the first button and the second button.

In the present invention, the input apparatus further includes a movement command control means for controlling the movement command output means to stop outputting the movement command or output the movement command with the displacement amount set to 0 during a first time period since the input of the second operation signal from the second switch. In the present invention, during a predetermined time period (first time period) since the input of the second operation signal, the movement of the pointer on the screen is restricted even when a detection signal corresponding to the movement of the casing is output from the sensor. In other words, the movement of the pointer is restricted even when the casing is moved by an operation that is caused when the user inputs a signal to the input apparatus via the second switch. Therefore, it is possible to prevent an operation of the pointer, the icon, and the like unintended by the user from being made and thus improve an operational feeling.

For example, the movement command control means controls, when the input of the second operation signal from the second switch is canceled within the first time period since the input of the second operation signal, the movement command output means to stop outputting the movement command during the second time period since the cancel of the input of the second operation signal. Alternatively, control may be performed so as to output the movement command with the displacement amount set to 0. Accordingly, the user can operate the pointer or the like without feeling awkward.

In the present invention, the input apparatus further includes a movement command control means for controlling the movement command output means to stop outputting the movement command or output the movement command with the displacement amount set to 0 during a second time period since a cancel of the input of the second operation signal from the second switch. Accordingly, during a predetermined time period (second time period) since the user cancels the input of the signal to the input apparatus via the second switch, the movement of the pointer on the screen is restricted even when the casing is moved by an operation caused when the user cancels the input. Therefore, it is possible to prevent an operation of the pointer, the icon, and the like unintended by the user from being made and thus improve an operational feeling. The second time period may either be the same as or different from the first time period.

For example, the movement command control means controls, when the second operation signal from the second switch is input within the second time period since the cancel of the input of the second operation signal, the movement command output means to stop outputting the movement command during the first time period since the input of the second operation signal. Alternatively, control may be performed so as to output the movement command with the displacement amount set to 0. Accordingly, the user can operate the pointer or the like without feeling awkward.

In the present invention, the output control means controls the movement command output means to start outputting the movement command after an elapse of a third time period since the input of the first operation signal for moving the pointer. In a case where operational inputs are successively made by the user via the first switch and the second switch, the user can operate the pointer or the like without feeling awkward. The third time period may either be the same as or different from the first time period.

According to the present invention, there is provided a control apparatus controlling a movement of a pointer on a screen based on a detection signal output from an input apparatus including a casing, a sensor to detect a movement of the casing and output the detection signal corresponding to the movement of the casing, the detection signal corresponding to a displacement amount of the pointer on the screen, a first switch capable of making a switch in accordance with an operational input, and an output control means for controlling the output of the detection signal in accordance with the switch by the first switch, the control apparatus including: a reception means for receiving the detection signal; an output means for outputting a correspondence signal corresponding to the displacement amount that is based on the received detection signal; and a display control means for controlling a display position of the pointer on the screen based on the correspondence signal and controlling the movement of the pointer and a stop of the movement of the pointer under control of the output control means.

The preamble part "control apparatus . . . casing . . . " is presented for clarifying the content of the present invention, and the inventors of the present invention have no intention of presenting the preamble part as a well-known technique.

According to the present invention, there is provided a control system controlling a movement of a pointer on a screen, including an input apparatus and a control apparatus. The input apparatus includes a casing, a sensor to detect a movement of the casing and output a detection signal corresponding to the movement of the casing, a movement command output means for outputting a movement command that corresponds to a displacement amount of the pointer on the screen based on the detection signal, a first switch capable of making a switch in accordance with an operational input to the input apparatus, and an output control means for controlling the output of the movement command in accordance with the switch by the first switch. The control apparatus includes a reception means for receiving the movement command, and a display control means for controlling a display position of the pointer on the screen based on the received movement command and controlling the movement of the pointer and a stop of the movement of the pointer under control of the output control means.

According to another aspect of the present invention, there is provided a control system controlling a movement of a pointer on a screen, including an input apparatus and a control apparatus. The input apparatus includes a casing, a sensor to detect a movement of the casing and output a detection signal corresponding to the movement of the casing, the detection signal corresponding to a displacement amount of the pointer on the screen, a first switch capable of making a switch in accordance with an operational input, and an output control means for controlling the output of the detection signal in accordance with the switch by the first switch. The control apparatus includes a reception means for receiving the detection signal, an output means for outputting a correspondence signal corresponding to the displacement amount that is based on the received detection signal, and a display control means for controlling a display position of the pointer on the screen based on the correspondence signal and controlling the movement of the pointer and a stop of the movement of the pointer under control of the output control means.

According to the present invention, there is provided a control method including: detecting a movement of a casing of an input apparatus and outputting a detection signal corresponding to the movement of the casing; outputting a movement command that corresponds to a displacement amount of a pointer on a screen based on the detection signal; controlling the output of the movement command in accordance with a switch by a first switch based on an operational input to the input apparatus, the first switch being provided in the input apparatus; controlling a display position of the pointer on the screen based on the movement command; and controlling a movement of the pointer and a stop of the movement of the pointer based on the control of the output of the movement command.

According to another aspect of the present invention, there is provided an input apparatus controlling a movement of a pointer on a screen, including: a casing; a motion sensor to detect a movement of the casing and output a motion signal corresponding to the movement of the casing; a command output means for outputting a movement command corresponding to the motion signal for moving the pointer on the screen; a sensor that includes a detection area and detects whether a body part of a user is present in the detection area; and an output control means for controlling the output of the movement command for making a switch between the movement of the pointer and a stop of the movement of the pointer when it is detected by the sensor that the body part of the user is present in the detection area.

In the present invention, the sensor detects whether the body part (e.g., finger) of the user is present in the detection area, and the output of the movement command for moving the pointer is controlled based on whether the body part of the user is present. Accordingly, by moving the finger to the detection area or touching the detection area with the finger, the user can arbitrarily make a switch between the start of the movement of the pointer and the stop of the movement of the pointer. As a result, since the pointer can be stopped when the user wishes for the movement of the pointer to be stopped on the screen, the pointer can be prevented from making a move unintended by the user.

The "sensor" includes a reflection-type optical sensor, a transmission-type optical sensor, a capacitance sensor, and the like. Any sensor may be used as long as it is a sensor that is capable of detecting a presence of a body part of a user.

The "detection area" includes a spatial area and a planar area.

The expression "controlling the output of the movement command" means, when stopping the movement of the pointer, either stopping the output of the movement command or outputting the movement command with the displacement amount of the pointer set to 0. On the other hand, when starting to move the pointer, it means either starting to output the movement command output the movement command or changing an output of the movement command whose displacement amount is set to 0 to an output of the displacement amount corresponding to the movement of the casing.

In the input apparatus, the output control means controls the output of the movement command so that the pointer moves on the screen when it is detected that the body part of the user is present in the detection area.

In the present invention, when the user moves his/her finger to the detection area or touches it with the finger, the sensor detects that the finger is present in the detection area, and the pointer thus moves on the screen. On the other hand, the pointer stops moving when the user removes his/her finger in the detection area from the detection area or releases the finger touching the detection area.

Accordingly, by not moving the finger to the detection area when wishing for the movement of the pointer to be stopped, the user can keep the pointer stopped. Moreover, when wishing to start moving the pointer, the movement of the pointer can be started by moving the finger to the detection area, and when wishing to stop the pointer again, the pointer can be stopped by removing the finger from the detection area.

In the input apparatus, the output control means controls the output of the movement command so that the pointer stops moving on the screen when it is detected that the body part of the user is present in the detection area.

In the present invention, the user is capable of keeping the pointer stopped by moving the finger to the detection area and is also capable of starting the movement of the pointer by removing the finger from the detection area.

The input apparatus further includes an operation section to which a press operation is made by the user and which outputs a press operation signal corresponding to the press operation, and a determination command output means for outputting a determination command corresponding to the press operation signal.

Accordingly, the user can move the finger to the detection area and place the pointer on a target icon, and press the operation section thereafter to thus select that icon, for example.

The "determination command" is, for example, a command for executing predetermined processing with a UI such as an icon (excluding pointer) on the screen as a target and is typically a command for selecting the UI, though not limited thereto.

In the input apparatus, the output control means controls the output of the determination command in accordance with an input of the press operation signal made in a state where it is detected that the body part of the user is present in the detection area.

The expression "controls the output of the determination command in accordance with an input of the press operation signal" includes a case of outputting a determination command when the input of the press operation signal is started and a case of outputting a determination command when the input of the press operation signal is canceled.

In the input apparatus, the detection area may be located above the operation section.

In the present invention, when the operation section is pressed while the finger is being detected in the detection area above the operation section, a press operation signal is output from the operation section and a determination command corresponding to the press operation signal is output. Accordingly, the user can move the pointer on the screen and place it on the icon while his/her finger is moved to the detection area above the operation section and press the operation section with the finger in the detection area so as to perform an operation of selecting the icon on the screen, for example. In other words, according to the present invention, it becomes possible for the user to intuitionally operate the GUI on the screen by a series of simple operations using a finger, including moving the finger to the detection area above the operation section and pressing with the finger in the detection area above the operation section.

In the input apparatus, the output control means controls the output of the determination command in accordance with an input of the press operation signal made in a state where it is detected that the body part of the user is not present in the detection area.

In the present invention, the determination command is output in a state where the finger of the user is not detected in the detection area, that is, in a state where the movement of the pointer is stopped. Accordingly, it is possible for the user to issue a determination command by pressing the operation section after the pointer is placed on an icon and the pointer is thus stopped on the icon, for example. As a result, a positive GUI operation becomes possible.

In the input apparatus, the detection area may be arranged such that the operation section and the detection area are aligned in a direction different from a pressing direction of the operation section.

Accordingly, the user can operate the GUI on the screen by a simple operation using one finger.

In the input apparatus, the sensor may be an optical sensor including a light-emitting device that irradiates light onto the detection area and a light-receiving device that detects the light.

The optical sensor may be a reflection-type optical sensor or a transmission-type optical sensor.

The input apparatus further includes a wavelength selection area that selectively causes light belonging to a wavelength range of the light emitted from the light-emitting device to transmit therethrough out of the light irradiated onto the light-receiving device.

Accordingly, since the light-receiving device can appropriately detect the light emitted from the light-emitting device, an influence of disturbance light can be suppressed effectively.

In the input apparatus, the sensor may be a capacitance sensor.

The input apparatus further includes a restriction means for restricting power supply to the motion sensor when it is detected that the body part of the user is not present in the detection area or when a state where it is detected that the body part of the user is not present in the detection area continues for a predetermined time period.

In the present invention, since a necessity of outputting a movement command is low when a finger is not present in the detection area or a finger is not detected in the detection area for a predetermined time period, the restriction means restricts power supply to the motion sensor. Accordingly, power-saving of the input apparatus can be realized.

In the input apparatus, the sensor detects whether the body part of the user is present in the detection area in a predetermined cycle.

In the present invention, by detecting whether a finger is present in the detection area in a predetermined cycle, power-saving of the sensor is realized.

The input apparatus further includes a cycle control means for variably controlling the cycle.

In the present invention, since the cycle in which the presence of a finger is detected is variable, by prolonging the cycle when a necessity of detecting the presence of a finger by the sensor is low, for example, more power can be saved.

In the input apparatus, the cycle control means controls the cycle so that the cycle becomes shorter as an output value of the motion signal or an operational value that is obtained based on the motion signal increases.

In the present invention, the cycle in which the presence of a finger is detected becomes shorter as the output value of the motion signal or the operational value obtained based on the motion signal increases. Conversely, the cycle becomes longer as the output value of the motion signal or the operational value decreases.

Because the user operates the casing while holding it when moving the pointer on the screen, the output value of the motion signal or the operational value obtained based on the motion signal increases in accordance with the operation. In other words, it is considered that the necessity of detecting the presence of a finger of the user increases as the output value of the motion signal increases.

On the other hand, it is considered that the necessity of detecting the presence of a finger by the sensor is low when the input apparatus is stationary and the output value of the motion signal of the input apparatus or the operational value thereof is small, for example.

In the present invention, by variably controlling the cycle of detecting the presence of a finger using such a relationship, power can be saved appropriately.

In the input apparatus, the cycle control means controls the cycle so that the cycle becomes longer as a time period up until a time it is detected that the body part of the user is present in the detection area since it has become undetected becomes longer.

In the present invention, power-saving is realized by prolonging the cycle of detecting the presence of a finger as a time period up until a time the user moves his/her finger to the detection area again since having removed the finger from the detection area becomes longer.

In the input apparatus, the cycle control means controls the cycle so that the cycle becomes longer as a time period up until a time it is detected that the body part of the user is present in the detection area since a start of power supply to the input apparatus from a power source becomes longer.

In the present invention, power-saving is realized by prolonging the cycle as a time period up until a time the user moves his/her finger to the detection area since the start of power supply to the input apparatus becomes longer.

In the input apparatus, the sensor includes a light-emitting device that irradiates light onto the detection area, a light-receiving device that detects the light, and a voltage control means for controlling a voltage to be intermittently supplied to the light-emitting device in the cycle and controlling the voltage to be successively supplied to the light-receiving device irrespective of the cycle.

When a voltage is intermittently supplied to the light-receiving device in a case where the sensor includes the light-emitting device and the light-receiving device, irrespective of the fact that the light-receiving device has not detected light, the light-receiving device outputs a signal as if it has detected light. It is considered that this problem occurs because, when a voltage is intermittently supplied to the light-receiving device, a floating capacitance is caused in the light-receiving device, and the floating capacitance affects the signal output. In the present invention, since a voltage is successively supplied to the light-receiving device, it is possible to prevent the light-receiving device from outputting a signal as if it has detected light.

In the input apparatus, the sensor may further include a light-emitting device that irradiates light onto the detection area, a light-receiving device that detects the light, and a light shield member that is interposed between the light-emitting device and the light-receiving device and shields the light from the light-emitting device.

In the input apparatus, the light-receiving device outputs a light-receiving signal corresponding to an intensity of the detected light, the input apparatus further including a judgment means for receiving the light-receiving signal and judging whether the light-receiving signal has been input based on a change amount of an output value of the light-receiving signal.

For example, in a state where disturbance light is strong, the light-receiving device may detect light other than the light emitted from the light-emitting device and thus continue to output a light-receiving signal. In the present invention, since the judgment on whether the light-receiving signal from the light-receiving device has been input is made based on the change amount of the output value of the light-receiving signal, the influence of disturbance light can be removed effectively.

In the input apparatus, the light-receiving device outputs a light-receiving signal corresponding to an intensity of the detected light, the input apparatus further including a removal means for receiving the light-receiving signal and removing a DC component of the light-receiving signal, and a waveform-shaping means for shaping a waveform of the light-receiving signal from which the DC component has been removed.

In the present invention, even when disturbance light is stronger, the influence of disturbance light can be removed effectively.

In the input apparatus, the output control means controls the output of the movement command so that the pointer stops on the screen during a first time period since a start of an input of the press operation signal.

In the present invention, during the first time period since the start of the input of the press operation signal, the movement of the pointer on the screen is restricted even when a motion signal corresponding to the movement of the casing is output from the motion sensor. In other words, the movement of the pointer is restricted even when the casing is moved by an operation that is caused when the user presses the operation section. Therefore, it is possible to prevent an operation of the pointer, the icon, and the like unintended by the user from being made and thus improve an operational feeling.

In the input apparatus, the output control means controls the output of the movement command so that the pointer stops on the screen during a second time period since a cancel of an input of the press operation signal.

Accordingly, since the movement of the pointer is restricted during the second time period since the cancel of the input of the press operation signal, the pointer does not move on the screen even when the casing is moved by an operation that is caused when the user releases the finger that is pressing the operation section from the operation section, for example. Therefore, it is possible to prevent an operation of the pointer, the icon, and the like unintended by the user from being made and thus improve an operational feeling. The second time period may either be the same as or different from the first time period.

In the input apparatus, the output control means controls the output of the movement command so that, when the input of the press operation signal is canceled within the first time period, the pointer stops on the screen during a second time period since the cancel of the input of the press operation signal.

Accordingly, the user can operate the pointer or the like naturally without feeling awkward.

In the input apparatus, the output control means controls the output of the movement command so that, when the input of the press operation signal is started within the second time period, the pointer stops on the screen during a first time period since the start of the input of the press operation signal.

Accordingly, the user can operate the pointer or the like naturally without feeling awkward.

In the input apparatus, the judgment on the input of the light-receiving signal is made based on whether a difference between the output value of the light-receiving signal obtained at a time the light-emitting device, that emits light in the cycle, is emitting light and the output value of the light-receiving signal obtained at a time the light is turned off exceeds a predetermined threshold value.

Accordingly, the influence of disturbance light can be suppressed effectively.

The input apparatus may further include a transmissive member to cause the light emitted from the light-emitting device to transmit therethrough, the transmissive member including a press surface that is pressed by the user and being provided such that the detection area is located above the press surface.

The input apparatus may further include a support member to integrally support the transmissive member and the optical sensor.

Accordingly, a level of light reflected on a surface of the transmissive member can be stabilized. Therefore, it is possible to prevent the light-receiving device from detecting light even when a finger of the user is not present in the detection area.

In the input apparatus, the optical sensor may be resin-sealed by the transmissive member.

Accordingly, since a reflection surface of the transmissive member can be made smaller, a level of light reflected by the transmissive member can be stabilized.

In the input apparatus, the support member may include a retention base that retains the light-emitting device and the light-receiving device and a light shield member that is provided on the retention base between the light-emitting device and the light-receiving device so that it comes into contact with the transmissive member and shields the light from the light-emitting device.

In the present invention, by the light shield member, it is possible to prevent the light-receiving device from directly receiving the light emitted from the light-emitting device. In addition, it is possible to prevent the light-receiving device from receiving the light emitted from the light-emitting device and reflected by the transmissive member.

According to another aspect of the present invention, there is provided a control apparatus controlling display of a movement of a pointer on a screen in accordance with information on a motion signal and presence information indicating that a body part of a user is present in a detection area, that are output from an input apparatus including a casing, a motion sensor to detect a movement of the casing and output the motion signal corresponding to the movement of the casing, and a sensor that includes a detection area and detects whether the body part of the user is present in the detection area, the control apparatus including: a reception means for receiving the information on the motion signal and the presence information; an output means for outputting a control signal corresponding to the motion signal for moving the pointer on the screen; a display control means for controlling the display of the movement of the pointer on the screen based on the control signal; and an output control means for controlling the output of the control signal for making a switch between the movement of the pointer and a stop of the movement of the pointer in accordance with the presence information.

According to still another aspect of the present invention, there is provided a control system controlling a movement of a pointer on a screen, including: an input apparatus including a casing, a motion sensor to detect a movement of the casing and output a motion signal corresponding to the movement of the casing, a command output means for outputting a movement command corresponding to the motion signal for moving the pointer on the screen, a sensor that includes a detection area and detects whether a body part of a user is present in the detection area, and an output control means for controlling the output of the movement command for making a switch between the movement of the pointer and a stop of the movement of the pointer when it is detected by the sensor that the body part of the user is present in the detection area; and a control apparatus including a reception means for receiving the movement command, and a display control means for controlling display of the movement of the pointer on the screen based on the movement command.

According to still another aspect of the present invention, there is provided a control system controlling a movement of a pointer on a screen, including: a casing; a motion sensor to detect a movement of the casing and output a motion signal corresponding to the movement of the casing; a sensor that includes a detection area and detects whether a body part of a user is present in the detection area; a transmission means for transmitting information on the motion signal and presence information indicating that the body part is present; a reception means for receiving the information on the motion signal and the presence information; an output means for outputting a control signal corresponding to the motion signal for moving the pointer on the screen; a display control means for controlling display of the movement of the pointer on the screen based on the control signal; and an output control means for controlling the output of the control signal for making a switch between a start of the movement of the pointer and a stop of the movement of the pointer in accordance with the presence information.

According to another aspect of the present invention, there is provided a control method including: detecting a movement of a casing and outputting a motion signal corresponding to the movement of the casing; outputting a movement command corresponding to the motion signal for moving a pointer on a screen; detecting whether a body part of a user is present in a detection area; and controlling the output of the movement command for making a switch between a start of the movement of the pointer and a stop of the movement of the pointer when it is detected that the body part of the user is present in the detection area.

According to an embodiment of the present invention, there is provided a switch module including a cover, a sensor module, a support body, and an absorption area.

The cover is capable of being applied with a force that is generated when a user comes into direct or indirect contact with the cover.

The sensor module body includes a detection area on the cover and optically detects a body part of the user.

The support body supports the cover and the sensor module body.

The absorption area is provided between the cover and the sensor module body and absorbs the force.

Since the absorption area is provided between the cover and the sensor module body, even when a force is applied by the user, a risk of the sensor module body being damaged and the like can be eliminated.

The cover may be directly applied with a force by the user touching the cover. Alternatively, by the user touching a different member provided on the cover, the cover may be indirectly applied with a force via that member. Moreover, a force generated by the touch of the user may include a pressing force generated at a time the user intentionally presses the cover.

The cover only needs to be partially or entirely formed of a material that has optical transparency with respect to light of a wavelength range that a light-emitting device of the sensor module body emits.

The absorption area may include a space. In other words, by constituting a part or all of the absorption area between the cover and the sensor module body by a space, the absorption area can absorb the force of the user.

The absorption area may include an elastic member. The elastic member only needs to be provided in a part of the absorption area or the entire absorption area.

The sensor module body may include a light-emitting device and a light-receiving device that receives light emitted from the light-emitting device. In this case, the switch module may further include a reflection suppression means for suppressing incidence of reflected light to the light-receiving device, the reflected light being light from the light-emitting device reflected by the cover. Without the reflection suppression means, there is a fear that, due to the reflection of light from the light-emitting device by the cover, the reflected light enters the light-receiving device to thus cause a false detection. However, according to the present invention, such a false detection can be prevented from occurring.

The reflection suppression means may include an elastic member that is provided in the absorption area. In other words, the elastic member may include a function of suppressing the reflection and a function of absorbing the force in the absorption area. Accordingly, it is possible to improve detection accuracy of a body part of the user by the light-receiving device without providing an additional member, prevent a damage of the sensor module body, and realize miniaturization of the switch module.

For example, in a case where the sensor module body includes a wall member between the light-emitting device and the light-receiving device, the elastic member may be provided so as to extend from the wall member. By thus providing the elastic member as an extension of the wall member, reflected light cannot reach the light-receiving device as compared to a case where it is provided substantially on the entire absorption area.

The reflection can be suppressed even when the elastic member is provided substantially on the entire absorption area. In this case, generation of reflected light in the elastic member can be prevented effectively as long as a refractive index of light in a medium as an optical path of light emitted from the light-emitting device of the sensor module body and a refractive index of light of the elastic member are substantially the same or close to each other.

The reflection suppression means may include an antireflection film provided in the cover.

The reflection suppression means may include, on a side on which the absorption area is provided, a protrusion integrally formed on the cover. The protrusion may be in a form of a lens or may take other shapes. When the protrusion is in a form of a lens, it is possible to not only suppress reflection but also efficiently collect reflected light from the body part of the user in the light-receiving device out of the light from the light-emitting device.

The sensor module body may include a light-emitting device, a light-receiving device that receives light emitted from the light-emitting device, and an arrangement surface including a surface on which the light-emitting device and the light-receiving device are arranged. In this case, the cover may include a transmissive opening surface that causes the light emitted from the light-emitting device to transmit therethrough, the transmissive opening surface being provided on the detection area side and being smaller than the arrangement surface. As a result, it is possible to reduce disturbance light that enters the sensor module body from the cover and thus prevent a false detection of the sensor module body.

The sensor module body may include a light-emitting device, a light-receiving device that receives light emitted from the light-emitting device, and a wall member provided between the light-emitting device and the light-receiving device.

The cover may include a bottom portion including the transmissive opening surface through which light from the sensor module body can transmit, the bottom portion being a surface provided on a side that receives the force, and a concave surface constituted of a wall portion higher than the bottom portion. Since the wall portion blocks the disturbance light if a body part of the user is fitted into the concave surface, it is possible to suppress incidence of disturbance light in the sensor module body via the transmissive opening surface. Further, in this case, at a time the user applies a force to the cover, the concave surface exerts a function of guiding the body part of the user to a position on the transmissive opening surface. Thus, the user can tactually recognize a position of the cover with ease without relying on visual senses.

In a case where the sensor module body includes a light-emitting device and a light-receiving device that receives light emitted from the light-emitting device, the switch module may further include a wavelength selection area that selectively causes light belonging to a wavelength range of the light emitted from the light-emitting device to transmit therethrough out of the light received by the light-receiving device. Accordingly, since the light-receiving device is capable of appropriately detecting the light emitted from the light-emitting device, the influence of disturbance light can be suppressed effectively.

The switch module may further include an elastic support body that elastically supports the switch module and a push-type switch that is switched ON/OFF by a force applied to the cover and an elastic force of the elastic support body.

According to an embodiment of the present invention, there is provided a handheld apparatus including a casing, a display section, a movement command output means, a first switch, and a control means.

The sensor detects a movement of the casing and outputs a detection signal corresponding to the movement of the casing.

The movement command output means outputs a movement command for moving a pointer on a screen displayed on the display section based on the detection signal.

The first switch is capable of switching ON/OFF in accordance with an operational input to the handheld apparatus.

The control means controls a display position of the pointer on the screen based on the movement command and controls the output of the movement command for making a switch between the movement of the pointer and a stop of the movement of the pointer in accordance with the switch by the first switch.

According to an embodiment of the present invention, there is provided a handheld apparatus including a casing, a display section, a motion sensor, a command output means, and a control means.

The motion sensor detects a movement of the casing and outputs a motion signal corresponding to the movement of the casing.

The command output means outputs a movement command corresponding to the motion signal for moving a pointer on a screen displayed on the display section.

The sensor includes a detection area and detects whether a body part of a user is present in the detection area.

The control means controls a display position of the pointer on the screen based on the movement command and controls the output of the movement command for making a switch between the movement of the pointer and a stop of the movement of the pointer when it is detected by the sensor that the body part of the user is present in the detection area.

Effect of the Invention

As described above, according to the present invention, a movement of a pointer on a screen can be restricted by a user operation even while an input apparatus is moving.

BEST MODES FOR CARRYING OUT THE INVENTION

Hereinafter, embodiments of the present invention will be described with reference to the drawings.

FIG. 1 is a diagram showing a control system according to an embodiment of the present invention. A control system 100 includes a display apparatus 5, a control apparatus 40, and an input apparatus 1.

FIG. 2 is a perspective view showing the input apparatus 1. The input apparatus 1 is of a size that a user is capable of holding. The input apparatus 1 includes a casing 10 and an operation section 23 including two push buttons 11 and 12 provided at an upper portion of the casing 10 and a rotary wheel button 13. The button 11 provided near the center of the upper portion of the casing 10 (hereinafter, referred to as operation button 11) has a function corresponding to a left button of a mouse as an input device used for a PC, and the adjacent button 12 adjacent to the operation button 11 has a function corresponding to a right button of a mouse, for example.

For example, a "drag and drop" operation of moving an icon 4 by moving the input apparatus 1 while press-and-holding the operation button 11, an operation of opening a file by double-clicking the operation button 11, and a scroll operation on a screen 3 (see FIG. 5) using the wheel button 13 may be executed. The icons are images on the screen 3 representing functions of programs, execution commands, file contents, and the like on the computer. Locations of the operation button 11, the adjacent button 12, and the wheel button 13, a content of a command issued, and the like can arbitrarily be changed.

FIG. 3 is a diagram schematically showing an internal structure of the input apparatus 1. FIG. 4 is a block diagram showing an electrical structure of the input apparatus 1.

The input apparatus 1 includes a sensor unit 17, a control unit 30, and batteries 14.

FIG. 9 is a perspective view showing the sensor unit 17. The sensor unit 17 is a sensor that detects a movement of the casing 10, that is, a movement of the input apparatus 1. The sensor unit 17 includes an acceleration sensor unit 16 for detecting accelerations in different angles such as along two orthogonal axes (X axis and Y axis). Specifically, the acceleration sensor unit 16 includes two sensors, that is, a first acceleration sensor 161 and a second acceleration sensor 162. The sensor unit 17 also includes an angular velocity sensor unit 15 for detecting angular accelerations about the two orthogonal axes. Specifically, the angular velocity sensor unit 15 includes two sensors, that is, a first angular velocity sensor 151 and a second angular velocity sensor 152. The acceleration sensor unit 16 and the angular velocity sensor unit 15 are packaged and mounted on a circuit board 25.

As each of the first angular velocity sensor 151 and the second angular velocity sensor 152, a vibration gyro sensor for detecting Coriolis force in proportion to an angular velocity is used. As each of the first acceleration sensor 161 and the second acceleration sensor 162, any sensor such as a piezoresistive sensor, a piezoelectric sensor, or a capacitance sensor may be used.

In descriptions on FIGS. 2 and 3, a longitudinal direction of the casing 10 is referred to as Z' direction, a thickness direction of the casing 10 is referred to as X' direction, and a width direction of the casing 10 is referred to as Y' direction for convenience. In this case, the sensor unit 17 is incorporated into the casing 10 such that a surface of the circuit board 25 on which the acceleration sensor unit 16 and the angular velocity sensor unit 15 are mounted becomes substantially parallel to an X'-Y' plane. As described above, the sensor units 16 and 15 each detect physical amounts with respect to the two axes, that is, the X axis and the Y axis. In descriptions below, a coordinate system that moves along with the input device 1, that is, a coordinate system fixed to the input device 1 is expressed using an X' axis, a Y' axis, and a Z' axis, whereas a coordinate system stationary on earth, that is, an inertial coordinate system is expressed using an X axis, a Y axis, and a Z axis. Moreover, in descriptions below, with regard to the movement of the input apparatus 1, a rotational direction about the X' axis is sometimes referred to as pitch direction, a rotational direction about the Y' axis is sometimes referred to as yaw direction, and a rotational direction about the Z' axis (roll axis) direction is sometimes referred to as roll direction.

The control unit 30 includes a main substrate 18, an MPU 19 (Micro Processing Unit) (or CPU) mounted on the main substrate 18, a crystal oscillator 20, a transmitting device 21, and an antenna 22 printed on the main substrate 18.

The MPU 19 includes a built-in volatile or nonvolatile memory requisite therefor. The MPU 19 is input with a detection signal from the sensor unit 17, an operation signal from the operation section 23, and the like, and the MPU 19 executes various types of operational processing in order to generate predetermined control signals (commands) in response to those input signals.

The transmitting device 21 transmits a command generated by the MPU 19 to the control apparatus 40 as radio signals (e.g., RF radio signals) via the antenna 22.

The crystal oscillator 20 generates reference pulses and supplies them to the MPU 19. The MPU 19 is capable of generating clocks of various frequencies based on the reference pulses. As the batteries 14, dry cell batteries, rechargeable batteries, and the like are used.

The control apparatus 40 is a computer and includes an MPU 35 (or CPU), a display control section 42, a RAM 36, a ROM 37, a video RAM 41, an antenna 39, and a receiver device 38.

The receiver device 38 receives the control signal transmitted from the input apparatus 1 via the antenna 39. The MPU 35 analyzes the control signal and executes various kinds of operational processing. The display control section 42 mainly generates screen data to be displayed on the screen 3 of the display apparatus 5 under control of the MPU 35. The video RAM 41 serves as a work area of the display control section 42 and temporarily stores the generated screen data.

The control apparatus 40 may be an apparatus dedicated to the input apparatus 1, or may be a PC or the like. The control apparatus 40 is not limited to the PC, and may be a computer integrally formed with the display apparatus 5, audiovisual equipment, a projector, a game device, a car navigation system, or the like.

Examples of the display apparatus 5 include a liquid crystal display and an EL (Electro-Luminescence) display, but are not limited thereto. The display apparatus 5 may alternatively be an apparatus integrally formed with a display and capable of receiving television broadcasts and the like.

FIG. 5 is a diagram showing an example of the screen 3 displayed on the display apparatus 5. UIs such as icons 4 and a pointer 2 are displayed on the screen 3. It should be noted that on the screen 3, the horizontal direction is referred to as X-axis direction and the vertical direction is referred to as Y-axis direction.

FIG. 6 is a diagram showing a state where a user is holding the input apparatus 1. As shown in FIG. 6, the input apparatus 1 may include, as the operation section 23, in addition to the operation button 11, the adjacent button 12, and the wheel button 13, various buttons 29 such as those provided to a remote controller for operating a television or the like and a power supply button 28, for example. Command signals generated when the user moves the input apparatus 1 in the air or operates the operation section 23 while holding the input apparatus 1 as shown in the figure are output to the control apparatus 40, and the control apparatus 40 controls the UI.

Typically, the MPU 19 of the input apparatus 1 generates, as the command, a movement command corresponding to a detection signal detected by the sensor unit 17, the movement command corresponding to a displacement amount of the pointer 2 on the screen 3, and an operation command corresponding to an operational input made by the user via the operation section 23 (movement command output means, determination command output means).

The operation signal input by the user via the operation section 23 is an input signal other than the detection signal of the sensor unit 17 as a signal obtained by the movement of the input apparatus 1 (casing 10), that is, an operation signal unrelated to the movement of the input apparatus 1.

FIGS. 7(A) to 7(C) are schematic diagrams showing a structure of the operation button 11.

The operation button 11 as a part of the operation section 23 is a button having a 2-step action. The operation button 11 includes, for example, a movement button 7 (first button), a determination button 8 (second button) disposed physically apart from the movement button 7, and a surface button 6 capable of successively pressing the movement button 7 and the determination button 8. The movement button 7 includes a built-in switch (first switch) (not shown), and the determination button 8 also includes a built-in switch (second switch) (not shown). When the movement button 7 is pressed, the switch is turned on and an operation signal (first operation signal) is thus input. When the determination button 8 is pressed, the switch is electrically turned on and an operation signal (second operation signal) is thus input.

The switches of the movement button 7 and the determination button 8 are electrically connected to the main substrate 18. The MPU 19 outputs a control signal for making a switch between a start of the movement of the pointer 2 and a stop of the movement in accordance with a switch by the switch of the movement button 7. The determination button 8 has a function corresponding to a right button of a mouse as described above, for example. When the determination button 8 is pressed and the switch is turned on, the MPU 19 outputs a determination command (part of operation command described above).

The determination command is, for example, a command for executing predetermined processing with the icon 4 or the like on the screen as a target and is typically a command for selecting the UI. However, the function of the determination button 8 is not limited thereto, and various functions are set as appropriate by an application program run on the control apparatus 40.

FIG. 7(A) is a diagram showing a state where the operation button 11 is not pressed by the user. The surface button 6 is connected to a shaft 9 provided on the casing 10 and is connected to the casing 10 at an end portion thereof on the other side of the shaft 9 via a spring 24. By the user pressing a surface of the surface button 6 by a finger 34, the surface button 6 rotates about the shaft 9 against a spring force of the spring 24. The movement button 7 and the determination button 8 are each a push button. The surface button 6 is provided with, on a back surface thereof, protrusions 6a and 6b capable of respectively pressing the movement button 7 and the determination button 8.

The movement button 7 and the determination button 8 are provided inside the casing 10, for example. When the surface button 6 is pressed a predetermined distance (first distance) (see FIG. 7(B)), the movement button 7 is pressed by the protrusion 6a, and when the surface button 6 is subsequently pressed an additional predetermined distance (second distance) (see FIG. 7(C)), the determination button 8 is pressed by the protrusion 6b. FIG. 7(B) shows a state where the movement button 7 is pressed but the determination button 8 is not pressed. FIG. 7(C) shows a state where both the movement button 7 and the determination button 8 are pressed.

When releasing the pressed surface button 6, the surface button 6 moves as shown in FIG. 7(C), FIG. 7(B), and FIG. 7(A) in the stated order by a spring force of the spring 24, and the determination button 8 and the movement button 7 are released from the pressed states in the stated order.

The first distance and the second distance may either be the same or different and can be set as appropriate. A force required to shift the state from the state shown in FIG. 7(A) to that shown in FIG. 7(B) may either be the same as or different from a force required to shift the state from the state shown in FIG. 7(B) to that shown in FIG. 7(C).

With the operation button 11 structured as described above, a so-called halfway press that maintains a state where the movement button 7 is pressed but the determination button 8 is not (FIG. 7(B)) is also possible. By the user moving the input apparatus 1 while pressing the operation button 11 halfway, the control apparatus 40 controls display so that the pointer 2 moves to a desired position.

Next, a description will be given on typical examples of ways of moving the input apparatus 1 and ways the pointer 2 moves on the screen 3 accordingly. FIG. 8 are explanatory diagrams therefor.

As shown in FIGS. 8(A) and 8(B), the user holds the input apparatus 1 so as to aim the buttons 11 and 12 side of the input apparatus 1 at the display apparatus 5 side. The user holds the input apparatus 1 so that a thumb is located on an upper side and a pinky is located on a lower side as in handshakes. In this state, the circuit board 25 (see FIG. 9) of the sensor unit 17 is close to being in parallel with the screen 3 of the display apparatus 5, and the two axes as detection axes of the sensor unit 17 respectively correspond to the horizontal axis (X axis) and the vertical axis (Y axis) on the screen 3. Hereinafter, the position of the input apparatus 1 as shown in FIGS. 8(A) and 8(B) is referred to as reference position.

As shown in FIG. 8(A), in the reference position, the user moves a wrist or an arm in the vertical direction or causes a rotation about the X axis. At this time, the second acceleration sensor 162 detects an acceleration in the pitch direction (second acceleration) and the first angular velocity sensor 151 detects an angular velocity about the X axis (first angular velocity). Based on those detection values, the control apparatus 40 controls display of the pointer 2 so as to move the pointer 2 in the Y-axis direction.

Meanwhile, as shown in FIG. 8(B), in the reference position, the user moves the wrist or the arm in the lateral direction or causes a rotation about the Y axis. At this time, the first acceleration sensor 161 detects an acceleration in the yaw direction (first acceleration) and the second angular velocity sensor 152 detects an angular velocity about the Y axis (second angular velocity). Based on those detection values, the control apparatus 40 controls display of the pointer 2 so as to move the pointer 2 in the X-axis direction.

Although descriptions will be given later, in the embodiment, the MPU 19 of the input apparatus 1 calculates velocity values in the yaw and pitch directions based on the detection values detected by the sensor unit 17 in accordance with a program stored in the built-in nonvolatile memory. Here, for control of the movement of the pointer 2, a dimension of an integration value (velocity) of biaxial acceleration values detected by the acceleration sensor unit 16 is used. Information on the dimension of the velocity is transmitted to the control apparatus 40 as a movement command signal (see FIG. 12).

In another embodiment, the input apparatus 1 transmits, as the movement command signal, information on a dimension of physical amounts detected by the sensor unit 17 to the control apparatus 40. In this case, the MPU 35 of the control apparatus 40 calculates, in accordance with the program stored in the ROM 37, the velocity values in the X- and Y-axis directions based on the received movement command. The display control section 42 performs display so as to move the pointer 2 in accordance with the velocity values (see FIG. 15).

The control apparatus 40 converts a displacement of the input apparatus 1 in the yaw direction per unit time into a displacement amount of the pointer 2 on the X axis on the screen 3, and converts a displacement of the input apparatus 1 in the pitch direction per unit time into a displacement amount of the pointer 2 on the Y axis on the screen 3, to thus move the pointer 2. Typically, in the example shown in FIG. 12, for example, regarding the velocity values supplied every predetermined number of clocks, the MPU 19 of the control apparatus 40 adds an n-th velocity value that has been supplied to a (n−1)-th velocity value that has been supplied. Accordingly, the n-th velocity value that has been supplied corresponds to the displacement amount of the pointer 2, and coordinate information of the pointer 2 on the screen 3 is generated.

A calculation method regarding an integration of the acceleration values that is used when calculating the velocity values only needs to be the same as that for the displacement amount.

Next, a description will be given on a gravitational effect with respect to the acceleration sensor unit 16. FIGS. 10 and 11 are explanatory diagrams therefor. FIG. 10 are diagrams showing the input apparatus 1 seen from the Z direction. FIG. 11 are diagrams showing the input apparatus 1 seen from the X direction.

In FIG. 10(A), the input apparatus 1 is in the reference position and is held still. At this time, an output of the first acceleration sensor 161 is substantially 0, and an output of the second acceleration sensor 162 is an output corresponding to a gravity acceleration G. However, as shown in FIG. 10(B), for example, in a state where the input apparatus 1 is tilted in the roll direction, the first and second acceleration sensors 161 and 162 respectively detect acceleration values of tilt components of the gravity acceleration G.

In this case, the first acceleration sensor 161 detects the acceleration in the yaw direction even when the input apparatus 1 is not actually moved in the yaw direction in particular. The state shown in FIG. 10(B) is equivalent to a state where, when the input apparatus 1 is in the reference position as shown in FIG. 10(C), the acceleration sensor unit 16 has received inertial forces Ix and Iy as respectively indicated by arrows with broken lines, thus being undistinguishable by the acceleration sensor unit 16. As a result, the acceleration sensor unit 16 judges that an acceleration in a downward left-hand direction as indicated by an arrow F is applied to the input apparatus 1 and outputs a detection signal different from the actual movement of the input apparatus 1. In addition, because the gravity acceleration G constantly acts on the acceleration sensor unit 16, an integration value is increased and an amount by which the pointer 2 is displaced in the downward oblique direction is increased at an accelerating pace. When the state is shifted from that shown in FIG. 10(A) to that shown in FIG. 10(B), it is considered that inhibition of the movement of the pointer 2 on the screen 3 is an operation that intrinsically matches an intuition of the user.

The same holds true also when the input apparatus 1 is rotated in the pitch direction from the reference position as shown in FIG. 11(A) to tilt as shown in FIG. 11(B), for example. In such a case, because the gravity acceleration G detected by the second acceleration sensor 162 at the time the input apparatus 1 is in the reference position decreases, the input apparatus 1 cannot distinguish it from the inertial force I in the pitch direction as shown in FIG. 11(C).

To reduce such a gravitational effect with respect to the acceleration sensor unit 16 as much as possible, the input apparatus 1 of this embodiment uses the angular velocity values detected by the angular velocity sensor unit 15 to calculate the velocity values of the input apparatus 1. Hereinafter, descriptions will be given on an operation thereof. FIG. 12 is a flowchart showing the operation.

Power of the input apparatus 1 is turned on. For example, the user turns on a power supply switch or the like provided to the input apparatus 1 or the control apparatus 40 to turn on the power of the input apparatus 1. Upon turning on the power, biaxial acceleration signals (first and second acceleration values $a_x$ and $a_y$) are output from the acceleration sensor unit 16 (Step 101a) to be supplied to the MPU 19. The acceleration signals are signals corresponding to the position of the input apparatus 1 at a point the power is turned on (hereinafter, referred to as initial position).

There are cases where the initial position is the reference position. However, a position at which the entire amount of the gravity acceleration is detected in the X-axis direction, that is, a position at which the output of the first acceleration sensor 161 is the acceleration value corresponding to the gravity acceleration and the output of the second acceleration sensor 162 is 0 is also possible. As a matter of course, as the initial position, a position tilted as shown in FIG. 10(B) is also possible.

The MPU 19 of the input apparatus 1 obtains the acceleration signals ($a_x$, $a_y$) from the acceleration sensor unit 16 every predetermined number of clocks. Upon obtaining the second acceleration signals ($a_x$, $a_y$) and the subsequent acceleration signals, the MPU 19 performs the following operations to remove the gravitational effect. Specifically, as in Equations (1) and (2) below, the MPU 19 subtracts gravity acceleration components (first $a_x$ ($=a_{refx}$) and $a_y$ ($=a_{refy}$)) previously detected in the X- and Y-axis directions from the currently-obtained acceleration values $a_x$ and $a_y$, respectively, to thereby generate a first correction acceleration value $a_{corx}$ and a second correction acceleration value $a_{cory}$ (Step 102a).

$$a_{corx} = a_x - a_{refx} \tag{1}$$

$$a_{cory} = a_y - a_{refy} \tag{2}$$

Hereinafter, $a_{refx}$ and $a_{refy}$ will be referred to as reference acceleration value on the X axis and reference acceleration value on the Y axis (first reference acceleration value and second reference acceleration value), respectively. $a_{refx}$ and $a_{refy}$ used in the first calculation of Step 102a since turning on the power are acceleration signals $a_x$ and $a_y$ detected right after the power is turned on.

As shown in Equations (3) and (4), the MPU 19 calculates a first velocity value $V_x$ and a second velocity value $V_y$ by respectively adding the first and second correction acceleration values $a_{corx}$ and $a_{cory}$, that is, by an integration operation (Step 115).

$$V_x(t) = V_x(t-1) + a_{corx} \tag{3}$$

$$V_y(t) = V_y(t-1) + a_{cory} \tag{4}$$

$V_x(t)$ and $V_y(t)$ represent current velocity values, and $V_x(t-1)$ and $V_y(t-1)$ represent previous velocity values.

Meanwhile, as described above, upon turning on the power of the input apparatus 1, biaxial angular velocity signals (first and second angular velocity values $\omega_x$ and $\omega_y$) are output from the angular velocity sensor unit 15 (Step 101b) to be supplied to the MPU 19. Upon obtainment, the MPU 19 calculates the angular acceleration values (first angular acceleration value $\Delta\omega_x$ and second angular acceleration value $\Delta\omega_y$) by a differentiation operation (Step 102b).

The MPU 19 judges whether absolute values $|\Delta\omega_y|$ and $|\Delta\omega_x|$ of $\Delta\omega_x$ and $\Delta\omega_y$ above are smaller than a threshold value Th1 (Steps 103 and 106). When $|\Delta\omega_y| \geq$ Th1, the MPU 19 uses the first reference acceleration value $a_{refx}$ as it is and does not update it (Step 104). Similarly, when $|\Delta\omega_x| \geq$ Th1, the MPU 19 uses the second reference acceleration value $a_{refy}$ as it is and does not update it (Step 107).

A value close to 0 is set as the threshold value Th1. The threshold value Th1 takes into account the angular velocity values that are detected due to a hand movement of the user, a DC offset, or the like even when the user is consciously holding the input apparatus 1 still. Thus, the pointer 2 is prevented from being moved during display due to a hand movement or a DC offset in the case where the user is consciously holding the input apparatus 1 still.

Reasons for performing the processing as described above are as follows.

FIG. 13 is a top view of the user operating the input apparatus 1. When the user operates the input apparatus 1 naturally, the operation is made by at least one of a rotation from a base of an arm, bending of an elbow, and a turn of a wrist. Therefore, generation of the acceleration leads to generation of the angular acceleration. Specifically, the acceleration is assumed to be subservient to the angular acceleration generated in the same direction as the acceleration. Therefore, by the MPU 19 monitoring the second angular acceleration value $|\Delta\omega_y|$, it is possible to judge whether to update the first reference acceleration value $a_{refx}$ in the same direction, and judge whether to eventually correct the first correction acceleration value $a_{corx}$ from Equation (1). The same holds true for the first angular acceleration value $|\Delta\omega_x|$.

More specifically, when the second angular acceleration value $|\Delta\omega_y|$ is equal to or larger than the threshold value Th1, the MPU 19 judges that the input apparatus 1 is moving in the yaw direction. In this case, the MPU 19 does not update the first reference acceleration value $a_{refx}$ and consequently does not correct the first correction acceleration value $a_{corx}$, and continues on with the integration operation of Equation (3) based on $a_{corx}$.

Further, when the first angular acceleration value $|\Delta\omega_x|$ is equal to or larger than the threshold value Th1, the MPU 19 judges that the input apparatus 1 is moving in the pitch direction. In this case, the MPU 19 does not update the second reference acceleration value $a_{refy}$ and consequently does not correct the second correction acceleration value $a_{cory}$, and continues on with the integration operation of Equation (4) based on $a_{cory}$.

Meanwhile, when the second angular acceleration value $|\Delta\omega_y|$ is smaller than the threshold value Th1 in Step 103, the MPU 19 judges that the input apparatus 1 is not moved in the yaw direction. In this case, the MPU 19 updates the first reference acceleration value $a_{refx}$ to the current (latest) detection value $a_x$, to thereby correct the first correction acceleration value $a_{corx}$ using Equation (1) (Step 105). The latest detection value $a_x$ is, in other words, a detection value obtained while the input apparatus 1 is held almost still, thus being a component value of the gravity acceleration.

Similarly, when the first angular acceleration value $|\Delta\omega_x|$ is smaller than the threshold value Th1 in Step 106, the MPU 19 judges that the input apparatus 1 is not moved in the pitch direction. In this case, the MPU 19 updates the second reference acceleration value $a_{refy}$ to the current (latest) detection value $a_y$, to thereby correct the second correction acceleration value $a_{cory}$ using Equation (2) (Step 108).

It should be noted that in this embodiment, the threshold values in both the yaw direction and the pitch direction have been set to the same value Th1. However, different threshold values may be used for those directions.

In the descriptions above, the angular acceleration values $\Delta\omega_x$ and $\Delta\omega_y$ have been monitored, but the MPU 19 can also monitor the angular velocity values $\omega_x$ and $\omega_y$ to correct the velocity values calculated in Equations (3) and (4). Based on the same idea as that of FIG. 13, assuming that generation of the velocity leads to generation of the angular velocity, it can be assumed that the velocity is subservient to the angular velocity in the same direction as the velocity.

Specifically, when the absolute value of the second angular velocity value $|\omega_y|$ is equal to or larger than a threshold value Th2 (NO in Step 109), the MPU 19 judges that the input apparatus 1 is moved in the yaw direction. In this case, the MPU 19 does not correct the first velocity value $V_x$ (Step 110). The same holds true for the absolute value of the first angular velocity value $|\omega_x|$ (NO in Step 112, and Step 113).

The threshold value Th2 also only needs to be set in the same manner as the threshold value Th1.

On the other hand, when the absolute value of the second angular velocity value $|\omega_y|$ is smaller than the threshold value Th2 (YES in Step 109), the MPU 19 judges that the input apparatus 1 is not moved in the yaw direction. In this case, the MPU 19 corrects the first velocity value $V_x$ so as to reset it to 0, for example (Step 111). The same holds true for the absolute value of the first angular velocity value $|\omega_x|$ (YES in Step 112, and Step 114).

The MPU 19 outputs the velocity values $V_x$ and $V_y$ in both directions as described above, and the transmitting device 21 outputs to the control apparatus 40 the input information on the velocity values (Step 116).

The MPU 35 of the control apparatus 40 is input with the velocity values $V_1$ and $V_y$ as the input information (Step 117). The MPU 35 generates coordinate values X and Y of the pointer 2 shown in Equations (5) and (6) below, that correspond to the velocity values $V_x$ and $V_y$ (Step 118). The display control section 42 controls display so as to move the pointer 2 to a position corresponding to the coordinate values X and Y on the screen 3 (Step 119) (display control means).

$$X(t)=X(t-1)+V_x \tag{5}$$

$$Y(t)=Y(t-1)+V_y \tag{6}$$

As described above, the reference acceleration values $a_{refx}$ and $a_{refy}$ are updated and the correction acceleration values $a_{corx}$ and $a_{cory}$ are corrected when the input apparatus 1 is held almost still, with the result that the gravitational effect with respect to the acceleration sensor unit 16 can be suppressed. In addition, because the acceleration values $a_{corx}$ and $a_{cory}$ are corrected using Equations (1) and (2) upon update of the reference acceleration values $a_{refx}$ and $a_{refy}$, a DC level is also corrected, thereby solving the problem regarding the DC offset. Further, because the velocity values are corrected so as to be reset to 0 when the input apparatus 1 is held almost still, integration errors can also be suppressed. When an integration error is caused, a phenomenon in which the pointer 2 moves on the screen 3 irrespective of the fact that the user has stopped moving the input apparatus 1 occurs.

Moreover, in this embodiment, because the first reference acceleration value $a_{refx}$ and the second reference acceleration value $a_{refy}$ are updated individually, when even one of the angular acceleration values in the yaw direction and the pitch direction becomes smaller than the threshold value, a correction thereof is performed. Therefore, it is possible to update the first reference acceleration value $a_{refx}$ or the second reference acceleration value $a_{refy}$ with a time interval short enough for practical use. The same holds true for the individual corrections of the first velocity value $V_x$ and the second velocity value $V_y$. FIG. 14 is an explanatory diagram to help understand the above description.

FIG. 14 shows a trajectory of the input apparatus 1 seen from a plane formed by the X axis and the Y axis. $V_x$ is reset to 0 if the angular velocity value $\omega_y$ in the yaw direction is substantially 0 (smaller than threshold value Th2). $V_y$ is reset to 0 if the angular velocity value $\omega_x$ in the pitch direction is substantially 0 (smaller than threshold value Th2).

FIG. 15 is a flowchart showing another embodiment described above. In the flowchart, the input apparatus 1 outputs, as the input information, to the control apparatus 40, the biaxial acceleration signals and biaxial angular velocity signals output from the sensor unit 17. The MPU 35 of the control apparatus 40 executes Steps 102a and 102b to 115 shown in FIG. 12 in Steps 204 to 218. Because details thereof are the same as those of FIG. 12, descriptions thereof will be omitted.

Next, an operation of the input apparatus 1 that is carried out when the operation button 11 shown in FIGS. 7(A) to 7(C) is pressed will be described. FIG. 16 is a flowchart showing the operation.

In a state where the user is not inputting a first operation signal via the movement button 7 of the operation button 11 (NO in Step 401), the MPU 19 is not outputting a movement command or is outputting a movement command with the displacement amount of the pointer 2 set to 0 (Step 402) (output control means). In other words, the pointer 2 does not move on the screen 3 even when the user holds the input apparatus 1 and moves it. Accordingly, the movement of the pointer 2 unintended by the user can be restricted.

When the movement button 7 is pressed (YES in Step 401), that is, when a first operation signal is input via the first switch, the MPU 19 starts outputting the movement command (Step 403) (output control means). By receiving the movement command, the control apparatus 40 controls display of the pointer 2 so that the pointer 2 starts moving in accordance with the movement command.

When the determination button 8 is pressed while the movement button 7 is being pressed (YES in Step 404), that is, when an operational input is made via the second switch, the MPU 19 outputs a determination command so that the control apparatus 40 can execute predetermined processing in response to the received command. For example, if the position of the pointer 2 at a time the determination button 8 is pressed is on the icon 4 on the screen 3, the MPU 35 of the control apparatus 40 executes processing of selecting that icon 4 or activates an application program corresponding to that icon 4. When the position of the pointer 2 at the time the determination button 8 is pressed is not on the icon 4, the control apparatus 40 executes other predetermined processing (Step 405).

It should be noted that when the determination button 8 is released after being pressed in Step 404 and re-pressed within a predetermined time period thereafter, the MPU 19 or the MPU 35 executes processing corresponding to a double click.

Alternatively, by maintaining a state where the determination button 8 is pressed in Step 404, a drag operation becomes possible.

In this embodiment, a determination command is output by the user inputting, while inputting the first operation signal by pressing the movement button 7, a second operation signal by pressing the determination button 8. Accordingly, the pointer can be moved by the press of the movement button 7, and a determination command can be output by the press of the determination button 8, with the result that the user can perform operations intuitively.

In particular, since the successive operations described above become possible by the user pressing the surface button 6 as a part of the operation button 11, intuitiveness can be improved.

Next, another embodiment regarding an operation carried out when the operation button 11, in particular, the determination button 8 of the input apparatus is operated will be described. FIG. 17 is a flowchart showing the operation.

FIG. 18 is a functional block diagram of the input apparatus 1 for realizing the operation shown in FIG. 17. A frequency divider 44 generates clock pulses of a predetermined frequency based on the pulses supplied from the crystal oscillator 20. A counter 45 counts the clock pulses generated by the frequency divider 44. A count value setting section 46 stores a predetermined number of count values that have been set, for example. A control section 47 compares the count value supplied from the counter and the count value supplied from the count value setting section 46, and executes processing to be described later based on a result of the comparison.

Blocks of the frequency divider 44, the counter 45, the count value setting section 46, the control section 47, and the like are included in the MPU 19, for example.

There are, for example, two types of count values set by the count value setting section 46. One is a count value corresponding to a time period during which the MPU 19 stops the generation or transmission of the movement command for moving the pointer 2 on the screen 3 since the press of the determination button 8 of the operation button 11 by the user, that is, since the start of the input of the second operation signal (first time period).

The other is a count value corresponding to a time period during which the MPU 19 stops the generation or transmission of the movement command since the release of the determination button 8 pressed by the user, that is, since the cancel of the input of the second operation signal (second time period). Hereinafter, the count value corresponding to the first time period will be referred to as first count value, and the count value corresponding to the second time period will be referred to as second count value.

The first time period and the second time period may either be the same or different. Typically, the first time period and the second time period are 0.1 sec to 0.3 sec, though not limited thereto. It is also possible to allow the user to customize at least one of the first time period and the second time period.

Instead of stopping the generation or transmission of the movement command, the MPU 19 may output a signal of a movement command with the displacement amount of the pointer 2 on the screen 3 set to 0, that is, a movement command whose velocity values ($V_x(t)$, $V_y(t)$) are reset to (0, 0).

It should be noted that generally in a PC, an operation command is often executed with a cancel of an input of an operation signal input by a user via a button of a mouse, that is, a release of a pressed button as a trigger.

Referring to FIG. 17, in Steps 301 to 304, the MPU 19 executes the same processes as Steps 401 to 404 shown in FIG. 15.

When the user presses the determination button 8 (YES in Step 304), the control section 47 turns on a timer (Step 305) to start the count-up by the counter 45. The MPU 19 then stops outputting the movement command (Step 306). Alternatively, the MPU 19 continues outputting a movement command with the displacement amount of the pointer 2 set to 0 during the first time period (movement command control means).

The control section 47 compares the first count value set by the count value setting section 46 with the count value supplied from the counter 45 (Step 307). In other words, if both count values match, the first time period is ended, so the control section 47 stops the timer. If both count values do not match, the control section 47 keeps the timer operating and advances to the next Step 308. In Step 308, the MPU 19 monitors whether the pressed determination button 8 has been released, that is, whether the input of the second operation signal has been canceled. When the pressed determination button 8 is not released, the MPU 19 increments the count value by 1 (Step 309) and returns to Step 306.

As described above, the MPU 19 stops the generation or transmission of the movement command while the timer is being operated, that is, until the count value supplied from the counter 45 matches the first count value. Alternatively, the MPU 19 may continue outputting a movement command with the displacement amount of the pointer 2 on the screen 3 set to 0 during the first time period as described above. By such processing, the movement of the pointer 2 on the screen 3 is restricted even when the casing 10 is moved when the user inputs an operation signal via the determination button 8 and a movement thereof is detected by the sensor unit 17. Therefore, operations of the pointer 2, the icon 4, and the like unintended by the user can be prevented from being made. Typically, the user can easily perform a double-click operation.

When the timer is ended (YES in Step 307), the MPU 19 generates or transmits a movement command (Step 310). In this case, the pointer 2 moves on the screen 3 in accordance with the movement of the input apparatus 1. Step 310 is a state where the input of the second operation signal is not yet canceled, that is, a state where the user is moving the input apparatus 1 while maintaining a state where the determination button 8 is pressed.

In a case where the input of the second operation signal is canceled even when the timer is being operated (YES in Step 308), the MPU 19 generates or transmits a movement command as in Step 310 (Step 311).

From the state of Step 310, the MPU 19 monitors whether the pressed determination button 8 has been released, that is, whether the input of the second operation signal has been canceled (Step 312). When canceled, the control section 47 turns on the timer again (Step 313) and starts the count-up by the counter 45. The MPU 19 then stops outputting the movement command (Step 314). Alternatively, the MPU 19 continues outputting, during the second time period, a movement command with the displacement amount of the pointer 2 set to 0.

When the second count value set by the count value setting section 46 and the count value supplied from the counter 45 match (YES in Step 315), the control section 47 ends the timer to end the second time period. When the second time period is ended, the MPU 19 outputs a movement command (Step 311) to move the pointer 2. By such processing, the movement of the pointer 2 on the screen 3 is restricted even when the casing 10 is moved when the user presses and releases the determination button 8 and a movement thereof is detected by the sensor unit 17. Therefore, operations of the pointer 2, the icon 4, and the like unintended by the user can be prevented from being made. Typically, the user can easily perform a drag operation.

When the timer is not yet ended (NO in Step 315), that is, the count values do not match, the MPU 19 keeps the timer operating and advances to the next Step 316. In Step 316, the MPU 19 monitors whether the released determination button 8 has been re-pressed, that is, whether the input of the second operation signal has started again. When the determination button 8 is not pressed, the MPU 19 increments the count value by 1 (Step 317) and returns to Step 314.

When the input of the second operation signal is started even while the timer is being operated (YES in Step 316), the MPU 19 returns to Step 305 and starts the timer. Accordingly, the user can control the pointer 2 or the icon 4 without feeling awkward.

Here, in FIG. 17, after the input of the second operation signal is canceled in Step 308, the control section 47 may restart the timer by resetting it and advance to the processes of Step 313 and subsequent steps as indicated by the broken line. Accordingly, the user can control the pointer 2 or the icon 4 without feeling awkward.

The processing shown in FIG. 17 may be executed by the control apparatus 40 as in the case of FIG. 15. In this case, the control apparatus 40 receives the acceleration signals and the angular velocity signals transmitted from the input apparatus 1 (reception means) or receives the operation signal input via the operation section 23. Then, the control apparatus 40 generates a correspondence signal of the velocity values, coordinate values, and the like that correspond to the displacement amount of the pointer 2, the correspondence signal corresponding to the detection signals, and a control signal corresponding to the operation signal input by the user via the operation section 23.

The control signal generated by the control apparatus 40 is a control signal for executing various types of predetermined processing in response to the operation signals of the operation section 23 of the input apparatus 1. Taking the determination button 8 of the operation button 11 as an example, the control signal is a determination command corresponding to the second operation signal that has been input via the determination button 8.

FIG. 19 is a flowchart showing an operation of the input apparatus 1 according to still another embodiment. In descriptions on FIG. 19, points different from those of FIG. 16 will mainly be described.

In a state where the movement button 7 of the operation button 11 is not pressed by the user (NO in Step 501), the MPU 19 outputs a movement command (Step 502). When the movement button 7 is pressed and a first operation signal is thus input (YES in Step 501), the MPU 19 stops outputting the movement command or outputs a movement command with the displacement amount of the pointer 2 set to 0 (Step 503). In other words, the pointer 2 does not move on the screen 3 even when the user holds the input apparatus 1 and moves it. In Steps 504 and 505, the MPU 19 executes the same process as Step 404.

Alternatively, upon execution of Step 504, the MPU 19 may execute predetermined processing as in Step 505 after starting to output a movement command as in Step 502. Accordingly, a drag operation becomes possible. Alternatively, the MPU 19 may execute the processes of Step 305 and subsequent steps of FIG. 17 after executing Step 504.

It should be noted that since the pointer 2 is controlled so as not to move from a point the movement button 7 is pressed, the processes of Step 306 and subsequent steps of FIG. 17 do not need to be executed after Step 504. However, even when the input of the first operation signal from the movement button 7 is canceled within the first time period since the input of the second operation signal from the determination button 8, the MPU 19 may perform control so as to stop moving the pointer during the first time period.

The processing shown in FIG. 19 may be mainly executed by the control apparatus 40 as in the case of FIG. 15.

FIG. 20 is a flowchart showing an operation of the input apparatus 1 according to still another embodiment. In descriptions on FIG. 20, points different from those of FIG. 17 will be described.

When the movement button 7 is pressed by the user (YES in Step 601), the MPU 19 turns on a timer (Step 602) and starts the count-up by the counter 45. The MPU 19 then stops outputting a movement command (Step 603). Alternatively, the MPU 19 continues outputting a movement command with the displacement amount of the pointer 2 set to 0 during a third time period. The third time period may either be the same as or different from the first and second time periods and is set as appropriate.

The control section 47 compares a third count value that is set by the count value setting section 46 and corresponds to the third time period with the count value supplied from the counter 45 (Step 604), and if both count values match, stops the timer. If both count values do not match, the control section 47 keeps the timer operating and advances to the next Step 605. When the pressed movement button 7 is released in Step 605, the MPU 19 returns to Step 601, and when not, advances to Step 606.

As described above, the MPU 19 stops the generation or transmission of the movement command while the timer is being operated, that is, during the third time period, or continues outputting the movement command with the displacement amount of the pointer 2 on the screen 3 set to 0 during the third time period. By such processing, the movement of the pointer 2 on the screen 3 is restricted even when the casing 10 is moved when the user inputs a first operation signal via the movement button 7 and a movement thereof is detected by the sensor unit 17. Therefore, operations of the pointer 2, the icon 4, and the like unintended by the user can be prevented from being made.

When the timer is ended (YES in Step 604), the MPU 19 generates or transmits a movement command (Step 614). In this case, it becomes possible to move the pointer 2 on the screen 3 in accordance with the movement of the input apparatus 1.

When a second operation signal is input by the user via the determination button 8 in Step 606, the MPU 19 executes the same processes as Steps 305 to 317 above in Steps 608 to 620. When a second operation signal is not input via the determination button 8 in Step 606, the count value of the timer that has started to operate in Step 602 is incremented by 1 (Step 607), and the process returns to Step 603.

In this embodiment, the user can operate the pointer or the like without feeling awkward in a case where the user successively makes operational inputs via the movement button 7 and the determination button 8. Typically, the user can carry out a double-click operation and a drag operation without feeling awkward.

FIG. 21 is a schematic diagram showing a structure of an input apparatus according to another embodiment. In descriptions below, descriptions on components, functions, and the like that are the same as those of the input apparatus 1 according to the embodiment shown in FIGS. 2, 3, and the like will be simplified or omitted, and different points will mainly be described.

An input apparatus 91 is a pen-type input apparatus elongated in one direction. The input apparatus 91 includes a casing 90, the sensor unit 17, the control unit 30, the batteries 14, an operation section 95, and the like. The sensor unit 17 is provided at an end portion 90a inside the casing 90, for example.

The operation section 95 typically includes a push portion 96 and a double-action-type push button 97 capable of making a 2-step switch by a linear push by the user. The push portion 96 is a portion where the user pushes with a finger. One end 96a of the push portion 96 is fixed to the casing 90, and the other end 96b is a spring-like free end. By the push portion 96 being pressed toward the casing 90, a protrusion 96c provided on the push portion 96 pushes the push button 97. For example, the user is capable of moving the casing 90 while holding it and aiming the sensor unit 17 side of the casing 90 at the display apparatus 5, and pressing the push portion 96 with a thumb, an index finger, or the like.

It should be noted that the push portion 96 may be structured to include a function of a clip generally provided to a pen, but is of course not limited to such a structure.

FIG. 22(A) is a schematic diagram showing a structure of the push button 97. The push button 97 includes a main body 57 including a circuit board 64, a stroke portion 53 connected to the main body 57 via an elastic member 52 and with which the protrusion 96c of the push portion 96 is capable of coming into contact, a connecting wire 54 provided in the stroke portion 53, and terminals 58A, 59A, 58B, and 59B provided on the circuit board 64. A spring, for example, is used for the elastic member 52, but a different member may be used instead.

A member having a larger area than a tip end portion of the stroke portion 53 may be attached to the tip end portion of the stroke portion 53 so that the protrusion 96c of the push portion 96 can be pressed more easily.

By pressing down the stroke portion 53 a predetermined distance D1 against a spring force of the elastic member 52 as shown in FIG. 22(B) from the state shown in FIG. 22(A), the terminals 58A and 59A are connected by the connecting wire 54 provided in the stroke portion 53. As shown in FIG. 22(C), by additionally pressing down the stroke portion 53 against the spring force from the state shown in FIG. 22(B), the terminals 58B and 59B are connected by the connecting wire 54 while maintaining the connected state of the terminals 58A and 59A by the connecting wire 54. The distance the stroke portion 53 is pressed down from its initial position in FIG. 22(C) is represented by D2.

In other words, the connecting wire 54 and the terminals 58A and 59A constitute a first switch, whereas the connecting wire 54 and the terminals 58B and 59B constitute a second switch.

The distance D1 and the distance D2−D1 may either be the same or different, and values thereof can be set as appropriate. Forces required for the strokes can also be set as appropriate.

In addition to the push button 97 as described above, operation buttons shown in FIG. 6 that issue various operation commands may be provided as the operation section 95.

The input apparatus 91 that includes such a push button 97 can also execute processing the same as those of FIGS. 12, 15, 16, 17, 19, and 20 and thus obtain the same operational effect.

Next, an input apparatus according to another embodiment will be described.

FIG. 23 is a perspective view showing an input apparatus 51. FIG. 24 is a side view of the input apparatus 51 seen from the wheel button 13 side. In the following, descriptions on components, functions, and the like that are the same as those of the input apparatus 51 according to the embodiment shown in FIG. 2 and the like will be simplified or omitted, and different points will mainly be described.

A casing 50 of the input apparatus 51 includes a partial sphere or partial quadric surface 50*a* at a predetermined position on a surface of the casing 50. Hereinafter, the partial sphere or quadric surface (50*a*) will be referred to as "lower curved surface" (50*a*) for convenience.

The lower curved surface 50*a* is formed at a position almost opposite to the buttons 11 and 12, that is, a position where, when a user holds the input apparatus 51, a pinky is located closer to the lower curved surface 50*a* than other fingers. Alternatively, in a case where, in the casing 50 elongated in one direction (Z'-axis direction), the sensor unit 17 is provided on a positive side of the Z' axis with respect to a longitudinal center of the casing 50 in the Z'-axis direction, the lower curved surface 50*a* is provided on a negative side of the Z' axis.

Typically, the partial sphere is substantially a hemisphere, but does not necessarily have to be a hemisphere. The quadric surface is a curved surface obtained by expanding a 2-dimensional conic curve (quadric curve) into a 3-dimensional conic curve. Examples of the quadric surface include an ellipsoid surface, an ellipsoid paraboloid surface, and a hyperbolic surface.

With the configuration of the casing 50 of the input apparatus 51 as described above, a user can easily operate the input apparatus 51 while causing the lower curved surface 50*a* of the input apparatus 51 as a fulcrum to abut on an abutment target object 49 such as a table, a chair, a floor, or a knee or thigh of a user. That is, even in the state where the lower curved surface 50*a* of the input apparatus 51 is abutted on the abutment target object 49, the user can easily tilt the input apparatus 51 in diverse angles, thereby enabling delicate operations such as placing the pointer on the icon to be made. FIG. 25 is a diagram showing the state where the user operates the input apparatus 51 while causing the lower curved surface 50*a* to abut on the knee.

Alternatively, in this embodiment, erroneous operations due to a hand movement, which cannot be suppressed by a hand-movement correction circuit, can be prevented from occurring, and the user is free from fatigue that is caused when the user operates the input apparatus 51 in the air.

FIG. 26 is a perspective view of an input apparatus according to still another embodiment of the present invention.

A casing 60 of an input apparatus 61 includes, similar to the input apparatus 61 shown in FIGS. 23 and 24, a lower curved surface 60*a* constituted of a partial sphere. A plane that is perpendicular to a maximum length direction (Z'-axis direction) of the casing 60 of the input apparatus 61 and is in contact with the lower curved surface 60*a* (hereinafter, referred to as "lower end plane 55" for convenience) is substantially parallel to a plane formed by the X axis and the Y axis (see FIG. 9) as detection axes of the angular velocity sensor unit 15 (X-Y plane).

With the structure of the input apparatus 61 as described above, in a case where an operation is made by the user while the lower curved surface 60*a* is abutted on the lower end plane 55, angular velocities applied to the input apparatus 61 are input to the angular velocity sensor unit 15 as they are. Thus, an amount of calculation required to obtain detection values from the detection signals from the angular velocity sensor unit 15 can be reduced.

FIG. 27 is a front view showing an input apparatus according to yet another embodiment of the present invention. FIG. 28 is a side view showing the input apparatus.

A lower curved surface 70*a* of a casing 70 of an input apparatus 71 is, for example, a partial sphere. The lower curved surface 70*a* is set with a larger curvature radius than the lower curved surfaces 50*a* and 60*a* of the input apparatuses 51 and 61 shown in FIGS. 23 and 26. The angular velocity sensor unit 15 is provided at a position at which a straight line contained in the X-Y plane formed by the X axis and the Y axis as the detection axes of the angular velocity sensor unit 15 corresponds to a tangent line of a virtually-drawn circle 56 that passes the partial sphere when seen from the X- and Y-axis directions. As long as the conditions as described above are satisfied, the angular velocity sensor unit 15 may be arranged in the casing 70 such that the X-Y plane of the angular velocity sensor unit 15 is tilted with respect to a longitudinal direction of the input apparatus 71 (see FIG. 27).

Accordingly, because a direction of the vector of the angular velocity generated when the user operates the input apparatus 71 while abutting the lower curved surface 70*a* thereof on the abutment target object 49 and the detection direction of the angular velocity sensor unit 15 match, a linear input thus becomes possible.

FIG. 29 is a front view of an input apparatus according to still another embodiment of the present invention.

A sphere as a lower curved surface 80*a* of a casing 80 of an input apparatus 81 has a curvature radius the same as or close to that shown in FIG. 26, for example. Regarding the angular velocity sensor unit 15, a virtual straight line that passes an intersection of the X axis and the Y axis as a center point of the angular velocity sensor unit 15 and is orthogonal to the X axis and the Y axis passes a center point O of a first sphere 62 including the lower curved surface 80*a*. With the structure as described above, the first sphere 62 including the lower curved surface 80*a* and a second sphere 63 in which the straight line contained in the X-Y plane of the angular velocity sensor unit 15 becomes a tangent line are arranged concentrically. Therefore, the input apparatus 81 bears the same effect as the input apparatus 71 shown in FIG. 27.

It should be noted that the input apparatus 51, 61, 71, or 81 including the partial sphere or the partial quadric surface described above does not necessarily need to be operated by the user while the lower curved surface 50*a*, 60*a*, 70*a*, or 80*a* thereof is abutted against the abutment target object 49, and may of course be operated in air.

An embodiment of the present invention is not limited to the above embodiments, and various modifications may be made.

Heretofore, the push buttons 11 and 97 have been exemplified as the structures of the operation sections 23 and 95 for realizing the first switch and the second switch. However, the present invention is not limited thereto, and a slide type, a rotary type, a bar type that is operated with one end as a fulcrum, and the like are also possible. The same holds true for embodiments to be described later.

In the above embodiments, the displacement amounts of the pointer 2 have been controlled based on the detection signals of the acceleration sensor unit 16, and the detection signals of the angular velocity sensor unit 15 have served an auxiliary role. However, the displacement amounts of the pointer 2 may be controlled based on the detection signals of the angular velocity sensor unit 15. The same holds true for embodiments to be described later.

In this case, for example, the input apparatus 1 (or input apparatus 91, input apparatus 200 to be described later, and the like) or the control apparatus 40 can obtain displacement amounts of a yaw angle and a pitch angle per unit time, that is, every predetermined number of clocks. For example, the MPU 35 of the control apparatus 40 generates coordinate values of the pointer 2 on the screen 3 that correspond to the obtained displacement amounts of the yaw angle and the pitch angle per unit time. The display control section 42 controls display so that the pointer 2 moves on the screen 3. The displacement amount of the yaw angle corresponds to the displacement amount of the pointer 2 on the X axis, and the displacement amount of the pitch angle corresponds to the displacement amount of the pointer 2 on the Y axis.

In this case, the MPU 35 only needs to obtain the displacement amounts of the pointer 2 on the screen 3 per unit time that correspond to the displacement amounts of the yaw angle and the pitch angle per unit time by a calculation or by operations or a correspondence table stored in the ROM 37 in advance.

In the above embodiments, the descriptions have been given on the biaxial acceleration sensor unit and the biaxial angular velocity sensor unit. However, the present invention is not limited thereto, and the input apparatus 1 (or input apparatus 91, input apparatus 200 to be described later, and the like) may include triaxial acceleration sensors and triaxial angular velocity sensors, the three axes being mutually orthogonal, or may include only one of the two types of sensors, for example. Even with the structures as described above, the processing shown in FIGS. 12, 15, 16, 17, 19, and 20 can still be realized. The same holds true for embodiments to be described later. Alternatively, the input apparatus 1 (or input apparatus 91, input apparatus 200 to be described later, and the like) may include a uniaxial acceleration sensor or a uniaxial angular velocity sensor. Typically in the case where a uniaxial acceleration sensor or a uniaxial angular velocity sensor is provided, a plurality of UIs as pointing targets of the pointer 2 displayed on the screen 3 are arranged uniaxially on the screen.

Alternatively, the input apparatus 1 (or input apparatus 91, input apparatus 200 to be described later, and the like) may include a geomagnetic sensor, an image sensor, and the like instead of the acceleration sensors and the angular velocity sensors.

The above embodiments have described an example in which the second operation signal from the determination button 8 is switched ON/OFF while the first operation signal is being input from the movement button 7. However, the present invention is not limited thereto, and the second operation signal from the determination button 8 may be input in a state where the input of the first operation signal from the movement button 7 is canceled. In other words, the input of the first operation signal is canceled when the determination button 8 is ON, and the movement of the pointer 2 is thus restricted. Accordingly, although a drag operation cannot be made, an operation corresponding to a determination command of the user can be positively made on a target icon 4, with the result that unintentional operations can be prevented from being made and footwork becomes lighter.

For realizing such a structure, to describe it with reference to the schematic diagrams of FIG. 30, for example, a connecting wire 154 having a smaller height than the connecting wire 54 (see FIG. 22), for example, only needs to be provided in the stroke portion 53. In this case, by pressing the stroke portion 53, the terminals 58A and 59A are connected by the connecting wire 154 (see FIG. 30(B)), and by additionally pressing the stroke portion 53 thereafter, the connection of the terminals 58A and 59A is released. Upon release of the connection of the terminals 58A and 59A, the terminals 58B and 59B are connected by the connecting wire 154 (see FIG. 30(C)). Alternatively, in a case where the two push buttons shown in FIGS. 7(A) to 7(C) are provided, for example, an internal switch may be provided in the movement button 7 so that, when shifting from the state shown in FIG. 7(B) to the state shown in FIG. 7(C), an input of the first operation signal is canceled at a time the movement button 7 is pressed.

Next, an input apparatus according to still another embodiment will be described.

In descriptions below, parts having the same functions as those of the above embodiments are denoted by the same symbols, and descriptions thereof will be simplified or omitted. This embodiment is different from the above embodiments in that the first switch that switches an output of a light-receiving signal based on a user operation is a sensor. In descriptions below, that point will mainly be described. It should be noted that the sensor included in the input apparatus of this embodiment is a member that switches an output of a signal based on a user operation to the operation section and is included in a switch in a broad sense.

FIG. 31 is a perspective view of the input apparatus of this embodiment. As shown in FIG. 31, an input apparatus 200 includes a casing 210 including an upper casing 210a and a lower casing 210b and an operation section 223 including various buttons 211 to 214 arranged on an upper surface 210c of the casing 210. The casing 210 has a pen-type structure that is elongated in one direction and is of a size that a user is capable of holding. The operation section 223 includes a determination button 211 provided at an end portion of the upper surface 210c of the casing 210, a center button 212 provided near the center of the upper surface 210c, and buttons 213 and 214 interposed between the determination button 211 and the center button 212. Those buttons 211, 212, 213, and 214 are each a push button.

The determination button 211 typically has a function corresponding to a right button of a mouse, and the center button 212 has a function corresponding to a left button of a mouse. For example, on the screen 3, an operation of selecting an icon 4 (see FIG. 5) is executed by clicking the determination button 211, and an operation of opening a file is executed by double-clicking the determination button 211. Details on a case where the determination button 211 is operated will be described later.

The button 213 has, for example, a function as a forward button for forwarding an image displayed on the screen 3 to a next image, and the button 214 has a function as a back button for redisplaying an image right before the one being displayed on the screen 3. The functions of the buttons 213 and 214 may be exchanged.

The operation section 223 may include, in addition to those buttons 211 to 214, for example, various buttons 29 such as those provided to a TV remote controller and a power supply button 28 (FIG. 6). Alternatively, the buttons 212 to 214 may be provided with those functions.

FIG. 32 is a diagram showing the operation section 223, and FIG. 33 is a diagram showing the operation section 223 from a lower side. Moreover, FIG. 34 is a diagram showing the operation section 223 provided inside the upper casing 210a of the input apparatus 200 from the lower side.

As shown in those figures, the operation section 223 includes the buttons 211 to 214 and a plurality of switches 215a to 215d arranged in a pressing direction of those buttons. The determination button 211 and the center button 212 are connected via a plate spring 241. The determination button 211, the center button, and the plate spring 241 constitute a single operation member 240. The plate spring 241 is frame-like, for example.

The plate spring 241 includes a base portion 241c, a first plate spring portion 241a, and a second plate spring portion 241b. The first plate spring portion 241a extends in a predetermined direction from the base portion 241c and is connected with the determination button 211 at an end portion on the other side of the base portion 241c. The second plate spring portion 241b extends in an opposite direction from the predetermined direction from the base portion 241c and is connected with the center button 212 at an end portion on the other side of the base portion 241c. For example, the second plate spring portion 241b includes a connection portion 241d that extends in the predetermined direction from the end portion on the other side of the base portion 241c and elastically connects that end portion and the center button 212.

The first plate spring portion 241a includes, for example, two frames 244, and the buttons 213 and 214 are arranged between the two frames 244. The second plate spring portion 241b includes, for example, two frames 247 that are connected to the connection portion 241d at the end portion, and the center button 212 is disposed between the two frames 247.

Holes 242a and 242b are provided on the base portion 241c, for example. By fitting screws, pins, or other connection members in those holes 242a and 242b, the operation member 240 is supported by the upper casing 210a.

FIG. 32 has shown the example in which the center button 212 is connected to the second plate spring portion 241b via the connection portion 241d. However, the present invention is not limited thereto, and the center button 212 may be directly connected to the frames 247 extending in the direction opposite to the predetermined direction extending from the base portion 241c. In this case, a frame length only needs to be set as appropriate in order to adjust an elastic force generated when the center button 212 is pressed. Similar to the second plate spring portion 241b, the first plate spring portion 241a may include a connection portion that extends toward the base portion 241c from the end portion side of the first plate spring portion 241a so that the determination button 211 is connected to that connection portion.

As shown in FIG. 33, the determination button and the center button respectively include protrusions 243a and 243b at bottom portions thereof. Further, a flexible substrate 245 is connected at a bottom portion of the determination button 211. The flexible substrate 245 is a substrate that electrically connects an optical sensor 252 and a main substrate 246 to be described later.

FIG. 35 is a diagram showing the lower casing 210b and the main substrate 246 from an upper side.

As shown in FIG. 35, the input apparatus 200 includes the main substrate 246 inside the casing 210. On the main substrate 246, the switches 215a to 215d that constitute a part of the operation section 223 are arranged, and those switches are electrically connected to the main substrate 246. Moreover, the MPU 19, the crystal oscillator 20, the transmitting device 21, the antenna 22, and the like are mounted on the main substrate 246 (see FIG. 3).

FIG. 36 is a schematic diagram showing an internal structure of the input apparatus 200.

As shown in FIG. 36, the input apparatus 200 includes, in addition to the casing 210, the operation section 223, and the main substrate 246, the batteries 14 such as dry cell batteries and rechargeable batteries and the sensor unit 17 (motion sensor). The circuit board 25 of the sensor unit is connected to the main substrate 246 via a flexible conductive wire 248. The conductive wire 248 is constituted of, for example, an FFC (Flexible Flat Cable).

The angular velocity sensor unit 15 is mounted on a front surface of the circuit board 25, whereas the acceleration sensor unit 16 is mounted on a back surface of the circuit board 25. The positions of the angular velocity sensor unit 15 and the acceleration sensor unit 16 may be opposite. As described above, in this embodiment, the angular velocity sensor unit 15 and the acceleration sensor unit 16 are separately mounted on different sides of the circuit board 25. With this structure, a size of the circuit board 25 can be reduced as compared to a case where both the angular velocity sensor unit 15 and the acceleration sensor unit 16 are mounted on one surface of the circuit board 25. As a result, rigidity of the circuit board 25 can be enhanced.

FIG. 37 is a cross-sectional diagram of the determination button 211. As shown in FIG. 37, the determination button 211 includes a cylindrical body 250 that has a hollow portion 251. The optical sensor (sensor) 252 is disposed inside the hollow portion 251 of the cylindrical body 250, and a lens member 255 that collects light emitted from the optical sensor 252 is disposed above the optical sensor 252. The protrusion 243a is provided below the cylindrical body 250. The switch 215a provided on the main substrate 246 is arranged in a pressing direction of the determination button 211.

The flexible substrate 245 is provided on a bottom surface 250c inside the cylindrical body 250. The flexible substrate 245 is constituted of, for example, an FPC (Flexible Printed Circuit). On a side surface 250b of the cylindrical body 250, an opening 254 is formed so as to communicate with the hollow portion 251, and the flexible substrate 245 is drawn out via the opening 254 to be electrically connected to the main substrate 246 (see FIG. 36). The optical sensor 252 is disposed on the flexible substrate 245 and electrically connected thereto. It should be noted that an illustration of the lens member 255 is omitted in FIGS. 31 and 32.

The optical sensor 252 is a reflection-type optical sensor and includes a light-emitting device 252a and a light-receiving device 252b. An LED (Light Emitting Diode) is typically used for the light-emitting device 252a, but an LD (Laser Diode) or any other devices may be used as long as it emits light. A phototransistor is typically used for the light-receiving device 252b, but a photo IC (Integrated Circuit) or any other devices may be used as long as it is capable of detecting light emitted from the light-emitting device 252a. Typically used as an optical wavelength is a wavelength within a range of infrared rays, but a wavelength of visible light or other wavelengths may also be used. The light-emitting device 252a may constantly emit light or emit light cyclically.

The lens member 255 is formed as a convex lens, and a lower surface 255b of the lens member 255 is formed as a hemisphere (hereafter, lower surface 255b may be referred to as lower curved surface 255b). On the other hand, an upper surface 255a of the lens member 255 is a curved surface having a larger curvature radius than the lower curved surface 255b. Together with an upper surface 250a of the cylindrical body 250, the upper surface 255a of the lens member 255 constitutes a surface of the determination button 211. By thus constituting the lens member 255, light emitted from the light-emitting device 252a can be collected and the collected light can be made parallel on the lens member 255. As a result, an area in which the optical sensor 252 can detect a body part (e.g., finger) of a user (detection area) can be formed almost perpendicularly on the lens member 255. The lens member 255 is formed of, for example, a resin having optical transparency. Examples of the resin having optical transparency include polycarbonate and an acrylic resin.

FIG. 37 has shown the example in which the lower curved surface 255b has a smaller curvature radius than the upper surface 255a. However, the curvature radius of the upper surface may be formed to be smaller than the curvature radius of the lower surface. The upper surface 255a of the lens member 255 may be a plane instead of a curved surface. Alternatively, the lens member 255 may have a form of a prism instead of a convex lens.

In this embodiment, by the optical sensor 252 and the lens member 255, the detection area in which the optical sensor 252 can detect a body part of a user above the lens member 255 (above determination button 211) is formed, and presence of a finger can be detected when the user moves his/her finger to the detection area. It should be noted that a length L of the detection area can be adjusted by controlling an output of the light-emitting device 252a of the optical sensor.

A light shield plate 256 capable of shielding light is interposed between the light-emitting device 252a and the light-receiving device 252b. The light shield plate 256 is bonded to a main body of the optical sensor (or flexible substrate 245) at one end portion thereof and bonded to the lower surface 255b of the lens member 255 at the other end portion thereof. Due to the light shield plate 256, light emitted from the light-emitting device 252a can be prevented from being directly received by the light-receiving device 252b. Furthermore, it is possible to prevent light emitted from the light-emitting device 252a and reflected by the lower surface 255b of the lens member 255 from being received by the light-receiving device 252b.

An antireflection film may be formed on the upper surface 255a of the lens member 255. Accordingly, light emitted from the light-emitting device 252a and reflected by the upper surface 255a of the lens member 255 can be prevented from being received by the light-receiving device 252b. Alternatively, an antireflection film may be formed on not only the upper surface 255a of the lens member 255 but also the lower surface 255b of the lens member 255. A film thickness of the antireflection film is set as appropriate in consideration of a wavelength of light emitted from the light-emitting device 252a.

Here, since the optical sensor 252 is fixed inside the cylindrical body 250 as described above, a positional relationship between the optical sensor 252 and the lens member 255 does not fluctuate. Therefore, it is possible to stabilize a level of light reflected by the upper surface 255a of the lens member 255, for example. Accordingly, it is possible to prevent light from being detected by the light-receiving device 252b when a finger of a user is not present in the detection area. In addition, the detection area can be stably formed above the lens member 255.

Next, with reference to FIGS. 32, 37, and the like, an operation of the operation member 240 at a time the determination button 211 and the center button 212 are pressed by the user will be described.

When the determination button 211 is pressed by the user, the determination button 211 and the first plate spring portion 241a turn with A1 and A2 as a fulcrum. Then, the protrusion 243a provided below the determination button 211 comes into contact with the switch 215a to electrically turn on the switch 215a. When the user releases the pressing finger, the determination button 211 and the first plate spring portion 241a turn again with A1 and A2 as a fulcrum using an elastic force and are thus restored to their original positions, and the switch 215a is electrically turned off.

When the user presses the center button 212, the center button, the connection portion 241d, and the second plate spring portion 241b turn with A1, A2, and B (part where connection portion 41d and second plate spring portion 241b connect) as a fulcrum. Then, the protrusion 243b provided below the center button 212 comes into contact with the switch 215b to electrically turn on the switch 215b. When the user releases the pressing finger, the center button 212, the connection portion 241d, and the second plate spring portion 241b turn again with A1, A2, and B as a fulcrum using an elastic force and are thus restored to their original positions, and the switch 215b is electrically turned off.

Next, an internal operation of the input apparatus 200 carried out when the determination button 211 is operated will be described. FIG. 38 is a flowchart showing the operation of the input apparatus 200.

In a state where the user has not moved his/her finger to the detection area, the light-receiving device 252b does not detect light emitted from the light-emitting device 252a. Thus, the MPU 19 is not input with a light-receiving signal from the optical sensor 252 (NO in Step 701). In this case, the MPU 19 is not outputting a movement command (signal containing information on velocity values) or is outputting a movement command with a displacement amount of the pointer 2 set to 0 (($V_x$, $V_y$)=(0, 0)) (Step 702).

In other words, in a state where the user has not moved his/her finger to the detection area, the pointer 2 does not move even when the user holds and moves the input apparatus 200. Accordingly, by not moving the finger to the detection area when wishing to keep the pointer 2 stopped, the pointer can be kept stopped.

When the user moves the finger to the detection area above the determination button 211 or touches the upper surface 255a of the lens member 255 with the finger, light emitted from the light-emitting device 252a is reflected by the finger of the user and detected by the light-receiving device 252b. In this case, the light-receiving device 252b outputs a light-receiving signal. When judging that the light-receiving signal has been input (judgment means) (YES in Step 701), the MPU 19 starts outputting a movement command (Step 703). In other words, when a body part of the user is detected to be present in the detection area, the MPU 19 controls the output of the movement command so that the pointer 2 starts moving (output control means).

When the output of the movement command is started, the movement of the pointer 2 is started and the pointer 2 moves in accordance with a 3-dimensional operation of the input apparatus 200 made by the user (see FIG. 8). Accordingly, when wishing to start moving the pointer 2, the user can start moving the pointer 2 by moving his/her finger to the detection area.

Here, the velocity values are typically calculated by the method shown in FIG. 15 above. As a result, the movement of the pointer 2 on the screen 3 can be made a natural movement that matches an intuition of the user. However, the velocity values do not always need to be calculated by the method shown in FIG. 15 and may be calculated by simply integrating acceleration values, for example. Alternatively, velocity values calculated by a different method may be used.

When the user removes the finger in the detection area from the detection area, the light-receiving device 252b is unable to detect the light emitted from the light-emitting device 252a, and the output of the light-receiving signal from the optical sensor 252 is thus stopped. Upon judging that the input of the light-receiving signal has been canceled (YES in Step 704), the MPU 19 stops outputting the movement command or starts outputting a movement command set to 0 (Step 705). Accordingly, when wishing to stop the movement of the pointer 2 again, the user can keep the pointer stopped by removing the finger from the detection area.

On the other hand, when the user presses the determination button 211 with the finger in the detection area, the switch 215a is turned on and an output of an operation signal from the switch 215a is started. In this case, the input of the operation signal from the switch 215a is started while the finger of the user is being detected in the detection area. When judging that the input of the operation signal has started while the light-receiving signal is being input (NO in Step 704) (YES in Step 706), the MPU 19 outputs a determination command (output control means) (Step 707). Alternatively, the MPU 19 may output a determination command when the user releases the finger pressing the determination button 211 and the input of the operation signal from the switch 215a is thus canceled.

Upon being input with the determination command output from the input apparatus 200, the MPU 35 of the control apparatus 40 executes predetermined processing. For example, if a position of the pointer 2 at a time the determination command is input is on an icon 4, the MPU 35 of the control apparatus 40 executes processing of selecting that icon 4 or activates an application program corresponding to that icon 4.

By the processing shown in FIG. 38, the user can perform an operation of, for example, selecting an icon on the screen 3 by moving the pointer 2 on the screen 3 and placing it on an icon in a state where the finger is in the detection area, and pressing the determination button 211 with the finger in the detection area. In other words, according to the input apparatus 200 of this embodiment, for example, it becomes possible for the user to intuitively operate the GUI on the screen 3 by a series of simple operations using a finger, including moving a finger to the detection area and pressing with the finger in the detection area. Furthermore, since the user can move the pointer 2 while his/her finger is in the detection area or while touching the surface of the determination button 211 with the finger, the user can operate the determination button 211 without stress.

Although this embodiment has described a case where a movement command is output when a finger of the user is in the detection area, it is also possible to stop the output of the movement command when the user has his/her finger in the detection area as in the flowchart shown in FIG. 19. In this case, the user can keep the pointer stopped by moving the finger to the detection area above the determination button 211, and start moving the pointer by removing the finger from the detection area.

The processing shown in FIG. 38 may be mainly executed by the control apparatus 40 as in the case of FIG. 15. In this case, the control apparatus 40 receives information on acceleration values and angular velocity values transmitted from the input apparatus 200 (reception means). The control apparatus 40 also receives information on a light-receiving signal (presence information) from the optical sensor 252. Upon receiving the acceleration values and the angular velocity values, the MPU 35 of the control apparatus 40 calculates velocity values based on the acceleration values and the angular velocity values and outputs them as a control signal. The display control section 42 then controls display so that the pointer 2 moves on the screen 3 at a predetermined velocity corresponding to the velocity values (display control means). The MPU 35 controls whether to output a control signal based on the information on the light-receiving signal.

Next, another embodiment of the input apparatus 200 will be described. It should be noted that in descriptions below, an embodiment of a case where the light-emitting device 252a of the optical sensor 252 emits light in a predetermined cycle T will be described in particular.

The input apparatus 200 uses wireless communication and further includes a plurality of sensors, thus resulting in a problem that power consumption is large. In this regard, in this embodiment, for realizing power-saving of the optical sensor 252, the light-emitting device 252a is caused to emit light in a predetermined cycle so as to detect whether a body part of a user is present in the detection area.

FIG. 39(A) is a circuit diagram of the optical sensor 252 according to this embodiment. FIG. 39(B) is a diagram showing a state where light emitted from the light-emitting device 252a is input to the light-receiving device 252b when a finger of a user is present in the detection area.

As shown in the figures, the optical sensor 252 includes a photodiode as the light-emitting device 252a and a phototransistor as the light-receiving device 252b. On an anode side of the light-emitting device 252a, a resistor of 330Ω is connected, for example, and on an emitter side of the light-receiving device 252b, a resistor of 100 kΩ is connected, for example. Moreover, a cathode side of the light-emitting device 252a and the emitter side of the light-receiving device 252b are grounded. A pulse-like voltage is supplied to the light-emitting device 252a in the predetermined cycle T, and a voltage is successively supplied to the light-receiving device 252b from a power source. The power supply is typically controlled by the MPU 19, but it may be controlled by other methods (voltage control means). The reason why a pulse-like voltage is supplied to the light-emitting device 252a in the cycle T and a voltage is successively supplied to the light-receiving device 252b will be described later in detail.

FIG. 40 are diagrams showing a relationship between a voltage supplied to the light-emitting device 252a and a voltage output from the light-receiving device 252b. FIG. 40(A) is a diagram showing a voltage supplied to the light-emitting device 252a, and FIG. 40(B) is a diagram showing a voltage output from the optical sensor 252.

As shown in FIG. 40(A), the light-emitting device 252a is supplied with a pulse voltage in the predetermined cycle T, and the light-emitting device 252a intermittently emits light in the predetermined cycle T. The cycle T is typically 10 ms to 20 ms, though not limited thereto. It may alternatively be 10 ms or less or 20 ms or more. A pulse width $\tau$ is typically 0.5 ms to 1.5 ms, but it may be 0.5 ms or less or 1.5 ms or more.

As shown in FIG. 40(B), since the light-receiving device 252b does not detect light when a finger of a user is not present in the detection area above the determination button 211 (see left-hand side of FIG. 40(B)), an output voltage from the optical sensor 252 becomes 0. On the other hand, when a finger of a user is on the determination button 211, the light-receiving device 252b detects light reflected by the finger of the user in the detection area and outputs a pulse-like voltage (see right-hand side of FIG. 40(B)). Since the cycle T of the voltage output from the optical sensor 252 is synchronized with the cycle T in which the light-emitting device 252a emits light, it practically matches the cycle T of the voltage supplied to the light-emitting device 252a. Similarly, the pulse width $\tau$ of the output voltage practically matches the pulse width $\tau$ supplied to the light-emitting device 252a. When the pulse-like output voltage from the optical sensor 252 exceeds a threshold value, the MPU 19 judges that a light-receiving signal is being input. The MPU 19 only needs to execute the processing shown in FIG. 38 above based on the judgment on whether the light-receiving signal is being input.

Next, the reason why the light-emitting device 252a is supplied with a pulse-like voltage in a predetermined cycle and the light-receiving device 252b is successively supplied with a voltage will be described.

FIG. 41 is a circuit diagram of a general photo-reflector. FIG. 42 are diagrams showing an output voltage in a case where the photo-reflector is supplied with a pulse-like voltage.

As shown in FIG. 41, a light-emitting device 270a and a light-receiving device 270b of a photo-reflector 270 are connected in parallel. In a state where the light-emitting device 270a and the light-receiving device 270b are connected in parallel as described above, a pulse-like voltage is supplied to each of the light-emitting device 270a and the light-receiving device 270b. As a result, irrespective of the fact that the light-receiving device 270b has not detected light, the light-receiving device 270b outputs a light-receiving signal (see left-hand side of FIG. 42(B)). In other words, when a pulse voltage is supplied to both the light-emitting device 270a and the light-receiving device 270b, irrespective of the fact that the light-receiving device 270b has not detected light, the light-receiving device 270b outputs a signal as if having detected light. If for instance, a pulse voltage is supplied to the photo-reflector 270 while using the photo-reflector 270 as an optical sensor of the input apparatus 200, a light-receiving signal is output from the photo-reflector 270 even though a finger is not present in the detection area, thus resulting in a fear that the MPU 19 may misjudge the input of the light-receiving signal.

The reason why the light-receiving device 270b outputs a light-receiving signal even though the light-receiving device 270b has not detected light is considered to be because, when a pulse voltage is supplied to the light-receiving device 270b, a floating capacitance is generated in the light-receiving device 270b.

In this regard, in this embodiment, the light-emitting device 252a is supplied with a pulse voltage in a predetermined cycle for saving power, whereas the light-receiving device 252b is successively supplied with a voltage for preventing a false light detection. Accordingly, power-saving can be realized appropriately and a false light detection can be prevented from occurring.

It should be noted that even when a voltage is successively supplied to the light-receiving device 252b, a current that flows through the light-receiving device 252b is as small as about 1/1000 the current that flows through the light-emitting device 252a, which is of no problem in terms of power-saving.

Next, an embodiment of an operation of the input apparatus 200 carried out when the optical sensor 252 emits light in a predetermined cycle will be described.

FIG. 43 is a flowchart showing the operation of the input apparatus 200 of this embodiment.

First, the MPU 19 supplies a pulse voltage to the light-emitting device 252a (see FIG. 40(A)) and causes the light-emitting device 252a to emit light (Step 801). The cycle T in which the light-emitting device 252a emits light is set to be 10 ms to 20 ms as described above. In descriptions below, the cycle in which the light-emitting device 252a emits light will be referred to as light emission cycle T.

Next, the MPU 19 judges whether a light-receiving signal from the optical sensor 252 is input (Step 802). Here, a cycle in which the MPU 19 judges whether a light-receiving signal is input is typically synchronized with the light emission cycle T of the light-emitting device 252a (see FIG. 40(A)). For example, when the light emission cycle T in which the light-emitting device 252a emits light is 16 ms, the judgment cycle of the MPU 19 is also 16 ms.

When judging that a finger of a user is present in the detection area and a light-receiving signal from the optical sensor 252 is thus being input (YES in Step 802), the MPU 19 obtains angular velocity values ($\omega_y$, $\omega_x$) from the angular velocity sensor unit 15 and acceleration values ($a_x$, $a_y$) from the acceleration sensors (Step 803). Upon obtaining the acceleration values and the acceleration values, the MPU 19 calculates velocity values ($V_x$, $V_y$) (Step 804) and outputs the velocity values as a movement command (Step 805). Then, the MPU 19 returns to Step 801 and causes the optical sensor 252 to emit light again.

In other words, when a finger of a user continues to be present in the detection area, the MPU 19 repeats the processes of obtaining acceleration values and angular velocity values from the sensor unit 17 (Step 803), calculating velocity values (Step 804), and outputting the velocity values (Step 805). In descriptions below, a cycle time in obtaining angular velocity values and acceleration values, calculating velocity values, and outputting the velocity values will be referred to as command output cycle T'. The command output cycle T' is set so as to coincide with the light emission cycle T. For example, when the light emission cycle T of the optical sensor 252 (light-emitting device 252a) is 16 ms, the command output cycle T' is also 16 ms.

On the other hand, when judging that a finger of a user is not present in the detection area and a light-receiving signal from the optical sensor 252 is thus not input (NO in Step 801), the MPU 19 causes the optical sensor 252 to emit light again after an elapse of the light emission cycle T since the last time the optical sensor 252 has emitted light. Moreover, when judging that a light-receiving signal from the optical sensor 252 is not input (NO in Step 802), the MPU 19 does not calculate velocity values and does not output a movement command. In other words, since there is no need to output a movement command when a finger of the user is not present in the detection area, the MPU 19 does not calculate and output the velocity values. As a result, more power can be saved.

Next, another embodiment of an operation of the input apparatus 200 carried out when the optical sensor 252 emits light in a predetermined cycle will be described.

FIG. 44 is a flowchart showing the operation of the input apparatus of this embodiment. FIG. 45 are timing charts for explaining the operation shown in FIG. 44.

In descriptions on FIG. 44, points different from those of the operation shown in FIG. 43 will mainly be described. In this embodiment, the light emission cycle T in which the optical sensor 252 emits light and the command output cycle T' (cycle time up until time MPU 19 outputs velocity values since having obtained angular velocity values ($\omega_y$, $\omega_x$) and acceleration values ($a_x$, $a_y$) from sensor unit 17) differ (see FIG. 45). Therefore, the point that the light emission cycle T and the command output cycle T' are set differently will mainly be described.

The MPU 19 is causing the optical sensor 252 to emit light in the light emission cycle T (Step 901) (see FIG. 45(A)). Further, the MPU 19 is judging whether a light-receiving signal from the optical sensor 252 is being input in the light emission cycle T (Step 902) (see FIG. 45(B)). The light emission cycle T is typically about 5 to 15 times the command output cycle T' (see FIG. 45(C)), but the light emission cycle T may be 5 times or less or 15 times or more as long as it is an integral multiple of the command output cycle T'. For example, when the command output cycle T' is 16 ms, the light emission cycle T is 80 ms to 240 ms. It should be noted that in the example shown in FIG. 45, the light emission cycle T is 7 times as large as the command output cycle T'.

When judging that a finger of the user is not present in the detection area and a light-receiving signal from the optical sensor 252 is thus not input (NO in Step 902), the MPU 19 causes the optical sensor 252 to emit light again after an elapse of the light emission cycle T since the last time the optical sensor 252 has emitted light (Step 901) (see FIG. 45(A)). Then, the MPU 19 again judges whether a light-receiving signal has been input (Step 902) (see FIG. 45(B)). When judging that the light-receiving signal is not input, the MPU 19 does not calculate velocity values and does not output a movement command.

When judging that a finger of the user is present in the detection area and a light-receiving signal from the optical sensor 252 is thus input (YES in Step 902), the MPU 19 obtains angular velocity values ($\omega_y$, $\omega_x$) from the angular velocity sensor unit 15 and acceleration values ($a_x$, $a_y$) from the acceleration sensor unit 16 (Step 903). Upon obtaining the acceleration values and the acceleration values, the MPU 19 calculates velocity values ($V_x$, $V_y$) (Step 904) and outputs the velocity values as a movement command (Step 905).

Upon outputting the movement command (Step 905), the MPU 19 judges whether the light emission cycle T has elapsed since the last time the optical sensor 252 has emitted light (Step 906). The judgment on whether the light emission cycle T has elapsed since the last time the optical sensor has emitted light can be realized by the structure as shown in FIG. 18, for example. For example, a predetermined count value is stored in the count value setting section 46 shown in FIG. 18. The MPU 19 (control section 47) only needs to judge whether the light emission cycle T has elapsed by comparing the count value supplied from the counter 45 and the predetermined count value stored in the count value setting section 46.

When the light emission cycle T has not elapsed since the last time the optical sensor 252 has emitted light (NO in Step 906), the MPU 19 executes the processes of Steps 903, 904, and 905 again and outputs a movement command. Then, a judgment is again made on whether the light emission cycle T has elapsed since the last time the optical sensor 252 has emitted light (Step 906). For example, when the light emission cycle T is 7 times as large as the command output cycle T', the processes of obtaining acceleration values and angular velocity values from the sensor unit 17, calculating velocity values, and outputting the velocity values are repeated 7 times.

When the light emission cycle T has elapsed since the last light emission (YES in Step 906), the MPU 19 returns to Step 901 and causes the optical sensor 252 to emit light.

Since the light emission cycle T can be made longer than the command output cycle T' by the processing shown in FIG. 44, power consumption of the optical sensor 252 can be additionally reduced.

Next, another embodiment of an operation of the input apparatus 200 carried out when the optical sensor 252 emits light in a predetermined cycle will be described.

FIG. 46 is a flowchart showing the operation of the input apparatus 200 of this embodiment.

In descriptions on FIG. 46, points different from those of the processing shown in FIG. 43 will mainly be described. This embodiment is different from the processing shown in FIG. 41 in that not only power consumption of the optical sensor but also power consumption of the sensor unit 17 is reduced. Thus, that point will mainly be described.

In descriptions on FIG. 46, a mode in which power supply to the optical sensor 252 and the sensor unit 17 is restricted will be referred to as power-saving mode, and other modes will be referred to as normal mode.

First, the MPU 19 causes the optical sensor 252 to emit light (Step 1001). When judging that a finger of the user is present in the detection area and a light-receiving signal is thus input (YES in 1002), the MPU 19 sets a count value of the counter 45 shown in FIG. 18 to 0 (Step 1003). Next, the MPU 19 obtains angular velocity values and acceleration values from the sensor unit 17 (Step 1004), calculates velocity values (Step 1005), and outputs the velocity values as a movement command (Step 1006).

When the user removes the finger in the detection area from the detection area, the MPU 19 judges that a light-receiving signal from the optical sensor 252 is not input (NO in Step 1002), starts the count-up by the counter 45, and increments the count value of the counter 45 by 1 (Step 1007). Next, the MPU 19 compares the count value from the counter 45 and the predetermined count value (Step 1008). The predetermined count value only needs to be stored in advance in the count value setting section 46 (see FIG. 18). When the count value and the predetermined count value do not match (NO in Step 1008), the process returns to Step 1001.

In other words, when a finger of the user is not present in the detection area and a light-receiving signal is thus not input, the MPU 19 repeats the processes of Step 1001, NO in Step 1002, Step 1007, NO in Step 1008, and Step 1001 until the count value matches the predetermined count value. The predetermined count value is a count value corresponding to a time period up until a time a shift is made to the power-saving mode to be described later since the cancel of the input of the light-receiving signal. The predetermined count value is set as appropriate in consideration of the time period required to shift to the power-saving mode since the input of the light-receiving signal is canceled.

It should be noted that when the user moves his/her finger to the detection area before the count value and the predetermined count value match and the MPU 19 judges that a light-receiving signal has been input (YES in Step 1002), the count value is set to 0 and the count-up by the counter 45 is reset (Step 1003).

When the count value matches the predetermined count value (YES in Step 1008), the MPU 19 restricts power supply to the optical sensor 252 and the angular velocity sensor unit 15 (Step 1009) (restriction means). By the restriction of power supply, the optical sensor 252 and the angular velocity sensor unit 15 are electrically turned off from the ON state, and the input apparatus 200 shifts from the normal mode to the power-saving mode. By thus turning off the optical sensor 252 and the angular velocity sensor unit 15 as active sensors with large power consumption, power consumption can be additionally reduced.

Upon shifting to the power-saving mode, the MPU 19 also restricts power supply to the MPU 19 itself and the acceleration sensor unit 16 and controls power so that a standby current is supplied to the MPU 19 and the acceleration sensor unit 16. The reason why the acceleration sensor unit 16 is not electrically turned off and a standby current is caused to flow therethrough as described above is because the acceleration sensor unit 16 is used as means for detecting a trigger for restoration to the normal mode from the power-saving mode. It should be noted that the acceleration sensor unit 16 is a passive sensor, and power consumption thereof is lower than that of the optical sensor 252 and the angular velocity sensor unit 15 as active sensors.

Upon detecting the acceleration values from the acceleration sensor unit 16 (Step 1010), the MPU 19 judges whether the acceleration value ($a_x$, $a_y$) is equal to or larger than a predetermined value (Step 1011). The acceleration value used in the judgment may be an absolute value of the biaxial acceleration values ($a_x$, $a_y$) |a|, or either one of the biaxial acceleration values may be used as a representative value. When the acceleration value is equal to or smaller than the predetermined value (NO in Step 1011), it is judged that the input apparatus 200 is not moved and the power-saving mode is maintained.

On the other hand, when the acceleration value exceeds the predetermined value (YES in Step 1011), it is judged that the input apparatus 200 is being moved, and the MPU 19 cancels the restriction of power supply to the optical sensor 252 and the angular velocity sensor unit 15 (Step 1012). Upon canceling the restriction of power supply, the optical sensor 252 and the acceleration sensor unit 16 are electrically turned on from the OFF state, and the input apparatus 200 is restored to the normal mode from the power-saving mode. Upon restoration to the normal mode, the MPU 19 also cancels the restriction of power supply to the MPU 19 itself and the acceleration sensor unit 16 and controls power so that a current at the normal mode is supplied to the MPU 19 itself and the acceleration sensor unit 16.

By the processing as described above, for example, it is possible to readily shift to the normal mode when the input apparatus 200 is moved by the user while reducing power consumed by the input apparatus 200 more effectively.

This embodiment has described a case where a shift is made from the normal mode to the power-saving mode after an elapse of a predetermined time period since the cancel of the input of the light-receiving signal. However, it is also possible for the normal mode to be shifted to the power-saving mode when a predetermined time period has elapsed without an input of a light-receiving signal since the power-on of the input apparatus 200.

Moreover, as in the processing shown in FIG. 44, the light emission cycle T in which the optical sensor 252 emits light and the cycle T in which the MPU 19 judges an input of a light-receiving signal may be longer than the command output cycle T' as a cycle of outputting a movement command. As a result, power consumption can be additionally reduced.

Next, another embodiment of an operation of the input apparatus 200 carried out when the optical sensor 252 emits light in a predetermined cycle will be described.

This embodiment is different from the above embodiments in that the light emission cycle T is variable. Thus, that point will mainly be described.

FIG. 47 is a flowchart showing the operation of the input apparatus 200 of this embodiment. FIG. 48 is a diagram showing a relationship between a time period t from a time an input of a light-receiving signal from the optical sensor 252 is canceled and the light emission cycle T of the optical sensor 252 (cycle in which optical sensor 252 detects whether body part of user is present in detection area). Further, FIG. 49 are diagrams showing the light emission cycle T of the optical sensor 252 in a case where a predetermined time period has elapsed since a cancel of an input of a light-receiving signal.

In descriptions on FIG. 47, points different from those of the operation shown in FIG. 43 will mainly be described. Further, the light emission cycle T of the optical sensor 252 when synchronized with the command output cycle T' will be described as a reference cycle $T_0$.

When a finger of the user is present in the detection area and a light-receiving signal from the optical sensor 252 (light-receiving device 252b) is thus being input, the MPU 19 is causing the optical sensor 252 (light-emitting device 252a) to emit light in the reference cycle $T_0$ (Step 1101) (see FIG. 49(A)).

When judging that the user has removed his/her finger in the detection area from the detection area and the input of the light-receiving signal has thus been canceled (NO in Step 1102), the MPU 19 starts the count-up and increments the count value of the counter 45 by 1 (Step 1109).

Next, the MPU 19 compares a first preset count value and the count value (Step 1110). The first preset count value and a second preset count value to be described later only need to be stored in the count value setting section 46 in advance. The first preset count value is a count value corresponding to a first preset time period $t_1$ as a time period from a time an input of a light-receiving signal is canceled to a time the reference cycle $T_0$ is caused to fluctuate (see FIG. 48). The first preset time period is typically 10 s to 20 s, though not limited thereto. It may alternatively be 10 s or less or 20 s or more.

When the count value is smaller than the first preset count value (NO in Step 1110), the MPU 19 returns to Step 1101. When a finger of the user is not present in the detection area, the MPU 19 repeats the processes of causing the optical sensor 252 to emit light (Step 1101), judging an input of a light-receiving signal from the optical sensor 252 (NO in Step 1102), incrementing a count value (Step 1109), and comparing the count value with the first preset count value (Step 1110). The processes are repeated until the count value matches the first preset count value, that is, until the first preset time period $t_1$ passes since a cancel of an input of a light-receiving signal. It should be noted that when the user moves his/her finger to the detection area again before an elapse of the first preset time period $t_1$ and an input of a light-receiving signal from the optical sensor 252 is thus started (YES in Step 1102), the count value is reset (Step 1103).

When the count value is equal to or larger than the first preset count value (YES in Step 1110), that is, when the first preset time period has elapsed since the cancel of the input of the light-receiving signal, it is judged whether the light emission cycle T of the optical sensor 252 at that time is the reference cycle $T_0$ (Step 1111). When the light emission cycle T is the reference cycle $T_0$ (YES in Step 1111), the MPU 19 changes the light emission cycle T from the reference cycle $T_0$ to a first cycle $T_1$ (Step 1112) (cycle control means).

In this case, by supplying a pulse-like voltage in the first cycle $T_1$ to the light-emitting device 252a, the MPU 19 causes the light-emitting device 252a to emit light in the first cycle $T_1$ (see FIG. 49(B)). The first cycle $T_1$ is typically twice to three times as large as the reference cycle $T_0$, though not limited thereto. It may alternatively be 1 to 2 times or 3 times or more. It should be noted that in the example of FIGS. 48 and 49(B), the first cycle $T_1$ is twice as large as the reference cycle $T_0$.

When the light emission cycle T is set to the first cycle (Step 1112) or the light emission cycle T is not the reference cycle $T_0$ (NO in Step 1111), the MPU 19 advances to the next Step 1113. In Step 1113, a judgment is made on whether the count value is equal to or larger than a second preset count value. The second preset count value is a count value corresponding to a second preset time period $t_2$ (see FIG. 48). The second preset time period is typically 20 s to 40 s, though not limited thereto. It may alternatively be 20 s or less or 40 s or more as long as it is equal to or longer than the first preset time period $t_1$.

When the count value is smaller than the second preset count value (NO in Step 1113), the MPU 19 returns to Step 1101 and then repeats the processes of Steps 1001 to NO in Step 1113 until the count value matches the second preset count value, that is, until the second preset time period $t_2$ passes since an input of a light-receiving signal is canceled.

It should be noted that when the user moves his/her finger to the detection area within the second preset time period $t_2$ after the elapse of the first preset time period $t_1$ and a light-receiving signal from the optical sensor 252 is thus input (YES in Step 1102), the MPU 19 resets the count value (Step 1103) and restores the light emission cycle T to the reference cycle $T_0$ from the first cycle $T_1$ (YES in Step 1104, and Step 1105). Specifically, for synchronizing the light emission cycle T with the command output cycle T', the MPU 19 restores it to the reference cycle $T_0$ from the first cycle $T_1$ in Step 1105.

When the count value is equal to or larger than the second preset count value (YES in Step 1113), that is, when the second preset time period or more has elapsed since a cancel of the input of the light-receiving signal, the MPU 19 judges whether the light emission cycle T is the first cycle $T_1$ (Step 1114). When the light emission cycle T is the first cycle $T_1$ (YES in Step 1114), the first cycle $T_1$ is changed to a second cycle $T_2$ (Step 1115) (see FIGS. 48 and 49(C)). The second cycle $T_2$ is typically 3 to 5 times as large as the reference cycle $T_0$, though not limited thereto. It may alternatively be 3 times or less or 5 times or more as large as the reference cycle $T_0$ as long as it is equal to or larger than the first cycle $T_1$. It should be noted that in the example of FIGS. 48 and 49(C), the second cycle $T_2$ is 3 times as large as the reference cycle $T_0$.

It should be noted that when a light-receiving signal is input when the light emission cycle T is the second cycle $T_2$ (YES in Step 1102), the MPU 19 resets the count value (Step 1103) and restores the light emission cycle T to the reference cycle $T_0$ from the second cycle $T_2$ (YES in Step 1104, and Step 1105).

By the processing shown in FIG. 46, the light emission cycle T (cycle of detecting whether body part of user is present in detection area) is controlled so as to be prolonged as a time period from a time an input of a light-receiving signal is canceled becomes longer. Thus, power consumption can be reduced appropriately.

In this embodiment, a cancel of an input of a light-receiving signal has been used as a start point of the time period (see FIG. 48), but a time the power of the input apparatus 200 is turned on may instead be used as the start point of the time period. In other words, the light emission cycle T may be controlled so as to be prolonged as a time period from a time the power of the input apparatus 200 is turned on becomes longer.

This embodiment has described a case where the light emission cycle T is varied in 3 steps. However, the light emission cycle T may be varied in 2 steps or 4 steps or more. Alternatively, the light emission cycle T may be controlled so as to be prolonged linear-functionally or by a multi-degree function as the time period from a time an input of a light-receiving signal is canceled becomes longer. Alternatively, the light emission cycle T may be controlled by a combination of those above.

This embodiment has mainly described the difference from FIG. 43. However, the light emission cycle T of Step 901 of FIG. 44 and the light emission cycle T of Step 1001 of FIG. 46 may become variable as in this embodiment.

Next, another embodiment of a case where the light emission cycle T as a cycle in which the optical sensor 252 emits light is variable will be described.

This embodiment is different from the above embodiments in that the light emission cycle T is controlled variably based on a magnitude of the velocity values of the input apparatus 200. Thus, that point will mainly be described.

FIG. 50 is a flowchart showing an operation of the input apparatus 200 of this embodiment. FIGS. 51 and 52 are diagrams showing relationships between the light emission cycle T of the optical sensor 252 and a velocity value V.

As shown in FIGS. 51 and 52, in this embodiment, the light emission cycle T (cycle in which optical sensor 252 detects whether body part of user is present in detection area) of the optical sensor 252 becomes shorter as the velocity value V output by the input apparatus 200 increases. Conversely, the light emission cycle T becomes longer as the velocity value V decreases.

First, the reason for performing such processing will be described.

When using the input apparatus 200 to move the pointer 2 on the screen 3, the user operates the input apparatus 200 3-dimensionally by holding the input apparatus 200 placed on, for example, a table and moving his/her finger to the detection area above the determination button 211. When the input apparatus 200 is operated as described above, the velocity value V of the input apparatus 200 is large. Specifically, when the velocity value V is large, a necessity of causing the optical sensor 252 to emit light and judging whether a finger of a user is present in the detection area above the determination button 211 is high, and it is thus necessary for the optical sensor 252 to emit light in a short cycle.

On the other hand, when the velocity value V of the input apparatus 200 is small as in a case where the input apparatus 200 is placed on a table, for example, a necessity of the optical sensor 252 to detect whether a finger of the user is present in the detection area is low. Therefore, it can be considered that there is no problem even if the optical sensor 252 emits light in a long cycle when the velocity value V of the input apparatus 200 is small.

In this embodiment, such a relationship is used to variably control the light emission cycle T and appropriately reduce power consumption.

Next, the relationship between the light emission cycle T and the velocity value V will be described.

As shown in FIGS. 51 and 52, when the velocity value V is $V_{10}$ or more, the light emission cycle T is the reference cycle $T_0$. The reference cycle $T_0$ coincides with the command output cycle T' (e.g., 16 ms) and is a shortest cycle in which the optical sensor 252 emits light (see FIG. 52(A)). A value of $V_{10}$ is set as appropriate in consideration of the relationship between the velocity value V of the input apparatus 200 and the light emission cycle T. Similarly, $V_1$ to $V_9$ are set as appropriate in consideration of the relationship with the light emission cycle T.

The velocity value V may be an absolute value of the velocity values |V|, or either one of the first velocity value $V_x$ and the second velocity value $V_y$ may be used as a representative value.

When the velocity value V is $V_9$ to $V_{10}$, $V_8$ to $V_9$, $V_7$ to $V_6$, ..., and 0 to $V_1$, the light emission cycle T is $T_1$, $T_2$, 3, ..., and $T_{10}$, respectively. For example, $T_1$, $T_2$, $T_3$, ..., and $T_{10}$ respectively are twice, 3 times, 4 times, ..., and 10 times as large as the reference cycle $T_0$, though not limited thereto. It may alternatively increase in multiples of 3 or by other multiplying factors as long as it is an integral multiple of the reference cycle $T_0$. Moreover, instead of increasing by regular multiplying factors, $T_1$, $T_2$, $T_3$, ..., and $T_{10}$ may increase by irregular multiplying factors. The light emission cycle T is not limited to 11 steps and may be 10 steps or less or 12 steps or more.

Furthermore, although the cycle $T_{10}$ is set when the velocity value V is 0 to $V_1$ (see FIG. 52(D)), the light emission cycle T may be set to be infinite when the velocity value V is 0 to $V_1$. In other words, the optical sensor 252 does not need to emit light when the velocity value is 0 or substantially 0. As a result, power consumption can be additionally reduced.

Next, referring to FIG. 50, the operation of the input apparatus 200 of this embodiment will be described. It should be noted that points different from those of FIG. 44 will mainly be described.

The MPU 19 causes the optical sensor 252 to emit light (Step 1201) and judges whether a light-receiving signal is input from the optical sensor 252 (Step 1202). For example, the MPU 19 causes the optical sensor 252 to emit light and judges an input of a light-receiving signal in any of the cycles $T_0$ to $T_{10}$ shown in FIGS. 51 and 52.

When it is judged that a finger of the user is not present in the detection area and a light-receiving signal is thus not input (NO in Step 1202), the MPU 19 obtains angular velocity values and acceleration values from the sensor unit 17 (Step 1208). The MPU 19 calculates velocity values based on the angular velocity values and the acceleration values. Upon calculating the velocity values (Step 1209), the MPU 19 newly sets the light emission cycle T (any of $T_0$ to $T_{10}$) based on the velocity value V (Step 1210) (see FIG. 51). The setting of the light emission cycle T can be realized by storing in a table the relationship between the velocity value V and the light emission cycle T shown in FIG. 51, for example.

The emission cycle T newly set in Step 1210 may either be the same as or different from the previous light emission cycle T. When the newly-set light emission cycle T has elapsed since the last time the optical sensor 252 has emitted light, the MPU 19 returns to Step 1201 and causes the optical sensor 252 to emit light again. When a light-receiving signal from the optical sensor 252 is not input, the processes of causing the optical sensor to emit light (Step 1201), setting a new light emission cycle based on the velocity values (Steps 1208 to 1210), and causing the optical sensor 252 to emit light in the newly-set light emission cycle (Step 1201) are repeated thereafter.

By the processing as described above, in a case where the input apparatus 200 is placed on, for example, a table and practically unmoved, and the velocity values continue to take a value substantially close to 0, the optical sensor 252 continues to emit light in the longest cycle $T_{10}$. As a result, power consumption can be reduced. On the other hand, when the user holds the input apparatus 200 that is placed on a table and moves his/her finger to the detection area to move the pointer 2 on the screen 3, the light emission cycle T is, for example, the reference cycle $T_0$ as the shortest cycle according to the magnitude of the velocity values at that time. As a result, the user can immediately start moving the pointer 2.

When judging that the user has moved his/her finger to the detection area and a light-receiving signal is thus being input (YES in Step 1202), the MPU 19 obtains acceleration values and velocity values from the sensor unit 17 (Step 1203) and calculates velocity values (Step 1204). Upon outputting the velocity values as a movement command (Step 1205), the MPU 19 sets a new light emission cycle T (any of $T_0$ to $T_{10}$) that corresponds to the velocity values (Step 1206). The newly-set light emission cycle T may either be the same as or different from the previous light emission cycle T.

Upon setting the new light emission cycle T, the MPU 19 judges whether the newly-set light emission cycle T has elapsed since the last time the optical sensor 252 has emitted light (Step 1207). When the newly-set light emission cycle T has not elapsed since the last time the optical sensor 252 has emitted light (NO in Step 1207), the process returns to Step 1203. Then, the velocity values are calculated and output again so that the light emission cycle T is newly set. When the newly-set light emission cycle T has elapsed since the last time the optical sensor 252 has emitted light (YES in Step 1207), the MPU 19 returns to Step 1201 and causes the optical sensor to emit light again.

Here, the velocity values of the input apparatus 1 are small when the user is moving the pointer 2 on the screen 3 while his/her finger is moved to the detection area and trying to place it on an icon 4. Therefore, the optical sensor 252 is emitting light in the light emission cycle $T_{10}$ (160 ms) as the longest light emission cycle, for example. In this case, after repeating Steps 1203 to 1207 10 times, the MPU 19 causes the optical sensor 252 to emit light and judges whether a finger of the user is present in the detection area. Thus, there may be a case where, due to the repetition of cycles, a movement command is output even when the user has removed his/her finger from the detection area to stop the pointer 2 on the icon 4. In this case, however, since the velocity value V itself that is output as the movement command is small, the pointer 2 hardly moves even when a movement command is output due to the repetition of cycles. Therefore, the user does not realize idling of the pointer 2 that is caused by the repetition of cycles. In other words, according to the input apparatus of this embodiment, power consumption can be reduced appropriately without causing the user to feel awkwardness in performing pointing operations.

This embodiment has described a case where the light emission cycle T is controlled variably based on the magnitude of the velocity values. However, the present invention is not limited thereto, and the light emission cycle T may be controlled variably based on a magnitude of the angular velocity value ω or the acceleration value a. An absolute value may be used as the angular velocity value ω, or one of the biaxial acceleration values may be used as a representative value. The same holds true for the acceleration value. Even by the processing as described above, the same effect as the processing shown in FIG. 51 can be obtained.

This embodiment has described a case where the light emission cycle T is changed stepwise based on the magnitude of the velocity values. However, the present invention is not limited thereto, and the light emission cycle T may be changed exponentially based on the magnitude of the velocity values.

FIG. 66 is a diagram showing an example of a case where the light emission cycle T is changed exponentially based on the magnitude of the velocity values. As shown in FIG. 66, the light emission cycle T is shortened exponentially as the velocity value increases and becomes constant when it is equal to or larger than a predetermined velocity value V' (e.g., 16 ms). By thus shortening the light emission cycle T exponentially based on the velocity value, power consumption can be reduced appropriately without causing the user to feel awkwardness in performing pointing operations.

Here, it is also possible to prolong the light emission cycle T as the velocity value V increases when the velocity value V exceeds a predetermined velocity value V'". For example, when the user moves his/her finger to the detection area and swiftly swings the casing 10 in moving the pointer 2 on the screen 3, the velocity value is extremely large. In this case, when the user removes his/her finger from the detection area, a movement command may be output even when the finger of the user is not present, due to the repetition of cycles (see Steps 1203 to 1207). In this case, however, since the velocity value is too large, the user does not realize the idling of the pointer 2. In FIG. 66, using such a relationship, the light emission cycle T is prolonged as the velocity value increases when the velocity value V exceeds the predetermined velocity value V'". As a result, power consumption can be reduced appropriately without causing the user to feel awkwardness in performing pointing operations.

Next, an embodiment of a method of judging whether a pulse-like output voltage (light-receiving signal) from the optical sensor 252 has been input will be described.

In this embodiment, the method of judging whether a light-receiving signal has been input as in Step 802 of FIG. 43 and the like will be described. In this embodiment, for removing an influence of disturbance light, a judgment is made on whether a light-receiving signal has been input based on a change amount of an output voltage from the optical sensor 252. Thus, that point will mainly be described.

First, the influence of disturbance light such as sunlight and light from a fluorescent lamp on the light-receiving device 252*b* of the optical sensor 252 will be described.

FIG. 53 are diagrams showing a relationship between an input voltage to the light-emitting device 252*a* and an output voltage from the optical sensor 252 for explaining the influence of disturbance light.

As shown on the left-hand side of FIG. 53(B), in a state where disturbance light is large and a finger of the user is not present in the detection area, the optical sensor 252 may continue to output a signal for the light-receiving device 252*b* to detect disturbance light. Accordingly, even though a finger of the user is not present in the detection area, the MPU 19 may judge that a light-receiving signal is being input, and the pointer 2 may thus move on the screen 3.

On the other hand, as shown on the right-hand side of FIG. 53(B), when a finger of the user is present in the detection area, since the surface of the determination button 211 is covered by the finger, disturbance light is not detected by the light-receiving device 252*b*. Therefore, the output voltage of the optical sensor 252 is output as a pulse-like voltage in the cycle T as in the case where the influence of disturbance light is small (see FIG. 40(B)).

In this embodiment, the following processing is executed for removing the influence of disturbance light.

FIG. 54 is a flowchart showing an operation of the input apparatus 200 of this embodiment.

The MPU 19 judges whether the output voltage from the optical sensor 252 (light-receiving device 252*b*) at a time the light-emitting device 252*a* is emitting light is equal to or larger than a threshold value (Step 1301). When the output voltage from the optical sensor is equal to or smaller than the threshold value (NO in Step 1301), the MPU 19 judges that a light-receiving signal from the optical sensor 252 is not input (judgment means) (Step 1304). When judging that the light-receiving signal is not input, the MPU 19 only needs to execute the processes after NO in Step 802 of FIG. 43, for example.

On the other hand, when the output voltage of the optical sensor 252 at the time the light-emitting device 252*a* is emitting light is equal to or larger than the threshold value (YES in Step 1301), the MPU 19 advances to the next Step 1302. In Step 1302, the MPU 19 judges whether the output voltage from the optical sensor 252 up until a time the optical sensor 252 emits light since the last time the optical sensor 252 has emitted light is equal to or smaller than a threshold value. When the output voltage from the optical sensor 252 is not equal to or smaller than the threshold value (NO in Step 1302), the MPU 19 judges that a light-receiving signal from the optical sensor 252 is not input (Step 1304).

For example, in a case where the light-receiving device 252*b* is influenced by disturbance light and the optical sensor 252 is continuing to output a signal (see left-hand side of FIG. 53(B)), the output voltage at the time the optical sensor 252 is caused to emit light is equal to or larger than the threshold value (YES in Step 1301). However, the output voltage from the optical sensor 252 up until the time the optical sensor 252 emits light since the last time the optical sensor 252 has emitted light is not equal to or smaller than the threshold value (NO in Step 1302). Thus, in this case, the MPU 19 judges that a light-receiving signal is not input (Step 1304). As a result, it is possible to prevent the pointer 2 from moving on the screen 3 even when the light-receiving device 252*b* detects disturbance light when a finger of the user is not present in the detection area.

When the output voltage from the optical sensor 252 up until the time the optical sensor 252 emits light since the last time the optical sensor 252 has emitted light is equal to or smaller than the threshold value (YES in Step 1302), the MPU 19 judges that a light-receiving signal from the optical sensor 252 is being input (Step 1303). When judging that the light-receiving signal is being input (Step 1303), the MPU 19 only needs to execute the processes after YES in Step 802 of FIG. 43, for example.

For example, when a finger of the user is present in the detection area (see right-hand side of FIG. 53(B)), the output voltage from the optical sensor 252 at the time the optical sensor 252 is emitting light is equal to or larger than the threshold value (YES in Step 1301). Moreover, the output voltage from the optical sensor 252 up until the time the optical sensor 252 emits light since the last time the optical sensor 252 has emitted light is equal to or smaller than the threshold value (YES in Step 1302). Therefore, in this case, the MPU 19 judges that a light-receiving signal from the optical sensor 252 is being input (Step 1303). In other words, when a finger of the user is present in the detection area, the MPU 19 can appropriately judge that a light-receiving signal from the optical sensor 252 is being input.

As shown in FIG. 54, in this embodiment, since a judgment on whether a light-receiving signal has been input is made based on the change amount of the output voltage from the optical sensor 252, the influence of disturbance light can be removed effectively.

It should be noted that the method of judging whether a light-receiving signal has been input according to this embodiment is also applicable to any of Steps 802, 902, 1002, 1102, and 1202 of FIGS. 43, 44, 46, 47, and 50, respectively. The same holds true for an embodiment to be described next regarding the method of judging whether a light-receiving signal has been input.

Next, another embodiment of the method of judging whether a pulse-like output voltage (light-receiving signal) from the optical sensor 252 has been input will be described.

In the embodiment shown in FIG. 54, whether a light-receiving signal has been input has been judged through a threshold-value judgment. In this embodiment, however, for additionally reducing power consumption of the input apparatus 200, whether a light-receiving signal has been input is judged without using the threshold-value judgment. Therefore, that point will mainly be described.

It should be noted that this embodiment is the same as the embodiment shown in FIG. 54 in the point that whether a light-receiving signal has been input is judged based on a change amount of the output voltage from the optical sensor 252.

FIG. 55 are enlarged diagrams showing a relationship between the input voltage to the light-emitting device 252*a* and the output voltage from the optical sensor 252.

As indicated by the broken line of FIG. 55, since the output voltage from the light-receiving device 252*b* exceeds a threshold value when a pulse width of the input voltage to the light-emitting device 252*a* is sufficiently large, the MPU 19 can judge an input of a light-receiving signal by the judgment method that uses the threshold-value judgment.

Here, for additionally reducing power consumption of the optical sensor 252, it is considered effective means to shorten a time period during which the optical sensor 252 is caused to emit light in addition to causing the optical sensor 252 to intermittently emit light in the light emission cycle T. In this case, a pulse width τ of the input voltage to the light-emitting device 252a may be reduced to reduce a duty ratio D (D=τ/T) (see FIG. 55(A)).

However, since a time period during which the light-receiving device 252b detects light is shortened when a light emission time of the light-emitting device 252a is shortened, an output value of the output voltage of the optical sensor 252 may not exceed the threshold value in the case of a low slew rate (see FIG. 55(B)). Accordingly, there may be a case where the MPU 19 judges that a light-receiving signal from the optical sensor 252 is not input even when a finger of the user is present in the detection area.

In this regard, the input apparatus 200 of this embodiment samples output voltages (analog signals) from the optical sensor 252 and converts them into digital signals (see FIG. 55(B)). Then, the MPU 19 judges whether a light-receiving signal is being input based on a change amount of the sampled output voltages (digital signals). Typically, the MPU 19 is capable of recognizing the change amount by differentiating each of the sampled voltage values, for example. It is only necessary to obtain a differential between at least two sampling values out of the sampled voltage values and judge that a light-receiving signal is being input when that differential becomes a value that is equal or close to a predetermined value.

By shortening the light emission time of the light-emitting device 252a by the processing as described above, the MPU 19 can judge that a light-receiving signal is being input even when the output value of the output voltage from the optical sensor 252 does not exceed the threshold value. As a result, since the light emission time of the light-emitting device 252a can be shortened, power consumption of the optical sensor 252 can be additionally reduced.

In addition, by the processing as described above, even when the light-receiving device 252b is influenced by disturbance light to inadvertently output a voltage in a state where a finger of the user is not present in the detection area (see left-hand side of FIG. 53(B)), the MPU 19 judges that a light-receiving signal is not input. In other words, since the change amount of the output voltage that is output when the light-receiving device 252b is influenced by disturbance light does not coincide with the change amount of the output voltage output when a finger is present in the detection area, the MPU 19 judges that a light-receiving signal is not input. As a result, it is possible to prevent the pointer 2 from moving on the screen 3 due to the influence of disturbance light on the optical sensor 252 even when a finger of the user is not present in the detection area.

Next, an embodiment for suppressing the influence of disturbance light will be described.

The embodiment shown in FIGS. 53 and 54 above and the embodiment shown in FIG. 55 have described cases where the influence of disturbance light is suppressed by the method of judging a signal input. In this embodiment, however, the influence of disturbance light is suppressed by an optical thin film (wavelength selection film).

For suppressing the influence of disturbance light, on the upper surface 255a of the lens member 255 shown in FIG. 37 above, for example, an optical thin film (wavelength selection area) that is capable of selectively causing light belonging to a wavelength range of light emitted from the light-emitting device 252a to transmit therethrough out of light irradiated onto the light-receiving device 252b, and cutting light of other wavelengths is formed. Alternatively, the optical thin film may be formed on a light-receiving surface of the light-receiving device 252b. A position at which the optical thin film is formed is not particularly limited. The optical thin film has, for example, a multilayer structure. In a case where infrared rays of a predetermined wavelength range are used as light emitted from the light-emitting device 252a, the optical thin film is formed to cause the infrared rays of the predetermined wavelength range to transmit therethrough and cut light other than the infrared rays of the predetermined wavelength range.

FIG. 58 is a diagram showing a wavelength distribution of sunlight. FIG. 59 is a diagram showing a relationship among the sunlight wavelength distribution, spectral sensitivity characteristics of the light-receiving device 252b, and characteristics of the optical thin film.

As shown in FIGS. 58 and 59, sunlight has a valley of a radiation intensity from about 850 nm to 1050 nm in a wavelength range of near infrared rays and a valley peak near 950 nm. As shown in FIG. 59, a relative sensitivity of the light-receiving device 252b has a peak value near 950 nm so as to coincide with a peak value of the valley of the radiation intensity of sunlight. The light-receiving device 252b only needs to be designed as appropriate so that a peak value of the relative intensity appears near 950 nm. In this case, the light-emitting device 252a also emits light that belongs to a range of near infrared rays with a center wavelength near 950 nm.

The broken line of FIG. 59 indicates the characteristics of the optical thin film, and the slashes of FIG. 59 indicate areas of sunlight cut by the optical thin film. In other words, the optical thin film selectively causes light of a wavelength range of about 900 nm to 1000 nm to transmit therethrough and cuts light belonging to a wavelength range of about 900 nm or less and a wavelength range of about 1000 nm or more. A film thickness of the optical thin film is set as appropriate so as to provide such characteristics. For example, although the light-receiving device 252b has a relative sensitivity of about 50% with respect to light of a wavelength of about 1100 nm, since the light within the wavelength range of 1100 nm is cut by the optical thin film, the light is not detected by the light-receiving device 252b. As described above, since the input apparatus of this embodiment can effectively suppress the influence of disturbance light on the light-receiving device 252b, the light-receiving device 252b can appropriately detect light emitted from the light-emitting device 252a (950 nm).

The optical thin film of this embodiment is applicable to both the structure in which the optical sensor 252 intermittently emits light in the light emission cycle T and the structure in which the optical sensor 252 constantly emits light. This embodiment has described a case where the influence of disturbance light is suppressed by an optical thin film. However, the present invention is not limited thereto, and the lens member 255 itself may be formed of a resin that has wavelength selectivity.

Next, another embodiment for suppressing the influence of disturbance light will be described.

In this embodiment, the influence of disturbance light is suppressed by a circuit. Thus, that point will mainly be described.

FIG. 64 is a diagram showing a circuit of the input apparatus 200 of this embodiment. FIG. 65 are diagrams showing a relationship between an output waveform of the optical sensor at a time disturbance light is strong and a signal whose waveform has been shaped by the circuit shown in FIG. 64.

As shown in FIG. 64, a circuit 110 includes a comparator 111, a capacitor $C_1$, and 6 resistors $R_1$ to $R_6$. The circuit 110 includes connection points 112, 113, and 114. The connection point 112 is input with a light-receiving signal from the light-receiving device 252b of the optical sensor 252. The connection point 113 is connected to a power source (batteries 14) of, for example, 3.15 V, and an output signal is obtained from the connection point 114.

The capacitor $C_1$ is connected to an output side of the light-receiving device 252b. The resistor $R_3$ is grounded at one end thereof, and the other end is connected to an input terminal of the comparator 111. A voltage at a point A is determined by the resistor $R_5$, and this voltage becomes a reference voltage 115 to be compared with the output voltage of the light-receiving device 252b.

FIG. 65(A) is a diagram showing an output waveform of a light-receiving signal from the light-receiving device 252b at a time the influence of disturbance light is large. FIG. 65(A) shows an output waveform of a light-receiving signal in a state where disturbance light is stronger than in the example shown in FIG. 53(B).

In the state where disturbance light is strong, a light-receiving signal may be output even when a finger of a user is not present in the detection area (see left-hand side of FIG. 65(A)). Moreover, in the state where disturbance light is stronger, even when a finger is present in the detection area, disturbance light may enter the determination button 211 through a gap between the finger and the lens member 255, for example. As a result, since disturbance light is detected by the light-receiving device 252b, the light-receiving device 252b may inadvertently output a light-receiving signal having a waveform as shown on the right-hand side of FIG. 65(A).

FIG. 65(B) is a diagram showing an output waveform of a light-receiving signal that has passed through the capacitor $C_1$. As shown on the left-hand side of FIG. 65(B), the light-receiving signal that has passed through the capacitor $C_1$ (removal means) has its DC component cut, with the result that the signal becomes substantially 0 when a finger of the user is not present in the detection area. Moreover, a waveform of a signal at a time a finger of the user is present in the detection area has its DC component cut, thus resulting in a waveform as shown on the right-hand side of FIG. 65(B). The waveform shown on the right-hand side of FIG. 65(B) is shaped by being input to the comparator 111. For example, the signal input to the comparator 111 is compared with the reference voltage 115 set by the resistor $R_5$, and a signal larger than the reference voltage is amplified. As a result, a waveform as shown in FIG. 65(C) is output from the comparator 111.

The light-receiving signal whose waveform has been shaped as described above has the same shape as the light-receiving signal of the optical sensor in a state where the influence of disturbance light is negligible (see FIG. 40(B)). Accordingly, the influence of disturbance light can be removed effectively, and the MPU 19 can thus appropriately judge an input of a light-receiving signal.

It should be noted that the reference voltage 115 is adjusted as appropriate by changing the resistor $R_5$ in consideration of a voltage value of a pulse voltage input to the comparator 111.

Next, another embodiment for suppressing the influence of disturbance light will be described.

In this embodiment, the influence of disturbance light is suppressed by using a differential between a light-receiving signal from the light-receiving device 252b at a time the light-emitting device 252a is emitting light and a light-receiving signal from the light-receiving device 252b at a time light is not emitted. Thus, that point will mainly be described.

First, a relationship between a distance from the optical sensor 252 (upper surface 255a of lens member 255) to a finger of a user and an output voltage from the light-receiving device 252b will be described.

FIG. 67(A) shows an output voltage of the light-receiving device in a state where the influence of disturbance light is negligible. FIG. 67(A)(a) shows an output voltage from the light-receiving device 252b in a case where a finger of a user is far from the optical sensor 252. Moreover, FIG. 67(A)(b) shows an output voltage in a case where the finger of the user is close to the optical sensor 252, and FIG. 67(A)(c) shows an output voltage in a case where the finger of the user has come closer to the optical sensor 252. As shown in FIG. 67(A), since a volume of light received by the light-receiving device 252b increases as the finger of the user comes closer to the optical sensor 252, the output voltage from the light-receiving device 252b increases from $V_1$ to $V_3$.

FIG. 67(B) shows an output voltage of the light-receiving device 252b at a time the influence of disturbance light is large. FIG. 67(B) (d) shows an output voltage of the light-receiving device 252b at a time the finger of the user is not present on the optical sensor 252. As shown in FIG. 67(B) (d), when the finger of the user is not present in the detection area, the light-receiving device 252b is influenced by disturbance light and thus continues to output a light-receiving signal. (a) to (c) of FIG. 67(B) show output voltages from the light-receiving device 252 in a case where the finger of the user gradually approaches the optical sensor 252 from a distant state. It should be noted that the distances between the optical sensor 252 and the finger of the user in (a) to (c) of FIG. 67(B) respectively correspond to the distances between the optical sensor 252 and the finger of the user in (a) to (c) of FIG. 67(A) above.

As shown in FIG. 67(B), a potential difference between the output voltage at a time the light-emitting device 252a is emitting light and the output voltage at a time light is not emitted increases from $V_1$ to $V_3$ as the finger of the user comes closer. Moreover, the output voltage of the light-receiving device 252b at a time the light-emitting device 252a is not emitting light decreases as the finger of the user comes closer. This is because, since the finger of the user gradually covers the upper surface 255a of the lens member 255 as it approaches the optical sensor 252, it becomes more difficult for disturbance light to reach the light-receiving device 252b.

Here, comparing FIGS. 67(A) and 67(B), it can be seen that the potential differences between the output voltage of the light-receiving device 252b at the time the light-emitting device 252a is emitting light and the output voltage at the time light is not emitted are the same when the distances between the optical sensor 252 and the finger of the user are the same. Specifically, irrespective of the magnitude of the influence of disturbance light, the potential differences between the output voltage of the light-receiving device 252b at the time the light-emitting device 252a is emitting light and the output voltage at the time light is not emitted can be considered to be the same. In this regard, in this embodiment, such a relationship is used to remove the influence of disturbance light.

The input apparatus 200 samples the output voltages of the light-receiving device 252b at the time the light-emitting device 252a is emitting light and the output voltages at the time light is not emitted and converts them into digital signals. The MPU 19 subtracts a representative value of the sampling values at the time the light-emitting device 252a is not emitting light from a representative value of the sampling values at the time the light-emitting device 252a is emitting light, to thus obtain a potential difference. The MPU 19 judges whether the potential difference exceeds a predetermined threshold value, and when it exceeds the threshold value, judges that a light-receiving signal has been input. On the other hand, when the potential difference is equal to or smaller than the predetermined threshold value, it is judged that a light-receiving signal is not input. By the processing as described above, the influence of disturbance light can be removed effectively.

Here, predetermined processing may be executed using the potential difference calculated by the processing described above. Specifically, since the MPU 19 is capable of obtaining a potential difference corresponding to the distance between the optical sensor 252 and the finger of the user, that potential difference is used. For example, an LED display section whose color changes depending on the distance between the optical sensor 252 and a finger of a user (potential difference) may be provided. As a result, the user can visually recognize whether a finger is being detected by the optical sensor 252.

Alternatively, the velocity values calculated by the processing shown in FIG. 12, for example, may be set to be variable in accordance with the distance (potential difference). In this case, by adjusting a velocity of swinging the casing 10 using an operation of a wrist or an arm and adjusting the distance from the optical sensor 252 using an operation of a finger, the user can adjust the velocity of the pointer 2 on the screen.

Next, another embodiment of the operation section of the input apparatus will be described.

FIG. 68 is a cross-sectional diagram of a determination button 511 of the input apparatus according to this embodiment. In FIG. 66, points different from those of the determination button 211 described with reference to FIG. 37 above will be described.

As shown in FIG. 68, the determination button 511 includes a cylindrical body 550 having a concave portion. The optical sensor 252 is disposed on a bottom surface 250c of the concave portion inside the cylindrical body 550. The optical sensor 252 is a reflection-type optical sensor 252 that includes the light-emitting device 252a and the light-receiving device 252b. A lens member 555 is provided in the concave portion of the cylindrical body 250. The lens member 555 is formed across the entire concave portion so as to cover the optical sensor 252, and the optical sensor 252 is resin-sealed by the lens member 555.

An upper surface 555a of the lens member 555 has a predetermined curvature radius and is capable of collecting light emitted from the light-emitting device 252a. The curvature radius of the upper surface 555a of the lens member is set as appropriate.

By forming the lens member 555 such that it covers the optical sensor 252 as shown in FIG. 68, a reflection surface between the optical sensor 252 and a finger can be reduced. In other words, as is apparent from FIG. 68, in this embodiment, the reflection surface between the optical sensor 252 and the finger is only the upper surface 555a of the lens member 555. Thus, it is possible to prevent the light-receiving device 252b from detecting light due to an influence of reflected light. Moreover, since the optical sensor 252 is fixed inside the cylindrical body 550, a positional relationship with the upper surface 555a (reflection surface) of the lens member 555 does not fluctuate. Therefore, it is possible to stabilize a level of light reflected by the upper surface 255a of the lens member 255. As a result, it is possible to prevent the light-receiving device 252b from detecting light even when a finger of a user is not present in the detection area. Furthermore, the detection area can be stably formed above the lens member 255.

The light shield plate 256 may be formed between the light-emitting device 252a and the light-receiving device 252b. As a result, the light-receiving device 252b can be prevented from directly detecting light emitted from the light-emitting device 252a or indirectly detecting light reflected by the upper surface 555a of the lens member 555.

It should be noted that in the above embodiments and embodiments to be described later, a target of a press operation by the user is the determination button 211. However, it may be the determination button 511.

Next, another embodiment of a case where the user presses the determination button 211 of the input apparatus 200 will be described.

FIG. 56 is a flowchart showing an operation of the input apparatus of this embodiment. FIG. 56 is a flowchart in which the "light-receiving signal from movement button" of Step 301 of FIG. 17 above is replaced with a "light-receiving signal from optical sensor". In other words, processing similar to that of FIG. 17 is executed in FIG. 56.

When the determination button 211 is pressed and an operation signal from the switch 215a is started to be input, the MPU 19 performs control so that the pointer 2 does not move on the screen 3 during a first time period since the start of the input of the operation signal (YES in Step 1404 to Step 1409). Accordingly, the pointer 2 can be prevented from moving on the screen 3 when the casing 210 tilts when the user presses the determination button 211.

When the press of the determination button 211 is released and the input of the operation signal from the switch 215a is thus canceled, the MPU 19 performs control so that the pointer 2 does not move on the screen 3 during a second time period since the cancel of the input of the operation signal (YES in Step 1412 to Step 1417). Accordingly, an icon can be prevented from being dropped at a position unintended by the user due to the tilt of the casing 210 that is caused when the user drag-and-drops the icon, for example.

It is also possible for the MPU 19 to perform control so that, when an operation signal is started to be input again within the second time period since the cancel of the input of the operation signal, the pointer 2 does not move on the screen 3 during the first time period since the restart of the input of the operation signal (YES in Step 1416 to Step 1409). Accordingly, the pointer 2 can be prevented from moving on the screen 3 due to the tilt of the casing 210 at a time the user starts pressing the determination button 211 in performing a double-click operation, for example.

It is also possible for the MPU 19 to perform control so that, when the input of the operation signal is canceled within the first time period since the start of the input of the operation signal, the pointer 2 does not move on the screen 3 during the second time period since the cancel of the input of the operation signal (YES in Step 1408 to Step 1417 via broken line). Accordingly, the pointer 2 can be prevented from moving on the screen 3 due to the tilt of the casing 210 at a time the user releases a press of the determination button 211 in a click or double-click operation, for example.

Heretofore, FIG. 56 has been described briefly. Since an operation of the input apparatus 200, an effect thereof, and the like are the same as those of FIG. 17, details will be omitted. It should be noted that the processing shown in FIG. 56 may be mainly executed by the control apparatus 40.

The input apparatus 200 may execute processing that is the same as that of FIG. 20 above. In this case, the "light-receiving signal from movement button" of Step 601 of FIG. 20 only needs to be replaced with a "light-receiving signal from optical sensor". In other words, when the user moves his/her finger to the detection area and an input of a light-receiving signal from the optical sensor 252 is thus started, the MPU 19 performs control so that the pointer 2 does not move on the screen 3 during a third time period since the input of the light-receiving signal. Accordingly, the same effect as in FIG. 20 can be obtained. It should be noted that such processing may be mainly executed by the control apparatus 40.

Next, a sensor according to another embodiment will be described.

The above embodiments have described cases where the sensor that detects whether a body part (e.g., finger) of a user is present in the detection area is a reflection-type optical sensor. This embodiment, however, describes a case where the sensor is a transmission-type optical sensor.

FIG. 60 is a cross-sectional diagram of a determination button 411 of the input apparatus 200 of this embodiment.

As shown in FIG. 60, the determination button 411 includes a cylindrical body 450 having a hollow portion 451. The cylindrical body 450 includes a groove 458 on an upper surface 450a thereof. The groove 458 is of a size slightly larger than a finger of a user. Inside the cylindrical body 450, a light-emitting device 452a and a light-receiving device 452b are opposed to each other while the groove 458 is interposed therebetween. The light-emitting device 452a and the light-receiving device 452b constitute a transmission-type optical sensor 452. In this embodiment, by the transmission-type optical sensor 452, a detection area in which a presence of a body part of a user is detected is formed in the groove 458 above the determination button 411.

Transmission portions 457 that are capable of causing light emitted from the light-emitting device 452a to transmit therethrough are formed at a part of a wall surface 450b constituting the groove 458 of the cylindrical body 450. The transmission portions 457 are respectively provided on the light-emitting device 452a side and the light-receiving device 452b side while being arranged on a straight line connecting the light-emitting device 452a and the light-receiving device 452b. The transmission portions 457 are each formed of a resin having optical transparency, such as polycarbonate and an acrylic resin.

The optical thin film described above may be formed on the transmission portion 457 on the light-receiving device 452b side. As a result, the influence of disturbance light can be removed effectively. The optical thin film may be formed on a light-receiving surface of the light-receiving device 452b. Alternatively, the optical thin film may be formed on not only the transmission portion 457 on the light-receiving device 452b side but also the transmission portion 457 on the light-emitting device 452a side. Alternatively, the transmission portions 457 themselves may be formed of a resin having wavelength selectivity.

Next, an operation of the input apparatus 200 including the determination button 411 will be described.

FIG. 61 is a diagram showing an embodiment of the operation. FIG. 61 is a flowchart in which the judgment of Step 701 is replaced with the judgment of Step 704 in FIG. 38 above and vice versa. In other words, in this embodiment, when an input of a light-receiving signal from the reflection-type optical sensor 452 is canceled, the MPU 19 controls an output of a movement command so that the pointer 2 moves on the screen 3. Moreover, when an input of a light-receiving signal from the reflection-type optical sensor 452 is started, the MPU 19 controls the output of the movement command so that the pointer 2 stops moving on the screen 3.

When the user has not moved his/her finger to the groove 458 and the finger is thus not present in the detection area, the light-receiving device 452b is detecting light emitted from the light-emitting device 452a. Therefore, the light-receiving device 452b is outputting a light-receiving signal as the light-receiving signal, and the light-receiving signal is being input to the MPU 19. When a light-receiving signal is being input (NO in Step 1501), the MPU 19 is not outputting a movement command or outputting a movement command with the displacement amount set to 0 (Step 1502).

When the user moves his/her finger to the groove 458, light emitted from the optical sensor 452 is shielded by the finger. Thus, since the light-receiving device 452b is unable to detect light emitted from the light-emitting device 452a, the output of a light-receiving signal to the MPU 19 is stopped. When the input of a light-receiving signal from the light-receiving device 452b is canceled (YES in Step 1501), the MPU 19 starts outputting a movement command (Step 1503). In other words, when a body part of the user is present in the detection area, the MPU 19 controls the output of a movement command so that the pointer 2 starts moving (output control means).

When the user releases his/her finger from the groove and removes the finger from the detection area, the light-receiving device 452b detects light emitted from the light-emitting device 252a and starts outputting a light-receiving signal. When the input of a light-receiving signal from the light-receiving device 452b is started (YES in Step 1504), the MPU 19 stops outputting the movement command (Step 1505). In other words, when a body part of the user is not present in the detection area, the MPU 19 controls the output of a movement command so that the pointer 2 stops moving.

It should be noted that other operations and an operational effect are the same as those of the embodiment shown in FIG. 38. Thus, descriptions thereof will be omitted.

As in the flowchart shown in FIG. 19, it is possible to stop the output of a movement command when the user has moved his/her finger to the detection area. In this case, the user can stop the pointer by moving the finger to the groove 458 and start moving the pointer by removing the finger from the groove 458. As a result, the pointer 2 can be operated for sure.

It should be noted that the above embodiments in which the descriptions have been given as the reflection-type optical sensor 252 are all applicable to the input apparatus 200 including the transmission-type optical sensor 452 (e.g., light emission from optical sensor in predetermined cycle and removal of influence of disturbance light). In this case, in the flowcharts on the operations of the input apparatus 200, replacements only need to be made in the same manner as in the replacement of FIG. 38 with FIG. 60. As a result, the same operational effect as in the embodiments including the reflection-type optical sensor 252 can be obtained.

Next, an input apparatus according to another embodiment will be described.

FIG. 57 is a diagram showing a lower casing and a main substrate of the input apparatus of this embodiment from an upper side. In this embodiment, components having the same functions as those of the input apparatus 200 described above are denoted by the same symbols, and descriptions thereof will be simplified or omitted.

As shown in FIG. 57, a capacitance sensor 352 is provided around the switch 215a on a main substrate 246 of an input apparatus 300. In other words, in this embodiment, the capacitance sensor 352 is provided in place of the optical sensor 252. By the capacitance sensor 352, a detection area is formed on the determination button 211.

The detection area formed by the capacitance sensor 352 may be formed in space or on a plane above the determination button 211. In other words, the capacitance sensor 352 may detect a finger of the user when the user moves the finger to a spatial area above the determination button 211 or detect the finger when the user touches a surface of the determination button 211. Spatial or planar largeness of the detection area is adjusted by designing the capacitance sensor 352 as appropriate.

A position of the capacitance sensor 352 may be any position on the main substrate 246 as long as the detection area can be formed on the determination button 211.

Even when the optical sensor 252 is the capacitance sensor 352, the same processing as FIGS. 38, 56, and 20 above can be executed, and the same operational effect can therefore be obtained. Moreover, by the capacitance sensor 352, the same processing as FIG. 46 can be executed. In this case, the MPU only needs to execute processing from which Step 1001 is removed in FIG. 46. Accordingly, it becomes possible to switch the normal mode to the power-saving mode and vice versa, and power-saving of the entire input apparatus 300 is thus realized.

Next, an input apparatus according to another embodiment will be described.

The above embodiments have described a case where the detection area is formed above the determination button (operation section). This embodiment is different from the above embodiments in that the detection area is located at a position different from the position above the operation section. Thus, that point will mainly be described.

FIG. 62 is a perspective view showing the input apparatus of this embodiment. In FIG. 62, points different from those of FIG. 31 will be described.

As shown in FIG. 62, an input apparatus 400 includes the casing 210, and the operation section 223 is provided on the upper surface 210c of the casing 210. The operation section 223 includes a determination button 311, the center button 212, and the buttons 213 and 214. In this embodiment, a detection area is formed on a predetermined area 312 that is closer to an end portion than the determination button 311 on the upper surface 210c of the casing 210, for example. The detection area 312 is constituted of, for example, the reflection-type optical sensor 252. The optical sensor 252 is provided inside the casing 210 below the predetermined area 312. A position of the optical sensor 252 is not particularly limited as long as it can form a detection area on the predetermined area 312.

Next, an operation of the input apparatus 400 will be described. FIG. 63 is a flowchart showing the operation. In descriptions on FIG. 63, points different from those of the operation shown in FIG. 38 will mainly be described.

When the user moves his/her finger to the detection area formed on the predetermined area 312 or touches the area 312 with the finger, the finger is detected by the optical sensor 252. Upon detecting the finger of the user, the optical sensor 252 outputs a light-receiving signal. When the input of the light-receiving signal is started (YES in Step 1601), the MPU 19 starts outputting a movement command (Step 1603).

For example, by swinging the input apparatus 400 in a state where the finger is moved to the detection area, the user moves the pointer 2 and places it on an icon 4. Then, the user removes the finger from the detection area on the predetermined area 312. When the user removes the finger from the detection area, the input of the light-receiving signal to the MPU 19 from the optical sensor 252 is canceled (YES in Step 1604). As a result, the MPU 19 stops outputting the movement command or starts outputting a movement command with the displacement amount set to 0 (Step 1605). Accordingly, the user can stop the pointer on the icon 4, for example.

Upon stopping the output of the movement command (Step 1605), the MPU 19 judges whether an operation signal from the switch 215a disposed below the determination button 311 has been input (Step 1606). When the user presses the determination button 311, an operation signal is output from the switch 215a to be input to the MPU 19 (YES in Step 1606). When the operation signal is input, the MPU 19 outputs a determination command (Step 1607). In this case, the MPU 19 outputs a determination command in accordance with the input of the operation signal from the switch 215a in a state where the finger of the user is not present in the detection area (Step 1607). It should be noted that it is also possible for the MPU 19 to output a determination command when the press of the determination button 311 is released and the input of the operation signal from the switch 215a is thus canceled.

Accordingly, since the user can stop the pointer 2 on the icon 4 on the screen 3 and press the determination button 311 after checking that the pointer 2 is placed on the icon 4, a GUI operation can positively be made. In addition, since even a user who is not good at performing pointing operations can perform a positive GUI operation, an operational feeling can be improved.

Although this embodiment has been described assuming that the sensor that forms the detection area is the reflection-type optical sensor 252, the sensor may instead be the capacitance sensor 352. Alternatively, the sensor may be the transmission-type optical sensor 452.

This embodiment has been described assuming that the predetermined area 312 is disposed at the end portion of the upper surface 210c of the casing 210. However, the present invention is not limited thereto, and the predetermined area 312 may be provided on a side surface of the casing 210, for example. In this case, the user controls a start and stop of the movement of the pointer 2 by moving an index finger, a middle finger, or the like to the detection area. Alternatively, the predetermined area 312 may be provided on a bottom surface of the casing 210.

Next, a case where the optical sensor 252 is used for purposes other than the input apparatus will be described.

As described above with reference to FIGS. 39 to 41, by the optical sensor 252 cyclically emitting light, power consumption of the optical sensor 252 can be reduced. In addition, by the light-emitting device 252a being intermittently supplied with a pulse-like voltage and the light-receiving device 252b being successively supplied with a voltage, it is possible to prevent a floating capacitance from being generated in the light-receiving device 270b. Accordingly, a false detection by the light-receiving device 252b can be prevented from occurring.

Specifically, according to an optical sensor that includes a light-emitting device that emits light, a light-receiving device that detects the light, and a voltage control means for controlling a voltage so that the voltage is intermittently supplied to the light-emitting device in a predetermined cycle and controlling the voltage so that the voltage is successively supplied to the light-receiving device irrespective of the cycle, power-saving is realized appropriately, and a false light detection can be prevented from occurring.

The optical sensor 252 may be used as a sensor for focusing right before a shutter button of a digital camera is operated, sheet detection in a copy machine, a printer, and the like, or timing detection, or as a sensor for detecting a rotating velocity of a disk in a disk drive apparatus. Alternatively, the optical sensor 252 may be used as an optical sensor 252 for detecting a human body in a restroom, a lavatory, and the like, and for various other purposes.

Here, the optical sensor 252 may either be the "reflection type" or the "transmission type". In other words, if a voltage is intermittently supplied to the light-emitting device 252a in a predetermined cycle and a voltage is successively supplied to the light-receiving device 252b irrespective of whether the sensor is the reflection type or the transmission type, power-saving can be realized appropriately, and a false light detection can be prevented from occurring.

Further, the optical sensor may further include a cycle control means for variably controlling the cycle. For example, by prolonging the cycle when a necessity of the optical sensor to detect a presence of a detection target is low, more power can be saved.

The optical sensor includes a detection area in which a presence of the detection target is detected, and the cycle control means controls the cycle so that the cycle is prolonged as a time period up until a time the presence of the detection target is detected in the detection area since it has become undetected becomes longer. Alternatively, the optical sensor may include a detection area in which a presence of the detection target is detected, and the cycle control means may control the cycle so that the cycle is prolonged as a time period up until a time the presence of the detection target is detected in the detection area since a start of power supply to the optical sensor from a power source becomes longer.

For example, as described above with reference to FIGS. 47 to 49, the reference cycle $T_0$ is set to the first cycle after an elapse of the first preset time period since a cancel of an input of a light-receiving signal from the light-receiving device 252*b*. Moreover, processing of setting the first cycle to the second cycle after an elapse of the second preset time period since the cancel of the input of the light-receiving signal from the light-receiving device 252*b* only needs to be executed.

It should be noted that in FIG. 47, Steps 1106 to 1108 are processes unique to the case where the optical sensor 252 is applied to the input apparatus 200. Therefore, when the optical sensor 252 is applied to electronic apparatuses other than the input apparatus, processes unique to those electronic apparatuses only need to be executed in Steps 1106 to 1108.

In the optical sensor, the light-receiving device may output a light-receiving signal corresponding to an intensity of the detected light, and the optical sensor may further include a judgment means for judging whether the light-receiving signal has been input in accordance with a change amount of an output value of the light-receiving signal.

For example, the judgment on whether a light-receiving signal has been input only needs to be made by executing the processing described with reference to FIGS. 53 and 54. Accordingly, the influence of disturbance light can be removed effectively.

Alternatively, the processing described with reference to FIG. 55 may be executed. In other words, the MPU only needs to recognize a change amount of an output voltage by sampling the output voltages from the light-receiving device 252*b* and converting them into digital signals and judge whether a light-receiving signal has been input. Accordingly, since the time period during which the light-emitting device 252*a* emits light can be shortened, power consumption of the optical sensor 252 can be additionally reduced. In addition, since the judgment on whether a light-receiving signal has been input is made based on the change amount of the output voltage, the influence of disturbance light can be removed effectively.

Moreover, for suppressing the influence of disturbance light, an optical thin film (wavelength selection film) may be formed on the upper surface 255*a* of the lens member 255 or the light-receiving surface of the light-receiving device 252*b* as described with reference to FIGS. 58 and 59. In other words, the optical sensor may further include a wavelength selection area that selectively causes light belonging to a wavelength range of the light emitted from the light-emitting device to transmit therethrough out of the light irradiated onto the light-receiving device. The light-emitting device 252*a* may emit light that belongs to near infrared rays having a center wavelength near 950 nm, and the light-receiving device 252*b* may have a peak value of a relative sensitivity near 950 nm. In this case, the optical thin film is formed to selectively cause light within a wavelength range of 900 nm to 1000 nm to transmit therethrough and cut light belonging to wavelength ranges of 900 nm or less and 1000 nm or more.

Alternatively, as described with reference to FIGS. 64 and 65, the influence of disturbance light may be suppressed by a circuit. Specifically, in the optical sensor, the light-receiving device may output a light-receiving signal corresponding to an intensity of the detected light, and the optical sensor may further include a removal means for receiving the light-receiving signal and removing a DC component of the light-receiving signal and a waveform-shaping means for shaping a waveform of the light-receiving signal from which the DC component has been removed. As a result, the influence of disturbance light can be removed effectively.

Next, a case where the operation section 223 is used in other electronic apparatuses and the like will be described.

Incidentally, a so-called 2-step switch that is operated by a 2-step press operation is widely used as an operation section of various electronic apparatuses. The 2-step switch is used in, for example, a camera. In this case, for example, an auto-focus function is allocated to a first step, and a shutter function is allocated to a second step. The user presses the 2-step switch down to the first step and maintains a so-called half-way press state to thus focus a lens of the camera. Then, after checking that the lens has been focused, the user presses the 2-step switch down to the second step to release the shutter.

However, it is not necessarily easy to press the 2-step switch down to the first step and maintain the halfway press state, thus resulting in a problem of a poor operational feeling. For example, there is a case where, even when the user thinks he/she is maintaining the halfway press state, the 2-step switch is not actually pressed down to the first step and the auto-focus function thus does not operate. On the other hand, there is a case where, when attempting to press the 2-step switch down to the first step, the user presses it down to the second step and the shutter is thus released. Moreover, there is also a problem that a hand movement is caused while the user is pressing the 2-step switch down to the first step and maintaining the halfway press state, and it is thus difficult to grasp whether the lens is focused.

The problems as described above can be solved by the operation section 223 (including determination button 211 (or determination button 411) and switch) described with reference to FIGS. 31 to 38, 57, and 60.

The operation section 223 (sensor module) includes a press member including a press surface, a sensor including a detection area in which a presence of a body part of a user on the press surface is detected, and a detection means for detecting a press operation to the press member.

The "detection area" includes a spatial area and a planar area. The sensor may be any of the reflection-type optical sensor 252, the transmission-type optical sensor 452, and the capacitance sensor 352. Any sensor may be used as long as it is a sensor capable of forming a detection area on the press surface.

Accordingly, by moving a finger to the detection area or touching the detection area with the finger, the user can cause an auto-focus function of a camera to operate, for example. Therefore, since it is unnecessary for the user to maintain the halfway press state, the user can operate the operation section without stress.

Moreover, with the structure described above, the user can operate the operation section 223 by a series of simple operations using a finger, including moving a finger to the detection area and pressing with the finger in the detection area.

Accordingly, the user can intuitively operate two different functions (e.g., auto-focus function and shutter function). It should be noted that the operation section 223 may of course be used in electronic apparatuses other than a camera.

Here, in FIG. 38 described above, processing carried out in a case where the operation section 223 is applied to the input apparatus has been described. Steps 702, 703, 705, and 707 of FIG. 38 are processes unique to the case where the operation section 223 is applied to the input apparatus. Thus, when the operation section 223 is applied to electronic apparatuses other than the input apparatus, processes unique to those electronic apparatuses only need to be executed in the steps above.

In the operation section, the sensor may include a light-emitting device that irradiates light onto the detection area, a light-receiving device that detects the light reflected by the detection area, and a voltage control means for controlling a voltage to be intermittently supplied to the light-emitting device in a predetermined cycle and controlling the voltage to be successively supplied to the light-receiving device irrespective of the cycle.

As described above with reference to FIGS. 39 to 41, due to the periodical light emission from the optical sensor 252, power consumption of the optical sensor 252 can be reduced. In addition, since a pulse-like voltage is intermittently supplied to the light-emitting device 252a and a voltage is successively supplied to the light-receiving device 252b, it is possible to prevent a floating capacitance from being generated in the light-receiving device 270b. As a result, a false detection by the light-receiving device 252b can be prevented from occurring.

The operation section may further include a cycle control means for variably controlling the cycle. For example, by prolonging the cycle when a necessity of the optical sensor to detect a presence of the detection target is low, more power can be saved.

Typically, the cycle control means controls the cycle so that the cycle is prolonged as a time period up until a time a presence of a body part of a user is detected in the detection area since it has become undetected becomes longer. Alternatively, the cycle control means may control the cycle so that the cycle is prolonged as a time period up until a time the presence of the body part of the user is detected in the detection area since a start of power supply to the sensor from a power source becomes longer.

For example, as described above with reference to FIGS. 47 to 49, the reference cycle $T_0$ is set to the first cycle after an elapse of the first preset time period since a cancel of an input of a light-receiving signal from the light-receiving device 252b. Moreover, processing of setting the first cycle to the second cycle after an elapse of the second preset time period since the cancel of the input of the light-receiving signal from the light-receiving device 252b only needs to be executed.

It should be noted that in FIG. 47, Steps 1106 to 1108 are processes unique to the case where the optical sensor 252 is applied to the input apparatus 200. Therefore, when the optical sensor 252 is applied to electronic apparatuses other than the input apparatus, processes unique to those electronic apparatuses only need to be executed in Steps 1106 to 1108.

In the sensor, the light-receiving device may output a light-receiving signal corresponding to an intensity of the detected light, and the sensor may further include a judgment means for judging whether the light-receiving signal has been input in accordance with a change amount of an output value of the light-receiving signal.

For example, the judgment on whether a light-receiving signal has been input only needs to be made by executing the processing described with reference to FIGS. 53 and 54. Accordingly, the influence of disturbance light can be removed effectively.

Alternatively, the processing described with reference to FIG. 55 may be executed. In other words, the MPU may recognize a change amount of an output voltage by sampling the output voltages from the light-receiving device 252b and converting them into digital signals and judge whether a light-receiving signal has been input. Accordingly, since the time period during which the light-emitting device 252a emits light can be shortened, power consumption of the optical sensor 252 can be additionally reduced. In addition, since the judgment on whether a light-receiving signal has been input is made based on the change amount of the output voltage, the influence of disturbance light can be removed effectively.

Moreover, for suppressing the influence of disturbance light, an optical thin film (wavelength selection film) may be formed on the upper surface 255a of the lens member 255 or the light-receiving surface of the light-receiving device 252b as described with reference to FIGS. 58 and 59. In other words, the sensor may further include a light-emitting device that irradiates light onto the detection area, a light-receiving device that detects the light reflected by the detection area, and a wavelength selection area that selectively causes light belonging to a wavelength range of the light emitted from the light-emitting device to transmit therethrough out of the light irradiated onto the light-receiving device. The light-emitting device 252a may emit light that belongs to near infrared rays having a center wavelength near 950 nm, and the light-receiving device 252b may have a peak value of a relative sensitivity near 950 nm. In this case, the optical thin film is formed to selectively cause light within a wavelength range of 900 nm to 1000 nm to transmit therethrough and cut light belonging to wavelength ranges of 900 nm or less and 1000 nm or more.

Alternatively, as described with reference to FIGS. 64 and 65, the influence of disturbance light may be suppressed by a circuit. Specifically, in the operation section, the light-receiving device may output a light-receiving signal corresponding to an intensity of the detected light, and the operation section may further include a removal means for receiving the light-receiving signal and removing a DC component of the light-receiving signal and a waveform-shaping means for shaping a waveform of the light-receiving signal from which the DC component has been removed. As a result, the influence of disturbance light can be removed effectively.

The above embodiments described heretofore are also applicable to a handheld apparatus. The handheld apparatus is a device that is obtained by providing a display section to a device like an input apparatus and displays a pointer and other images on the display section. In this case, the motion sensor and the various 2-step switches may be applied to the handheld apparatus. The various 2-step switches include the 2-step push-type switch shown in FIGS. 7 and 22 and the 2-step switch used in the optical sensors shown in FIGS. 37, 57, 60, 62, and 68 to 80. Moreover, when the above embodiments are applied to the handheld apparatus, the handheld apparatus can execute the processing of FIG. 12 (excluding transmission and reception of velocity values of Steps 116 and 117), 17, 19, 20, 38, 43, 44, 46, 47, 50, 54, 56, 61, and 63 to 65.

Examples of the handheld apparatus include a cellular phone, a compact PC, and a PDA (Personal Digital Assistance).

The input apparatuses of the above embodiments transmit the input information to the control apparatus wirelessly. However, the input information may be transmitted by wire.

In the above embodiments, the pointer 2 that moves on the screen in accordance with the movement of each of the input apparatuses and the like has been represented as an image of an arrow. However, the image of the pointer 2 is not limited to the arrow and may be a simple circle, square, or the like, or a character image or any other images.

The detection axes of each of the angular velocity sensor unit 15 and the acceleration sensor unit 16 of the sensor unit 17 and the like do not necessarily need to be mutually orthogonal like the X' axis and the Y' axis described above. In this case, the accelerations respectively projected in the mutually-orthogonal axial directions can be obtained by a calculation that uses a trigonometric function. Similarly, the angular velocities about the mutually-orthogonal axes can be obtained by a calculation that uses the trigonometric function.

Descriptions have been given on the case where the X' and Y' detection axes of the angular velocity sensor unit 15 and the X' and Y' detection axes of the acceleration sensor unit 16 of the sensor unit 17 described in the above embodiments match. However, those detection axes do not necessarily need to match. For example, in a case where the angular velocity sensor unit 15 and the acceleration sensor unit 16 are mounted on a substrate, the angular velocity sensor unit 15 and the acceleration sensor unit 16 may be mounted while being deviated a predetermined rotational angle within a main surface of the substrate so that the detection axes of the angular velocity sensor unit 15 and the acceleration sensor unit 16 do not match. In this case, the accelerations and angular velocities with respect to the respective axes can be obtained by a calculation that uses the trigonometric function.

Next, a switch module equipped with an optical sensor will be described.

FIG. 69 is a cross-sectional diagram showing a switch module according to one embodiment. FIG. 70 is an exploded cross-sectional diagram of the switch module, and FIG. 71 is a plan view thereof.

A switch module 230 includes a shield case 131, an elastic member 133, a sensor module body 500, and a cover 132.

The shield case 131 includes an accommodation space 131*a* penetrating a main body of the shield case 131, and the sensor module body 500 is fitted into the accommodation space 131*a*. Instead of the accommodation space 131*a* penetrating the main body, a base may be provided to the shield case 131. The shield case 131 functions as a support body that supports the cover 132 and the sensor module body 500.

The shield case 131 is formed of a material that is capable of shielding the disturbance light described above. Well-known materials such as a resin and metal only need to be used as the material. The shield case 131 is, for example, cylindrical, but it may instead take other shapes like a rectangular column.

The sensor module body 500 includes an optical sensor 510 including a light-emitting device 501 and a light-receiving device 502 and a retention case 503 that integrally retains the light-emitting device 501 and the light-receiving device 502. The retention case 503 includes concave portions 504 and 505, and the light-emitting device 501 and the light-receiving device 502 are sealed by sealing members 507 inside the concave portions 504 and 505, respectively, and integrally retained in the retention case 503.

For the sealing members 507, a material through which light that is emitted from the light-emitting device 501 and has a predetermined wavelength range (e.g., infrared rays and visible light described above) can transmit only needs to be used. Well-known resin materials such as acryl, polycarbonate, PET, PMMA, and ABS, for example, only need to be used as the material.

The optical sensor 510 only needs to include the light-emitting device 501 and the light-receiving device 502 so as to have the same structure as the optical sensor 252, for example. To prevent the light-receiving device 502 from directly receiving light emitted from the light-emitting device 501, a wall member 506 that shields the light is interposed between the light-emitting device 501 and the light-receiving device 502. In other words, the wall member 506 has a function as the light shield plate 256 shown in FIG. 37 and the like. The wall member 506 is erected at substantially the center of the retention case 503, for example. Although the retention case 503 has a shape of a rectangular column, it may instead take a shape of a cylinder or other shapes.

The cover 132 is capable of being applied with a force caused by a touch of the user (including pressing force). As described above, a detection area is formed in the optical sensor 510 on an upper-surface side of the cover 132, and the upper surface of the cover 132 serves as a contact surface that a finger 98 of a user touches as described above, for example. However, a cover material (not shown) like a decorative sheet may be additionally mounted on the cover 132. In this case, a force is applied to the cover 132 by the user via the decorative sheet. The press member of the operation section 223 (sensor module) described above also has substantially the same structure and function as the cover 132.

The cover 132 is attached at an upper end of the shield case 131 so that an absorption area is provided between the cover 132 and the sensor module body 500. Here, the absorption area corresponds to the elastic member 133.

A material through which light that is emitted from the light-emitting device 501 and has a predetermined wavelength range (e.g., infrared rays and visible light described above) can transmit only needs to be used as the material of the cover 132. Well-known materials such as acryl, polycarbonate, PET, PMMA, and ABS, for example, only need to be used as the material. The material of the cover 132 may either be the same as or different from the material of the sealing members 507.

As described above, the elastic member 133 constitutes the absorption area that is interposed between the cover 132 and the sensor module body 500 and absorbs a force applied to the cover 132 by the user. The elastic member 133 only needs to be formed of a well-known material such as rubber, αGel, and other resins.

The sealing members 507, the elastic member 133, and the cover 132 may all be formed of the same material or may be formed of different materials. Particularly when the sealing members 507 and the elastic member 133 (or all the members 507, 133, and 132) have substantially the same optical refractive index or close optical refractive indices, for example, it is possible to effectively prevent generation of beam-like reflected light indicated by the broken line in FIG. 69. When reflected light is generated, there is a fear that the reflected light may enter the light-receiving device 502 to thus cause a false detection as in the case where the light-receiving device 502 receives disturbance light as described above. However, in this embodiment, such a false detection can be prevented from occurring.

As described above, in this embodiment, since the elastic member 133 is interposed between the cover 132 and the sensor module body 500, even when a force is applied to the cover 132 by the user, a fear that the sensor module body 500 may be damaged, for example, can be eliminated.

FIG. 72 is a cross-sectional diagram showing a switch module according to another embodiment. In descriptions below, descriptions on components, functions, and the like that are the same as those of the switch module 130 according to the embodiment shown in FIG. 69 and the like will be simplified or omitted, and different points will mainly be described.

A switch module 140 is different from the switch module 130 in that the absorption area is a space 143. The space 143 absorbs a force applied to the cover 132 by the user, with the result that the sensor module body 500 can be prevented from being damaged.

When wishing to remove reflected light in the cover 132 that is indicated by arrows in broken lines in the switch module 140, an antireflection film 155 only needs to be provided on the absorption-area side of the cover 132, that is, a lower-surface side thereof as in a switch module 150 shown in FIG. 73. The antireflection film 155 may be provided on an upper-surface side (detection-area side) of the cover 132 or both the lower-surface side and the upper-surface side of the cover 132.

Alternatively, a wavelength selection film (not shown) may be provided in place of or laminated on the antireflection film 155. The wavelength selection film may be the wavelength selection film described above. The wavelength selection film may be disposed at any position as long as it is on an optical path between the light-emitting device 501 and the light-receiving device 502.

FIG. 74 is a cross-sectional diagram showing a switch module according to still another embodiment.

A cover 142 of a switch module 160 includes a protrusion 142a on a lower-surface side thereof. Since the protrusion 142a shields light from the light-emitting device 501 reflected on the lower surface of the cover 142, it is possible to prevent the light-receiving device 502 from detecting the reflected light. The protrusion 142a does not need to have a triangular cross section as shown in FIG. 74, and the cross-sectional shape may be a polygon with four or more sides.

For example, the following effect can be obtained when a lens-like protrusion 144a is formed on a lower-surface side of a cover 144 as in a switch module 170 shown in FIG. 75. The protrusion 144a can prevent reflected light from reaching the light-receiving device 502 and efficiently collect light reflected by a finger of a user in the light-receiving device 502 as described in the embodiment corresponding to FIG. 37.

FIG. 76 is a cross-sectional diagram showing a switch module according to still another embodiment.

An absorption area of a switch module 180 is constituted of the space 143 and an elastic member 135 provide inside the space 143. The elastic member 135 is provided on the wall member 506 in the retention case 503 so as to extend therefrom, and an upper end thereof is in contact with the lower surface of the cover 132, for example. A width d1 of the elastic member 135 is substantially the same as a width d2 of the wall member 506, but the widths may differ more or less. Alternatively, the width d1 of the elastic member 135 may be narrower than a width of the elastic member 133 shown in FIG. 69 but wider than the width d2.

Since the elastic member 135 shields the light from the light-emitting device 501 reflected on the lower surface of the cover 132, it is possible to prevent the light-receiving device 502 from detecting the reflected light and effectively absorb a force applied to the cover 132.

Alternatively, as in a switch module 190 shown in FIG. 77, the elastic member 135 does not need to be in contact with the wall member 506 at a lower end thereof as long as it can shield reflected light. Alternatively, though not shown, a structure in which the lower end of the elastic member 135 is in contact with the wall member 506 but the upper end thereof is not in contact with the cover 132 is also possible.

FIG. 78 is a cross-sectional diagram showing a switch module according to still another embodiment.

A cover 172 of a switch module 210 includes an optical path 136 of the sensor module body 500 that gradually widens from a transmissive aperture plane 137 provided on an upper-surface side thereof toward the sensor module body 500. Specifically, the transmissive aperture plane 137 as an upper end of the optical path 136 is formed to be smaller than an arrangement surface S including a plane on which the light-emitting device 501 and the light-receiving device 502 are arranged. A material of the optical path 136 may either be the same as or different from the material of the sealing members 507, for example.

By thus forming the transmissive aperture plane 137 small, the following effect can be obtained. For example, disturbance light is prevented from entering the sensor module body 500 when the finger 98 of the user touches the cover 132. In particular, it is known that, among disturbance light, infrared rays are easily transmitted through a flesh portion 98a of the finger 98 of the user, but a bone portion 98b is apt to absorb the infrared rays. Thus, though there are differences among individual users, by providing a small transmissive aperture plane 137 so as to correspond to a size of the bone 98b, disturbance light including infrared rays can be prevented from entering.

FIG. 79 is a cross-sectional diagram showing a switch module according to still another embodiment.

A switch module 220 is different from the switch module 210 shown in FIG. 78 in that a shield wall 163a that shields disturbance light is provided in a cover 163. Specifically, the cover 163 has a concave surface constituted of a bottom portion including the transmissive aperture plane 137 as a side that receives a force from the user and the shield wall 163a higher than the bottom portion. When the cover 163 is practically a square when seen on a plane, the shield wall 163a is provided along three sides of the square of the cover 163 as shown in FIG. 80. Since the shield wall 163a is provided so as to surround the finger 98 of the user as described above, disturbance light is prevented from entering the sensor module body 500. In addition, since the transmissive aperture plane 137 is formed to be small, infrared rays as disturbance light that has transmitted through the flesh portion 98a of the finger 98 can be prevented from entering the sensor module body 500 as shown in FIG. 78.

Moreover, due to such a concave surface, at a time the user applies a force to the cover 163, the shield wall 163a exerts a function of guiding a finger of the user to a position right above the transmissive aperture plane 137. Therefore, the user is capable of tactually recognizing the position of the switch module 220 with ease without relying on visual senses.

The shield wall 163a may be provided on one side, two sides, or four sides instead of along three sides of the cover 163. When a shape of the cover 163 seen on a plane is a circle or an oval, the shield wall only needs to be provided at least partially along a circumferential edge portion of that circle or oval.

A switch module including a combination of at least two feature portions included in the switch modules 130, 140, 150, 160, 170, 180, 190, 210, and 220 shown in FIGS. 69 to 80 can also be realized. For example, the elastic member 133 shown in FIG. 69 may be provided in the switch modules 160 (see FIG. 74), 210 (see FIG. 78), and 220 (see FIG. 79). Alternatively, the shield wall 163a of the switch module 220 may be provided in other switch modules 130, 140, 150, 160, 170, 180, and 190.

The switch modules 130, 140, 150, 160, 170, 180, 190, 210, and 220 described heretofore may of course be constituted as a 2-step switch provided on a push-type switch shown in FIGS. 31, 32, and the like.

1. An Optical Sensor, Comprising:
    a detection unit including a detection area, a light-emitting device that emits light for detecting a detection target in the detection area, and a light-receiving device that detects the light emitted from the light-emitting device; and
    a voltage control means for controlling a voltage to be intermittently supplied to the light-emitting device in a predetermined cycle and controlling the voltage to be successively supplied to the light-receiving device irrespective of the cycle.

2. The optical sensor according to claim 1, further comprising
    a cycle control means for variably controlling the cycle.

3. The optical sensor according to claim 2,
    wherein the cycle control means controls the cycle so that the cycle is prolonged as a time period up until a time the detection target is detected since it has become undetected becomes longer.

4. The optical sensor according to claim 2,
    wherein the cycle control means controls the cycle so that the cycle is prolonged as a time period up until a time the detection target is detected since a start of power supply to the optical sensor from a power source becomes longer.

5. The optical sensor according to claim 1,
    wherein the light-receiving device outputs a light-receiving signal corresponding to an intensity of the detected light,
    the optical sensor further comprising
    a judgment means for judging whether the light-receiving signal has been input based on a change amount of an output value of the light-receiving signal.

6. The optical sensor according to claim 5,
    wherein the judgment on the input of the light-receiving signal is made based on whether a difference between the output value of the light-receiving signal obtained at a time the light-emitting device, that emits light in the cycle, is emitting light and the output value of the light-receiving signal obtained at a time the light is turned off exceeds a predetermined threshold value.

7. The optical sensor according to claim 1, further comprising
    a wavelength selection area to selectively cause light belonging to a wavelength range of the light emitted from the light-emitting device to transmit therethrough out of the light irradiated onto the light-receiving device.

8. The optical sensor according to claim 1,
    wherein the light-receiving device outputs a light-receiving signal corresponding to an intensity of the detected light,
    the optical sensor further comprising:
    a removal means for receiving the light-receiving signal and removing a DC component of the light-receiving signal; and
    a waveform-shaping means for shaping a waveform of the light-receiving signal from which the DC component has been removed.

9. The optical sensor according to claim 1, further comprising:
    a press member that includes a press surface that is pressed by a user and is provided such that the detection area is located above the press surface; and
    a detection means for detecting a press operation to the press member.

10. A sensor module, comprising:
    a transmissive member that includes a press surface that is pressed by a user and is formed of a transmissive material that causes light to transmit therethrough;
    an optical sensor including a detection area in which a presence of a body part of the user above the press surface is detected;
    a support member that integrally supports the press member and the optical sensor; and
    a detection means for detecting a press operation to the press member.

11. The sensor module according to claim 10,
    wherein the optical sensor is resin-sealed by the transmissive member.

12. The sensor module according to claim 10,
    wherein the optical sensor includes
    a light-emitting device that irradiates the light onto the detection area, and
    a light-receiving device that detects the light and is aligned with the light-emitting device in a direction different from a direction extending from the light-emitting device to the detection area, and
    wherein the support member includes
    a retention base that retains the light-emitting device and the light-receiving device, and
    a light shield member that is provided on the retention base between the light-emitting device and the light-receiving device so that it comes into contact with the transmissive member and shields the light from the light-emitting device.

Figure 1:
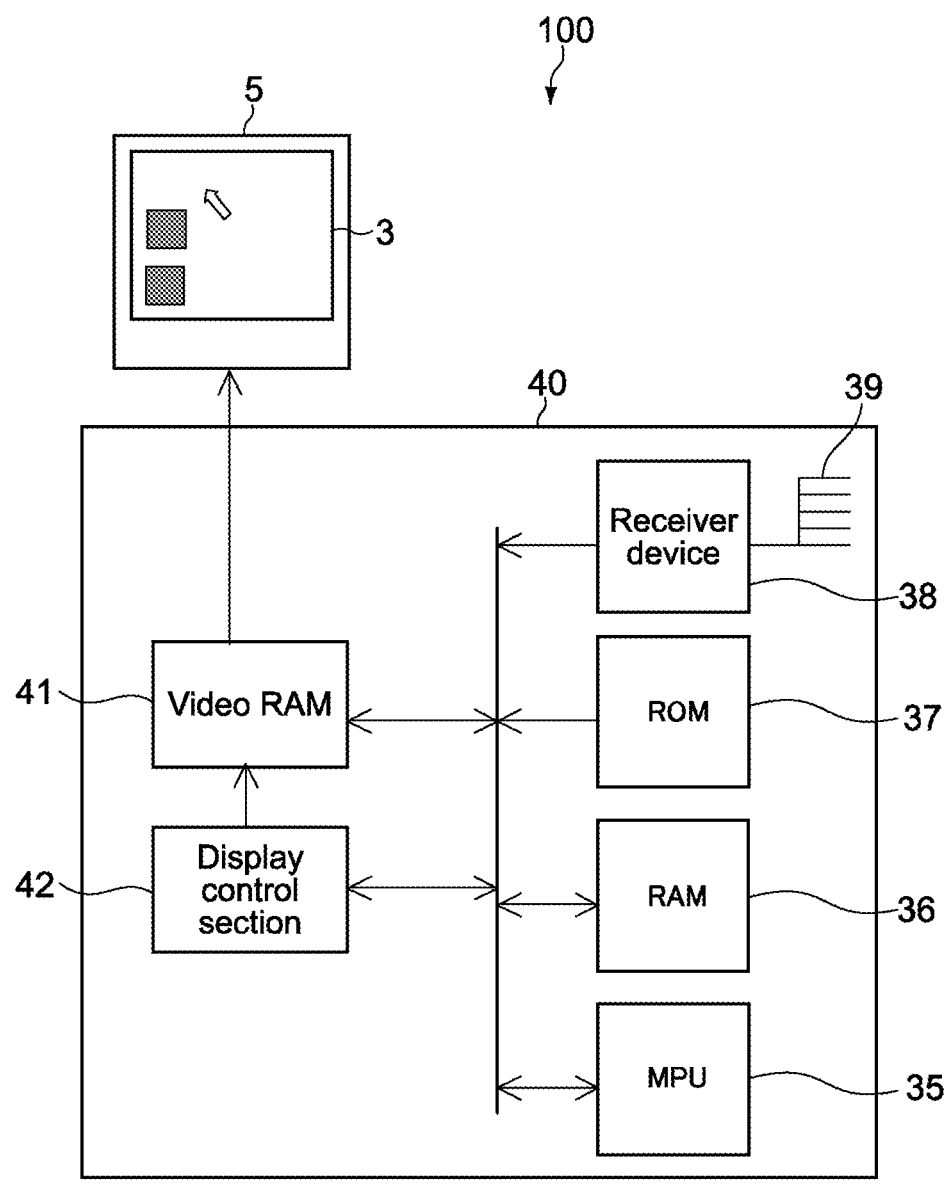
[FIG. 1] A diagram showing a control system according to an embodiment of the present invention.
Figure 1:
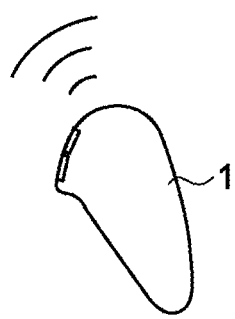
Figure 2:
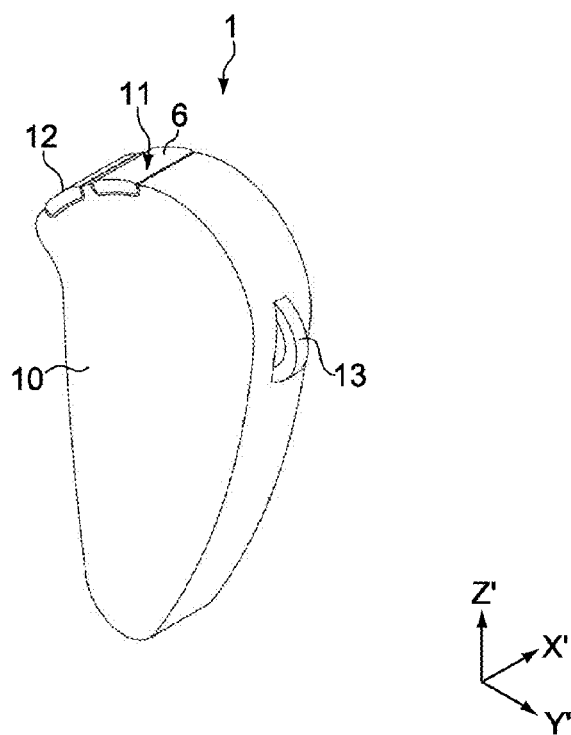
[FIG. 2] A perspective view showing an input apparatus.
Figure 3:
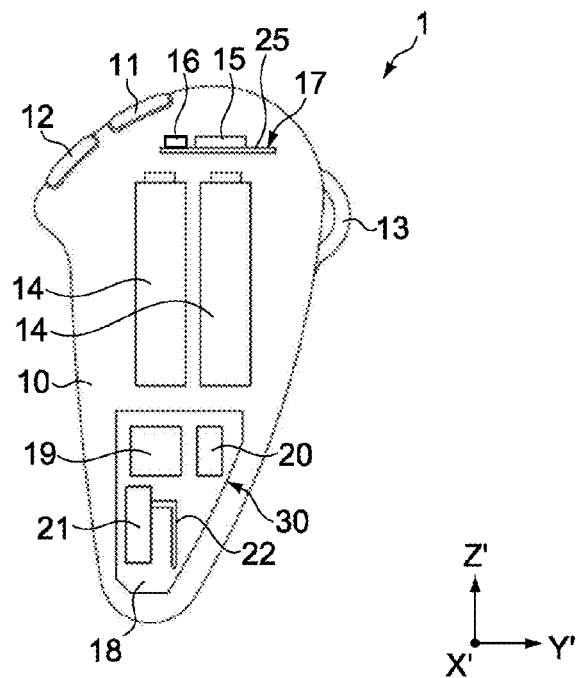
[FIG. 3] A diagram schematically showing an internal structure of the input apparatus.
Figure 4:
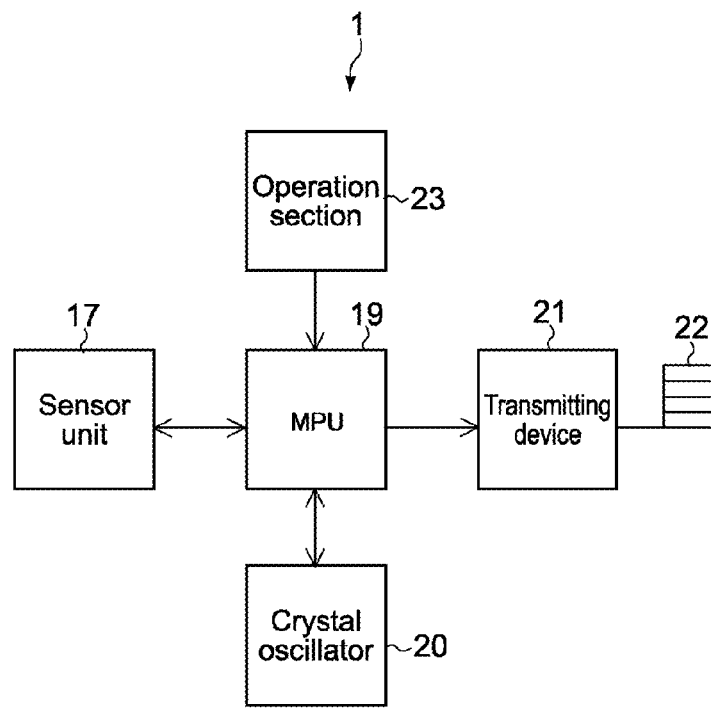
[FIG. 4] A block diagram showing an electrical structure of the input apparatus.
Figure 5:
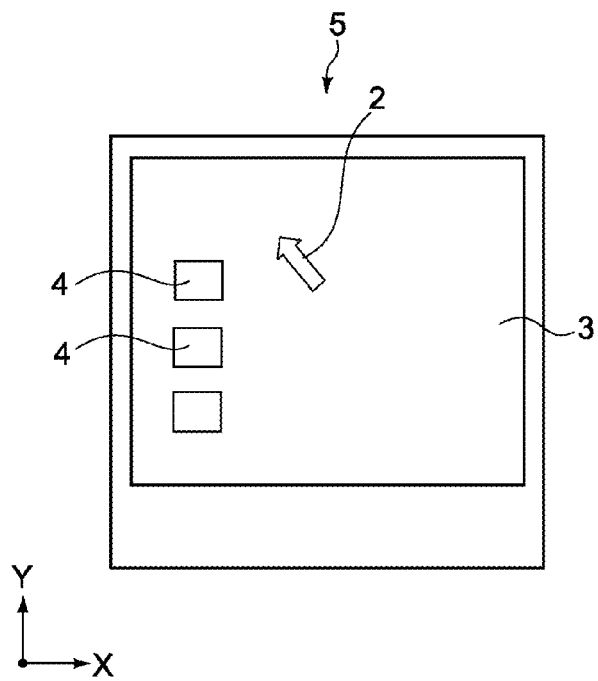
[FIG. 5] A diagram showing an example of a screen displayed on a display apparatus.
Figure 6:
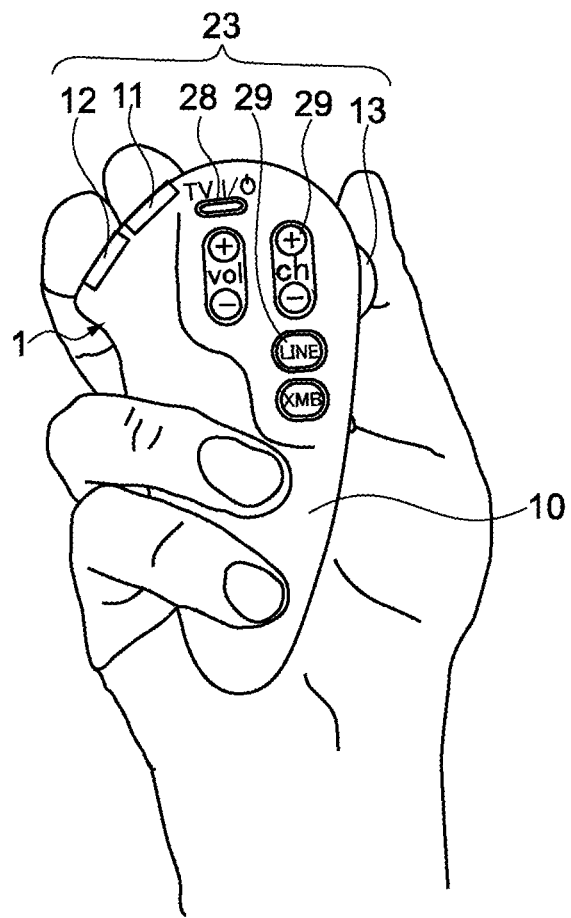
[FIG. 6] A diagram showing a state where a user is holding the input apparatus.
Figure 7:
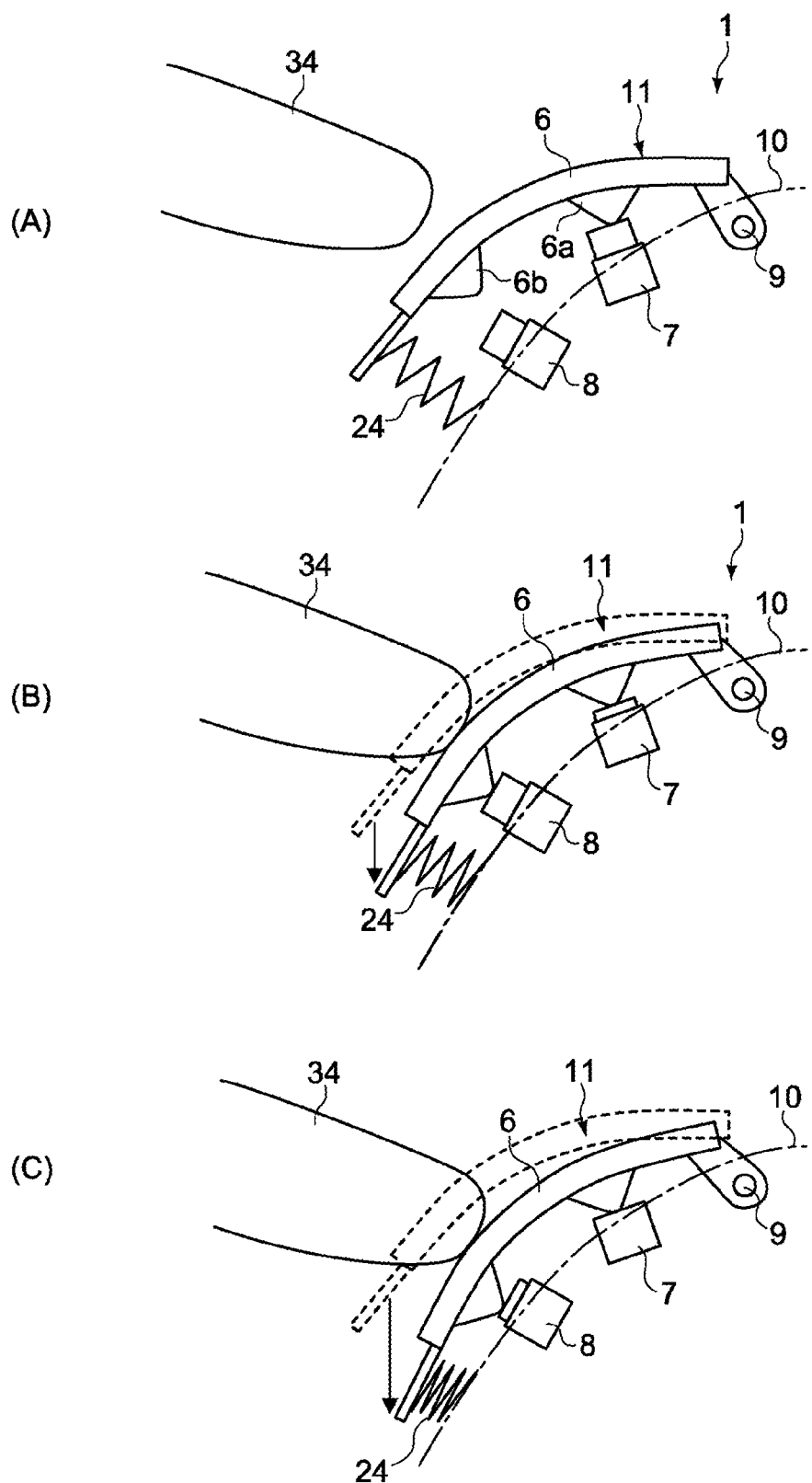
[FIG. 7] Schematic diagrams showing a structure of an operation button 11.
Figure 8:
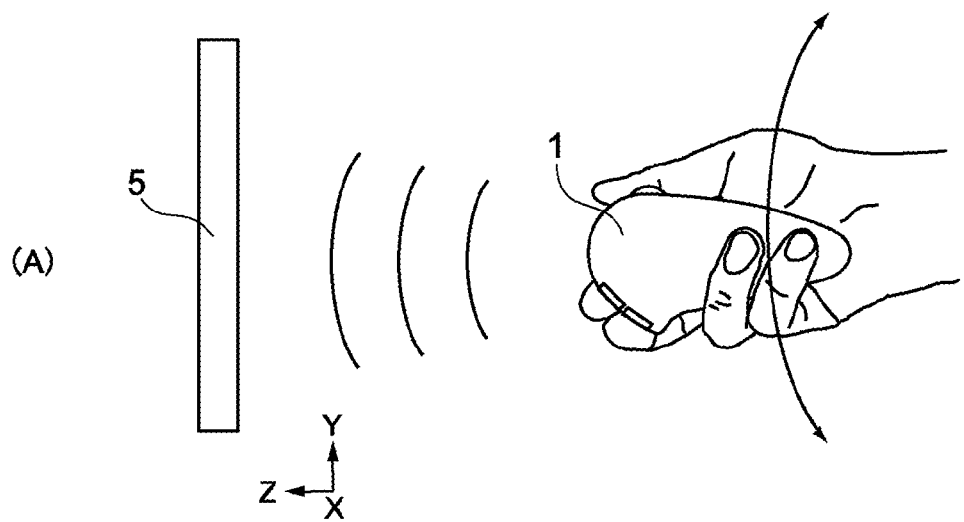
[FIG. 8] Explanatory diagrams showing typical examples of ways of moving the input apparatus and ways a pointer moves on a screen accordingly.
Figure 8:
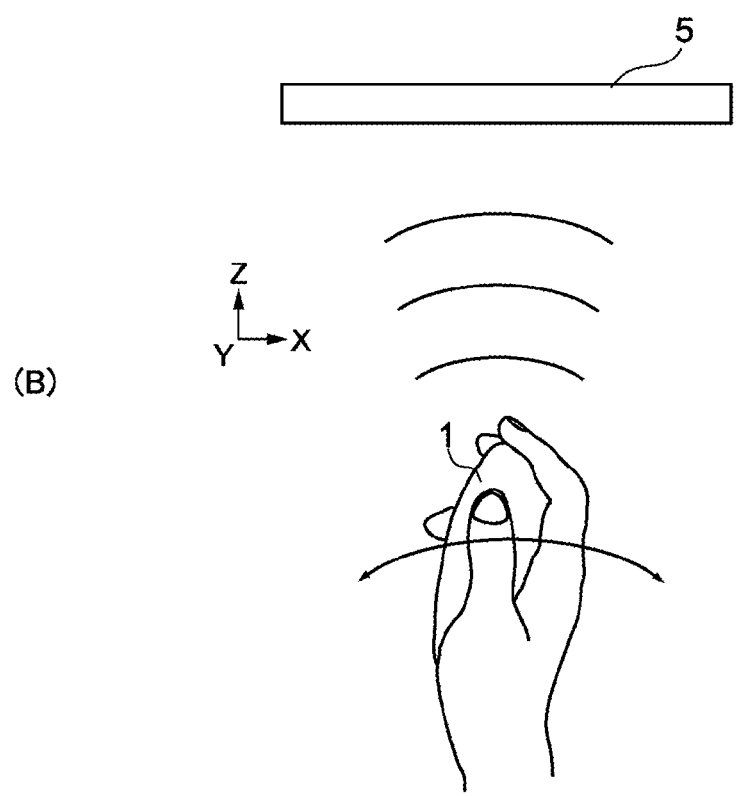
Figure 9:
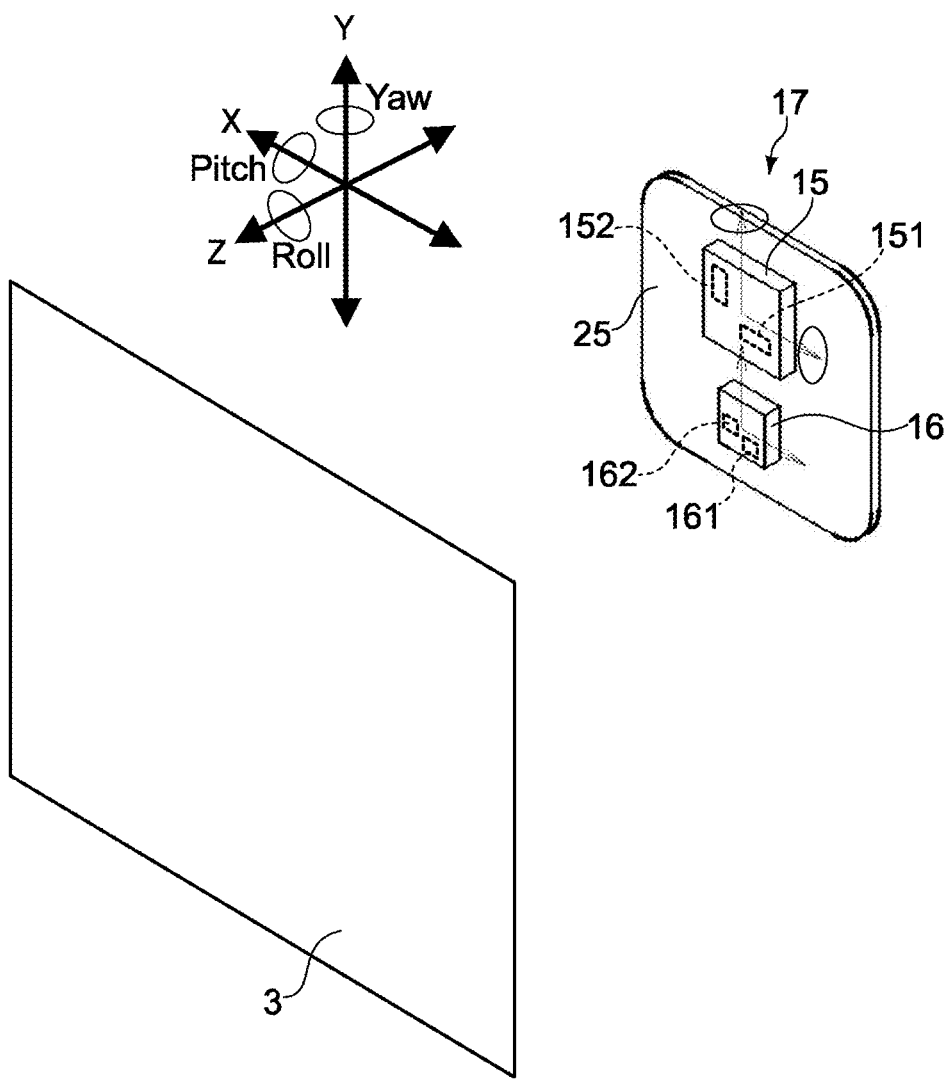
[FIG. 9] A perspective view showing a sensor unit.
Figure 10:
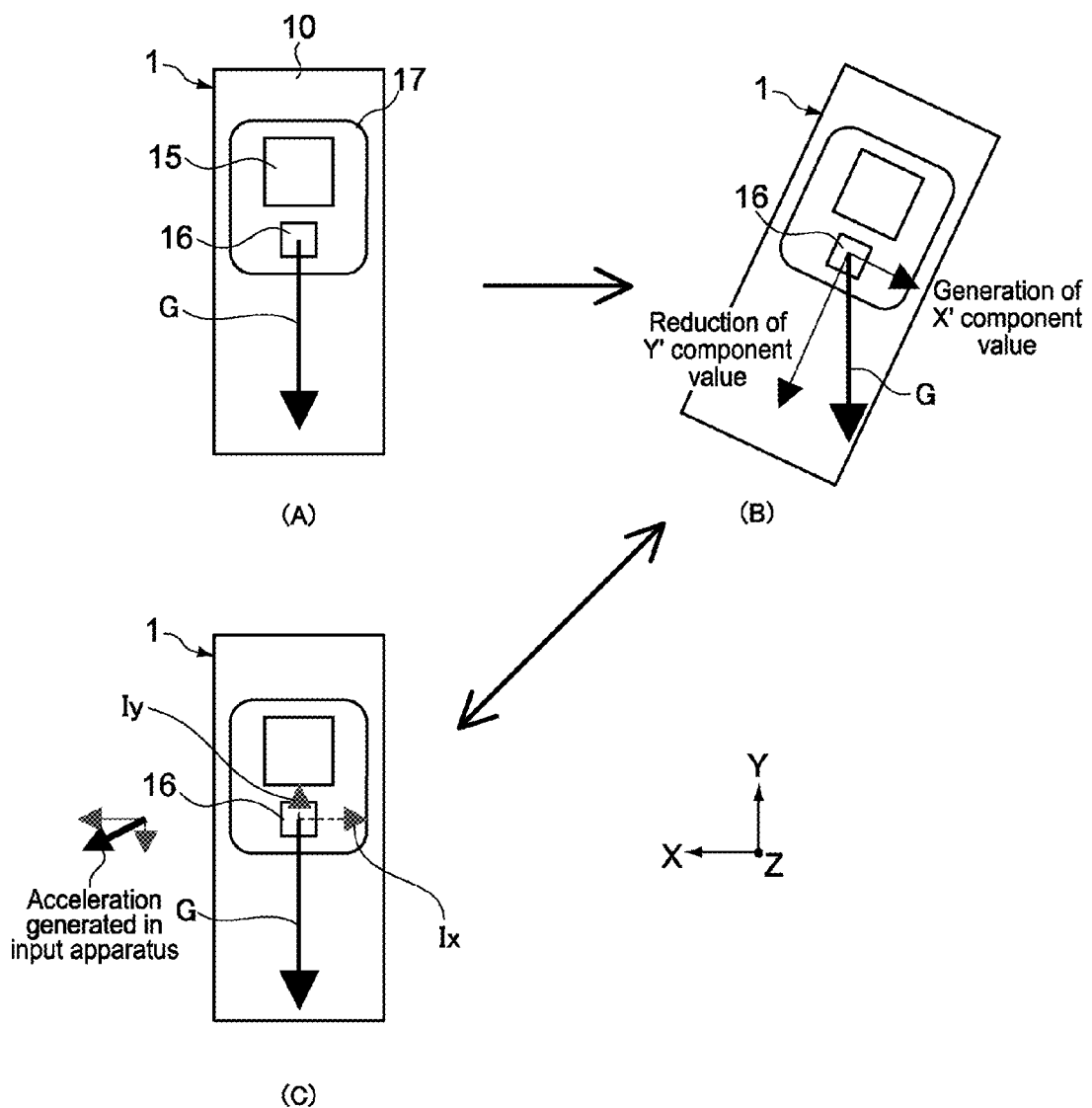
[FIG. 10] Diagrams for illustrating a gravitational effect with respect to an acceleration sensor unit.
Figure 11:
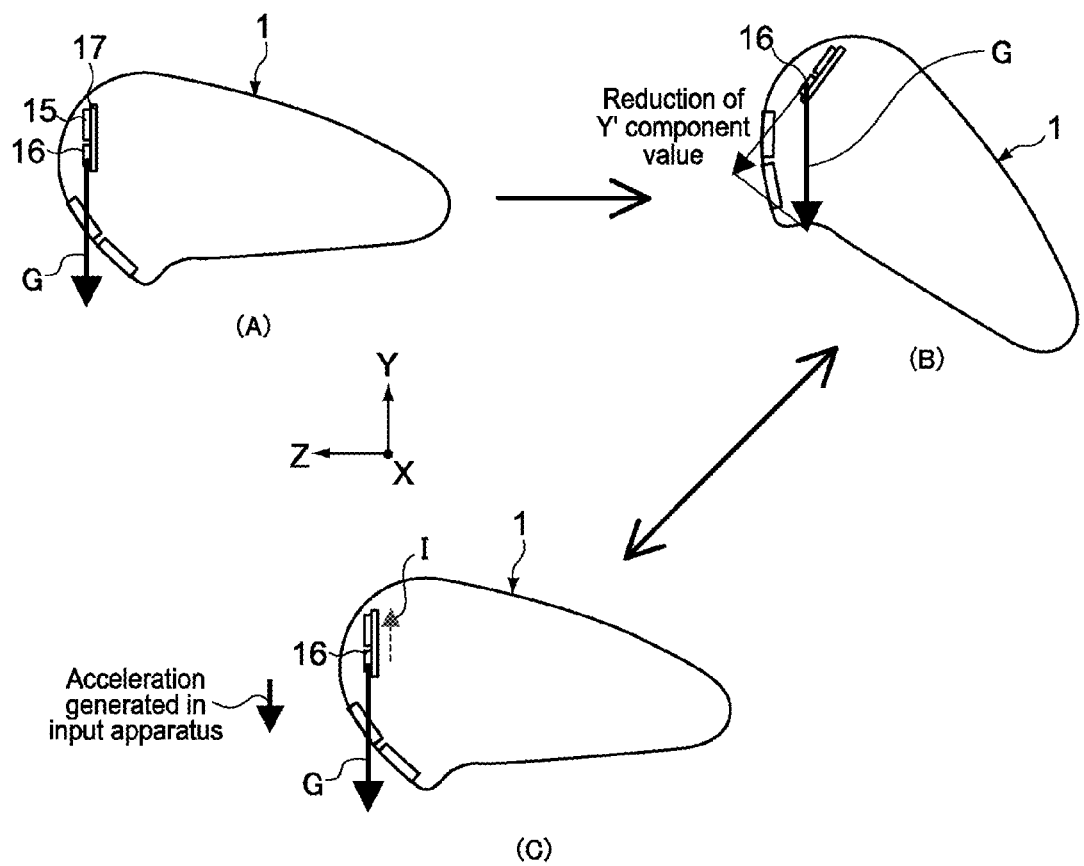
[FIG. 11] Other diagrams for illustrating the gravitational effect with respect to the acceleration sensor unit.
Figure 12:
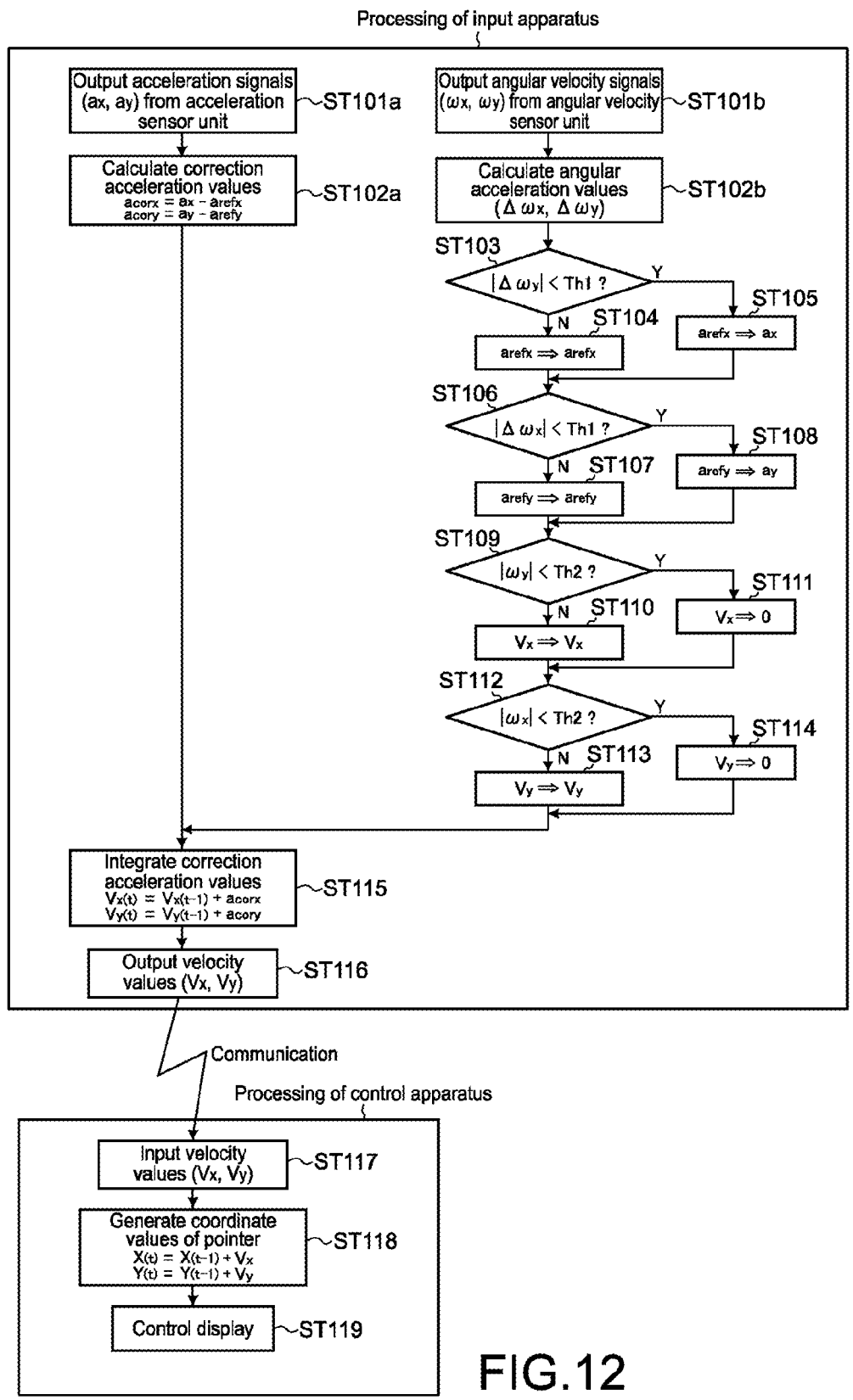
[FIG. 12] A flowchart showing an operation performed when calculating velocity values of the input apparatus based on angular velocity values detected by an angular velocity sensor unit.
Figure 13:
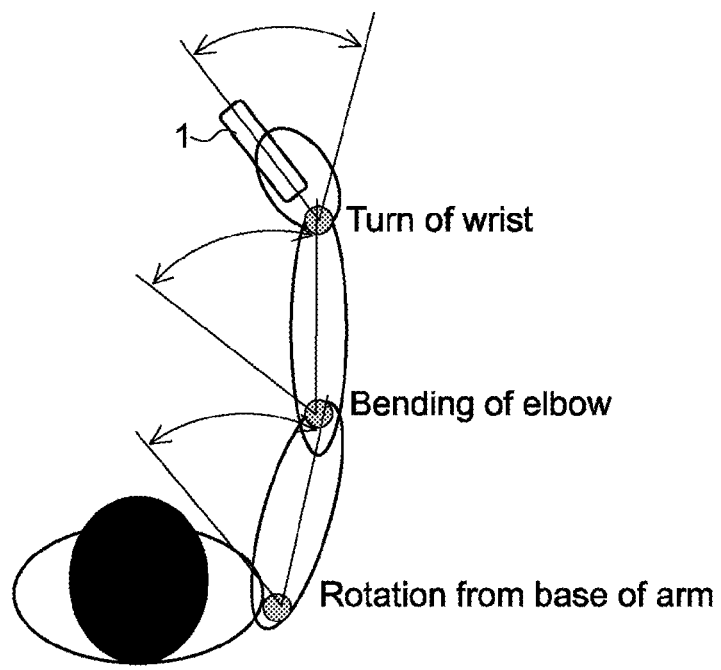
[FIG. 13] A top view of the user operating the input apparatus.
Figure 14:
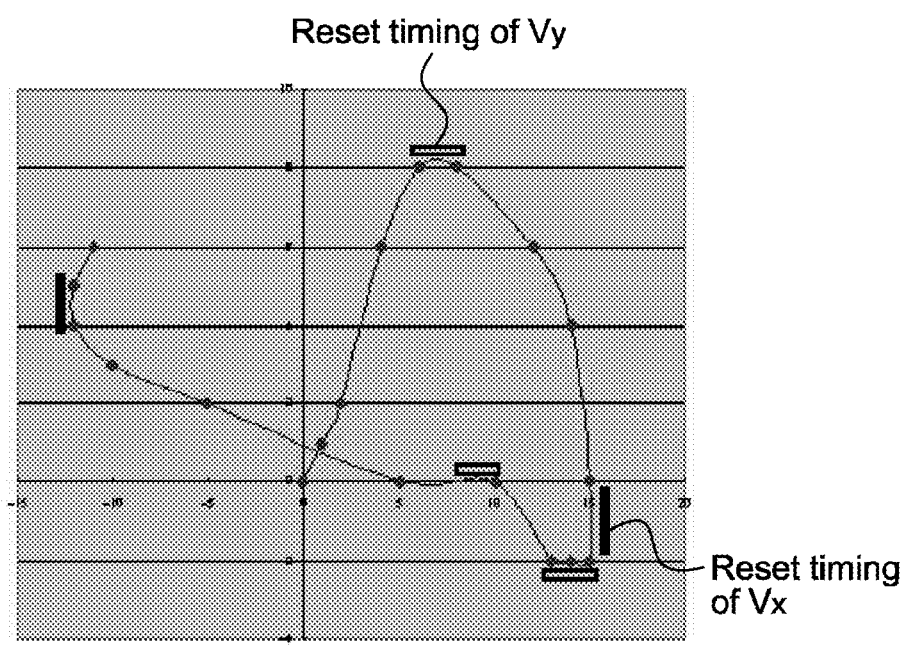
[FIG. 14] A diagram showing an example of a trajectory of the input apparatus seen from a plane formed by an X axis and a Y axis.
Figure 15:
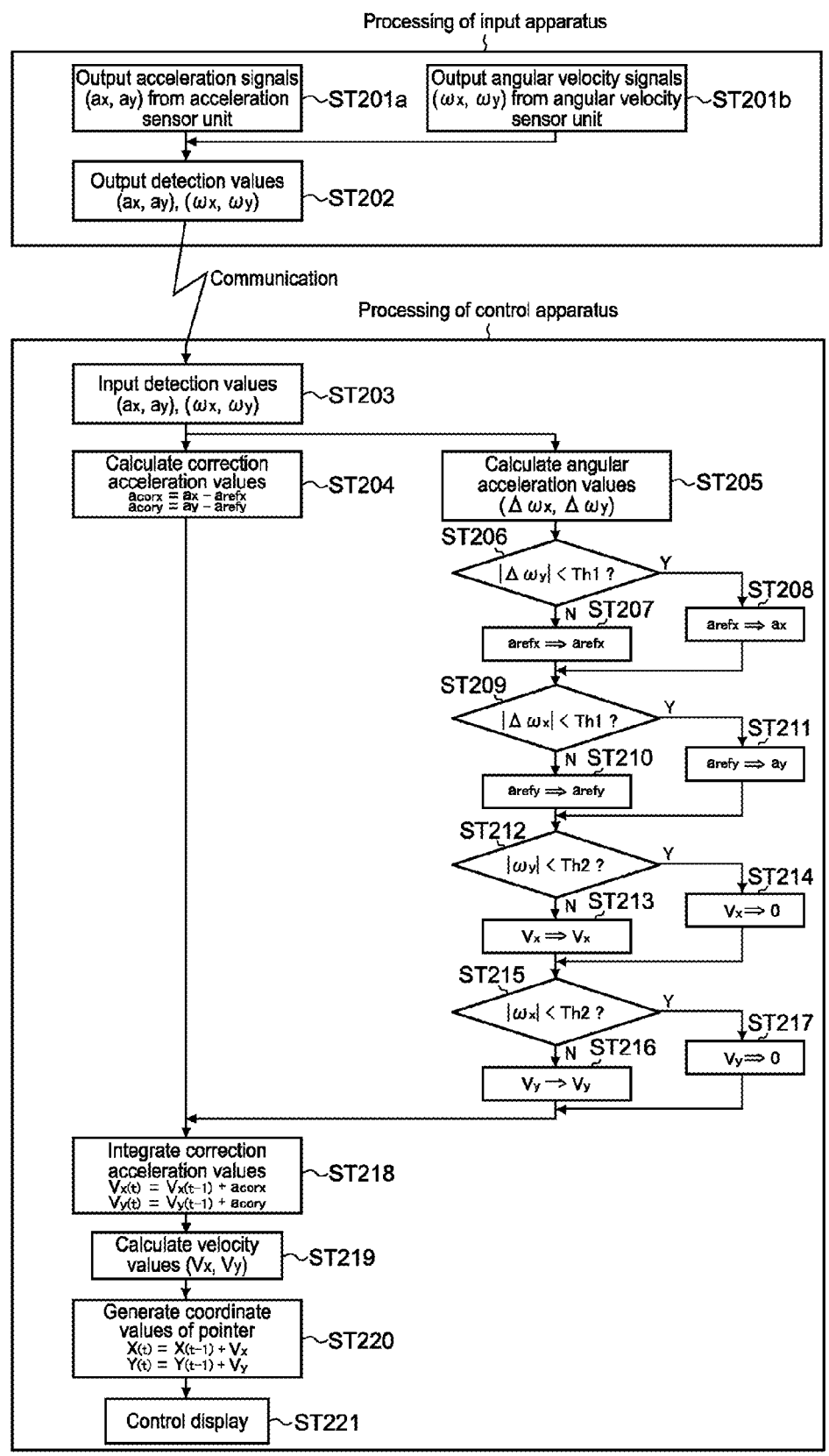
[FIG. 15] A flowchart showing another embodiment described above.
Figure 16:
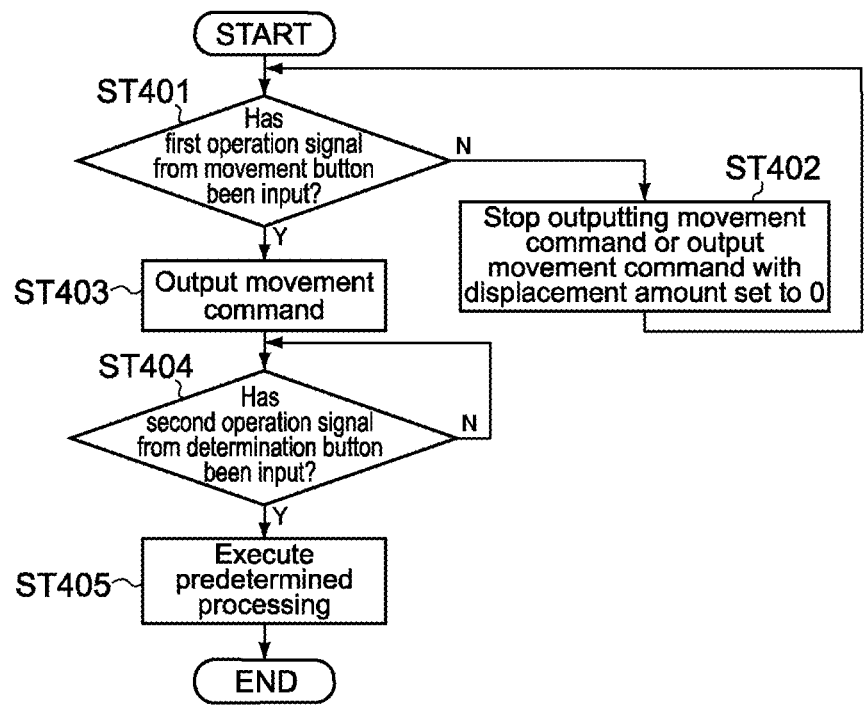
[FIG. 16] A flowchart showing an operation of the input apparatus performed when the operation button shown in FIG. 7 is pressed.
Figure 17:
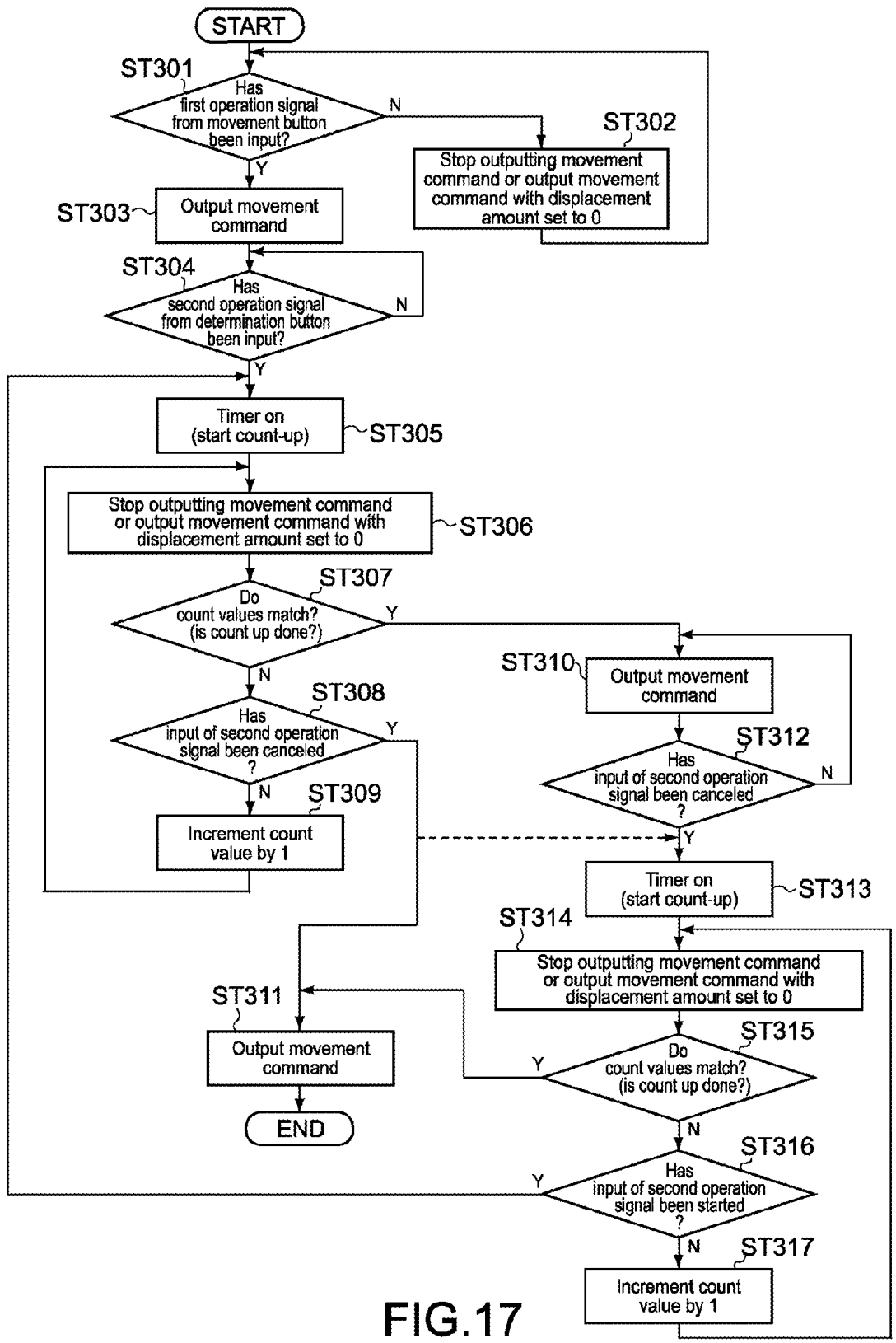
[FIG. 17] A flowchart showing an operation according to another embodiment at a time a determination button of the operation button is operated.
Figure 18:
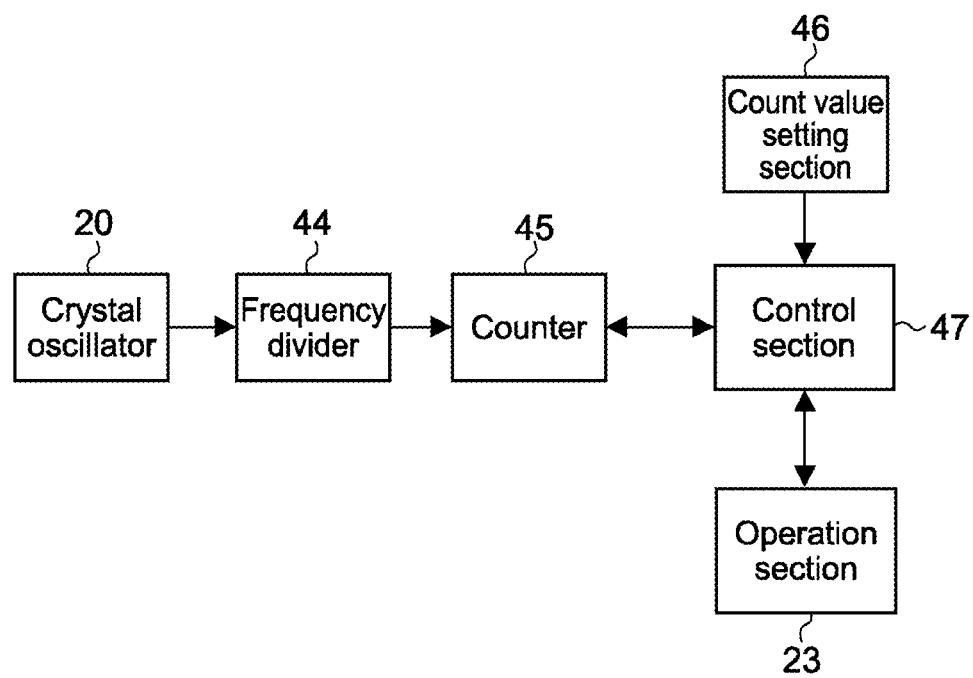
[FIG. 18] A functional block diagram of the input apparatus for realizing the operation shown in FIG. 17.
Figure 19:
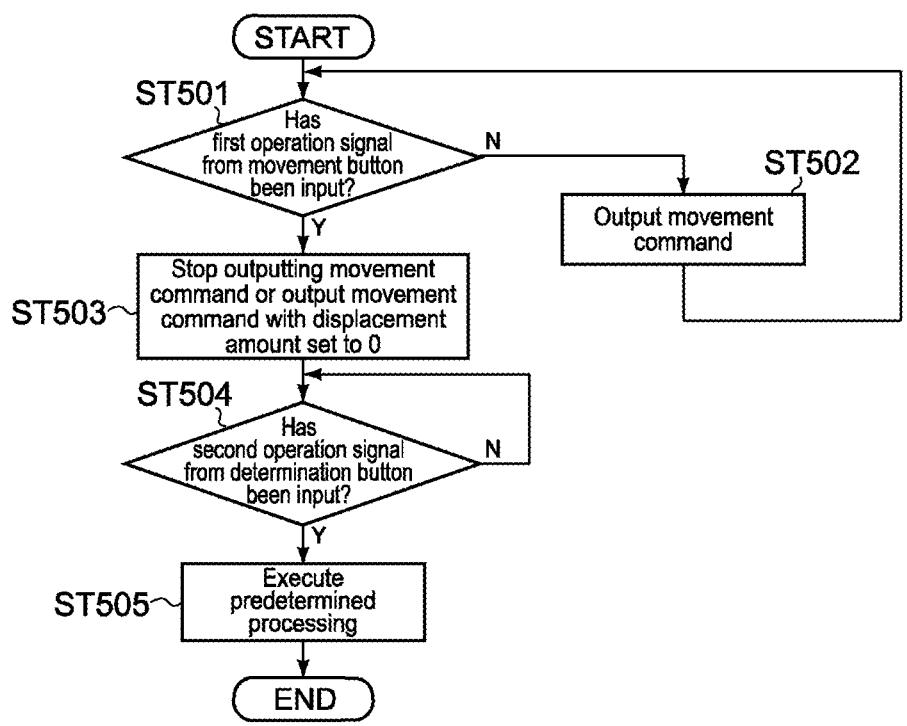
[FIG. 19] A flowchart showing an operation of the input apparatus according to still another embodiment.
Figure 20:
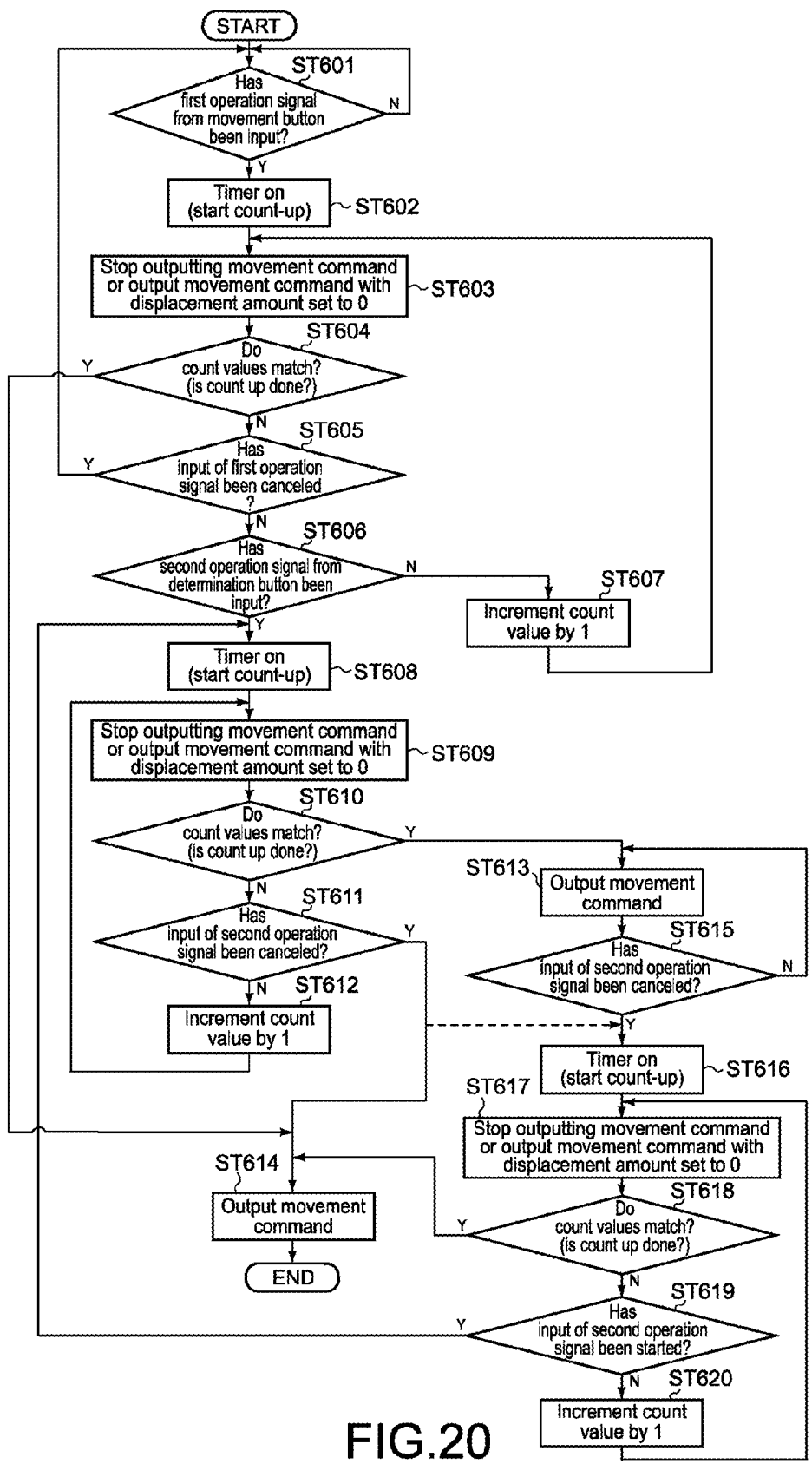
[FIG. 20] A flowchart showing an operation of the input apparatus according to still another embodiment.
Figure 21:
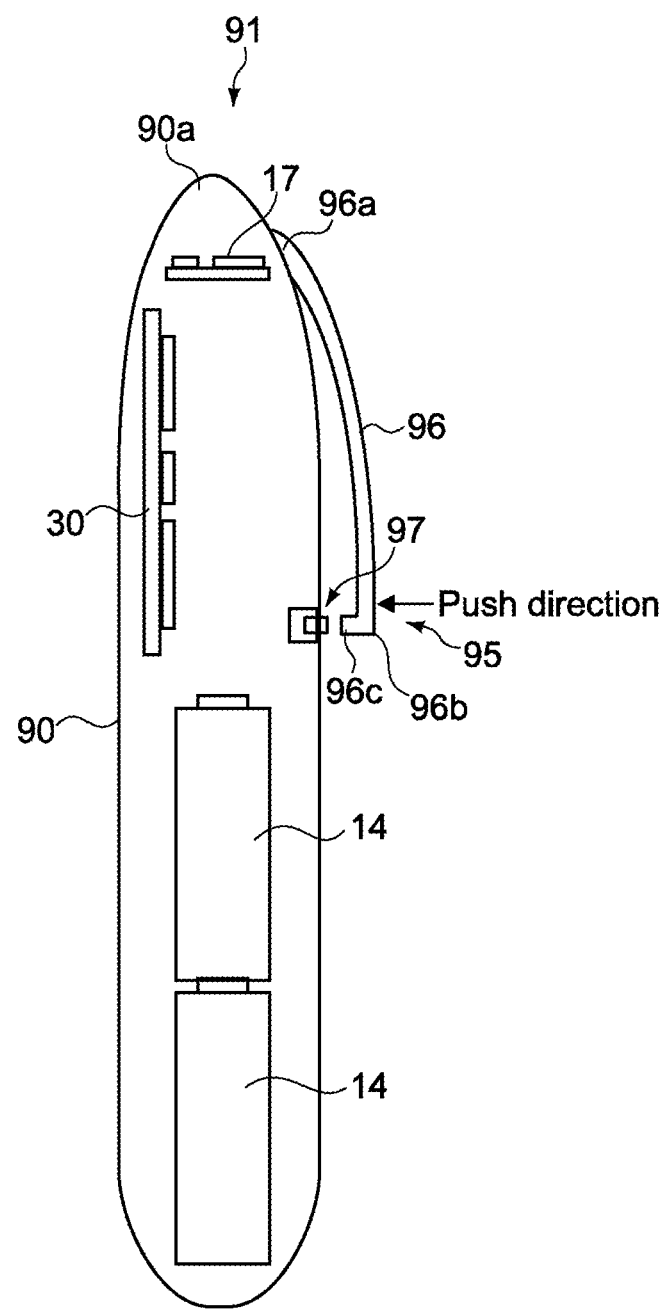
[FIG. 21] A schematic diagram showing a structure of an input apparatus according to another embodiment.
Figure 22:
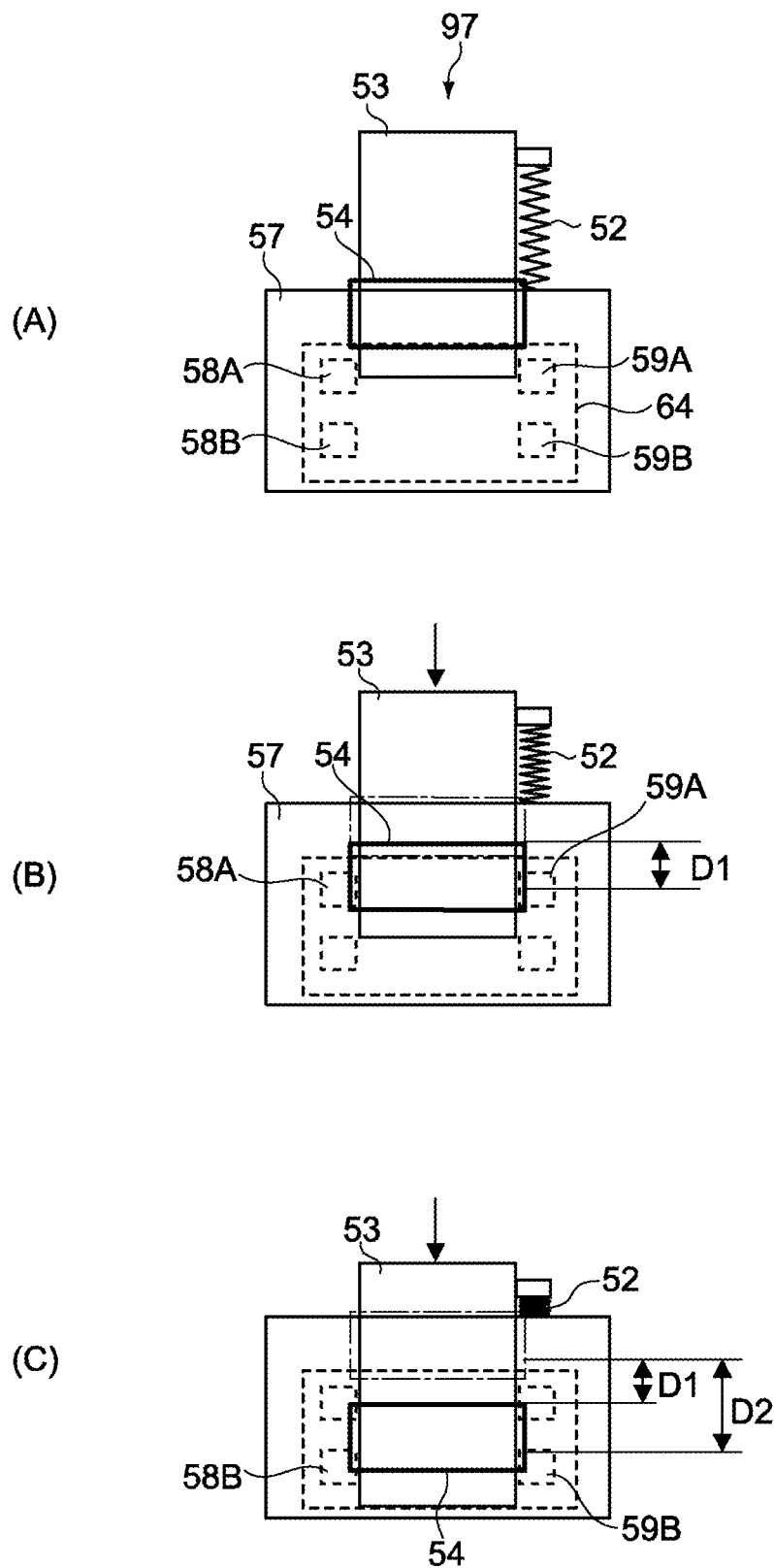
[FIG. 22] Schematic diagrams showing a structure of a push button of the input apparatus shown in FIG. 21.
Figure 23:
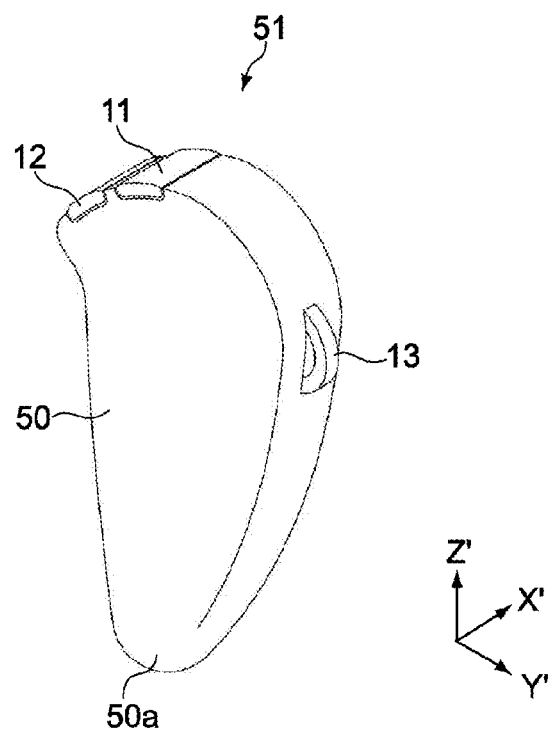
[FIG. 23] A perspective view showing an input apparatus according to another embodiment of the present invention.
Figure 24:
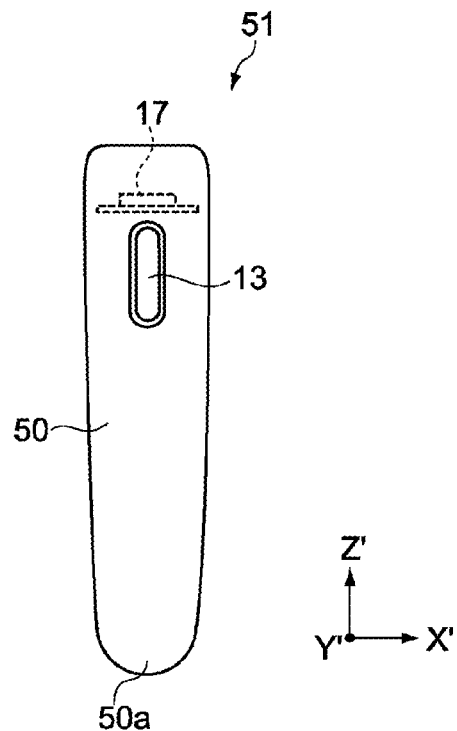
[FIG. 24] A side view of the input apparatus shown in FIG. 23 seen from a rotary button side.
Figure 25:
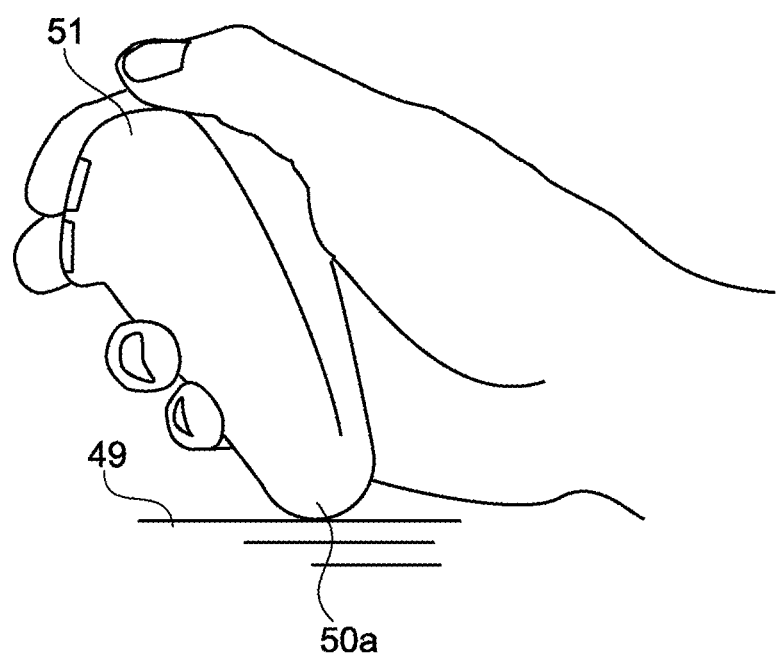
[FIG. 25] A diagram showing a state where the user operates the input apparatus while a lower curved surface thereof is in contact with a knee thereof.
Figure 26:
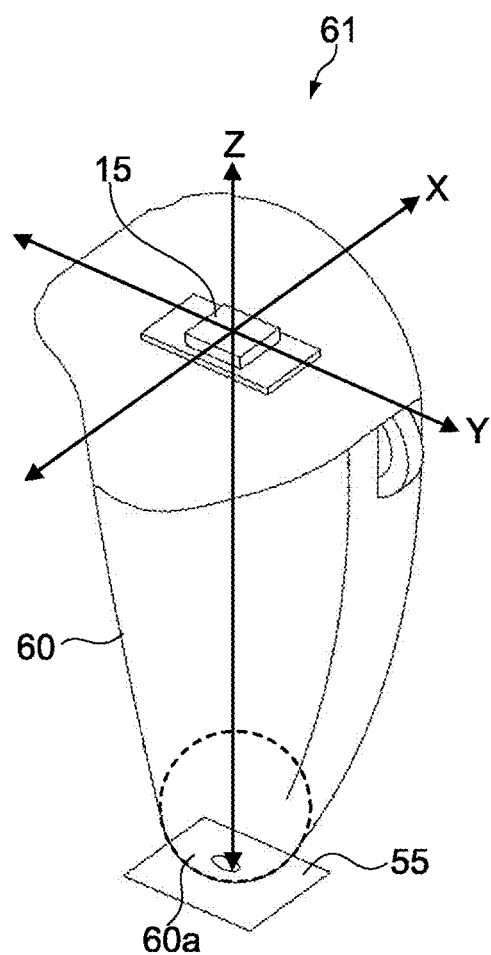
[FIG. 26] A perspective view showing an input apparatus according to still another embodiment of the present invention.
Figure 27:
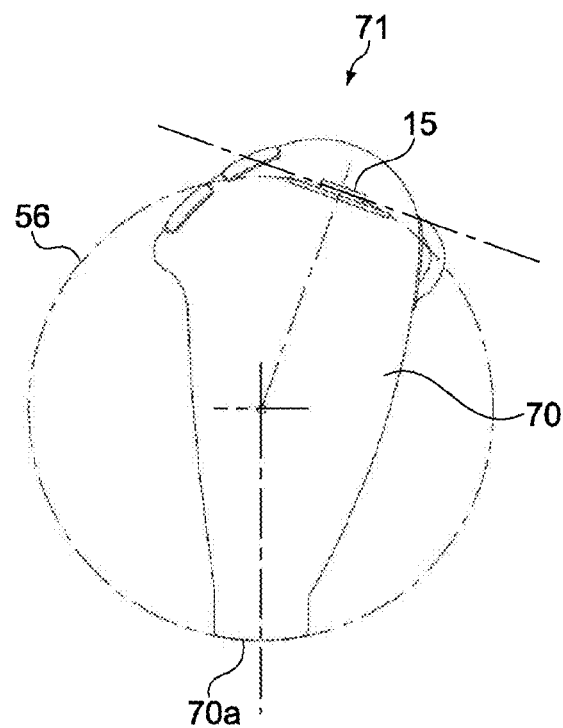
[FIG. 27] A front view showing an input apparatus according to yet another embodiment of the present invention.
Figure 28:
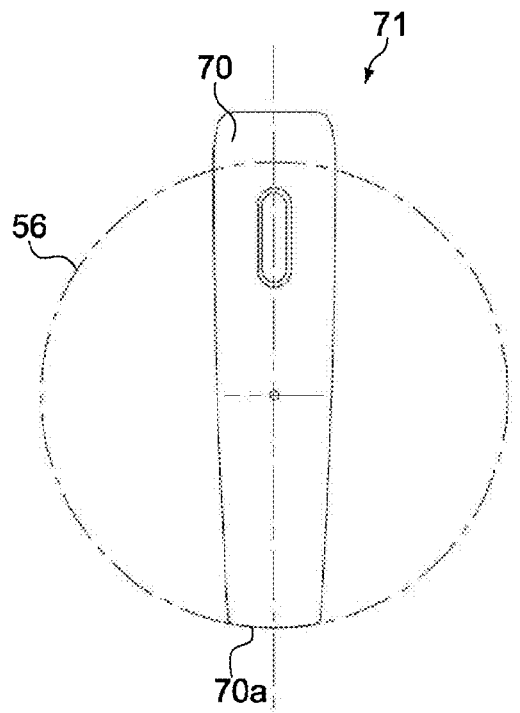
[FIG. 28] A side view showing the input apparatus shown in FIG. 27.
Figure 29:
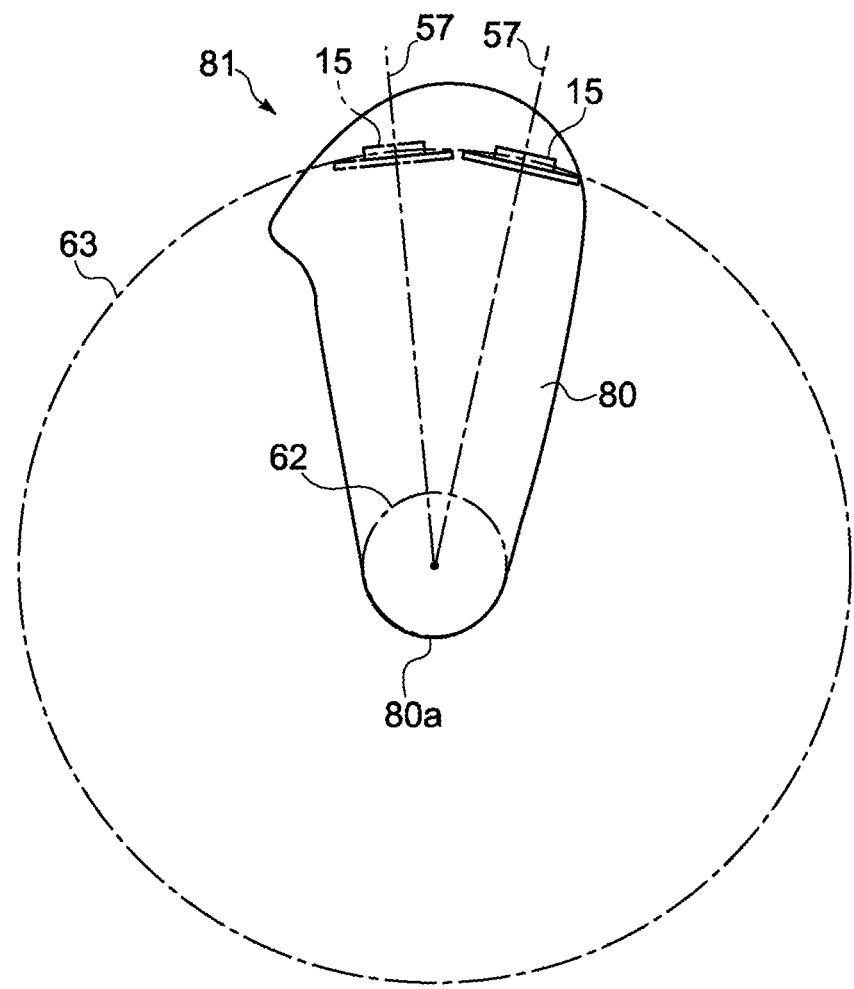
[FIG. 29] A front view of an input apparatus according to still another embodiment of the present invention.
Figure 30:
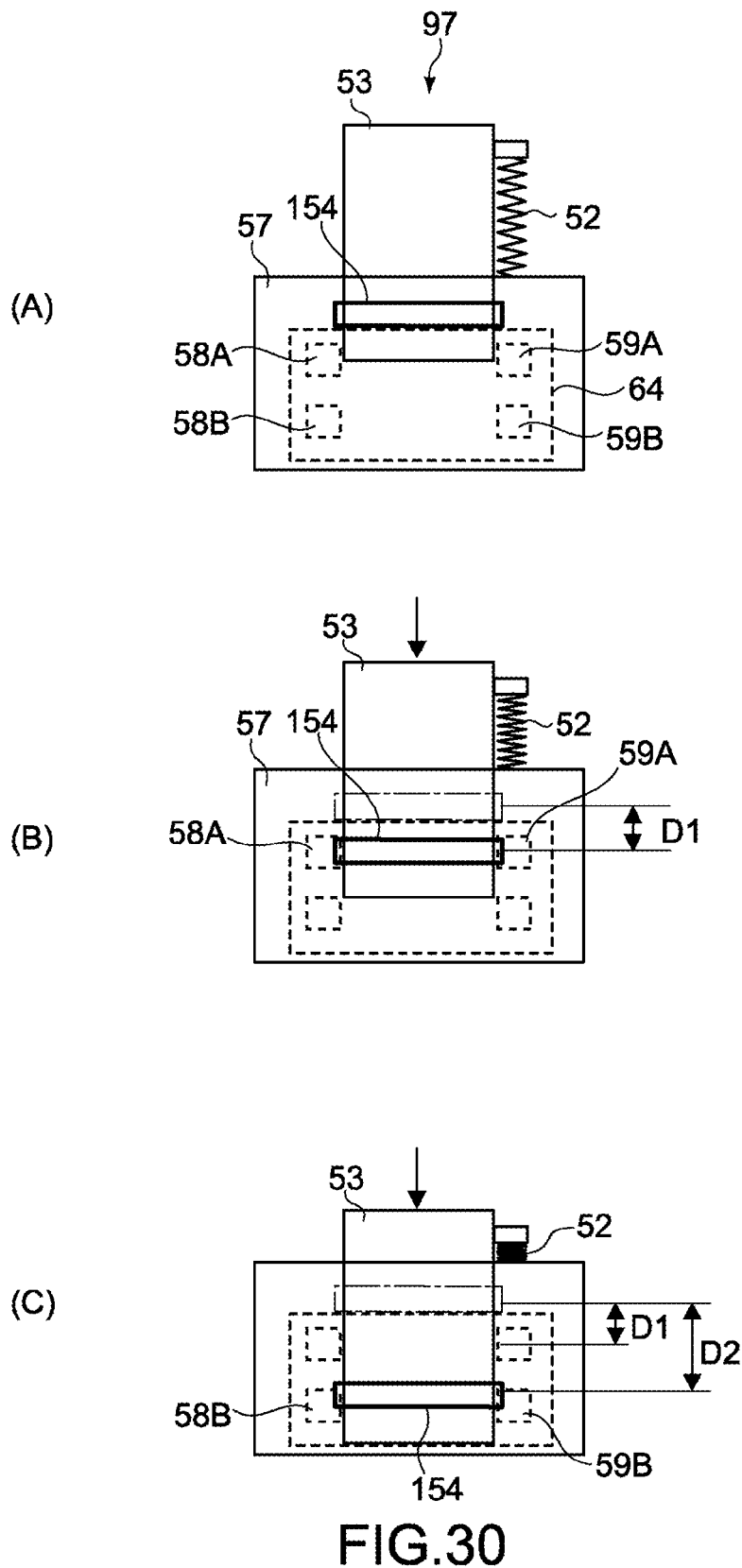
[FIG. 30] Diagrams showing a modified example of the embodiment shown in FIG. 22.
Figure 31:
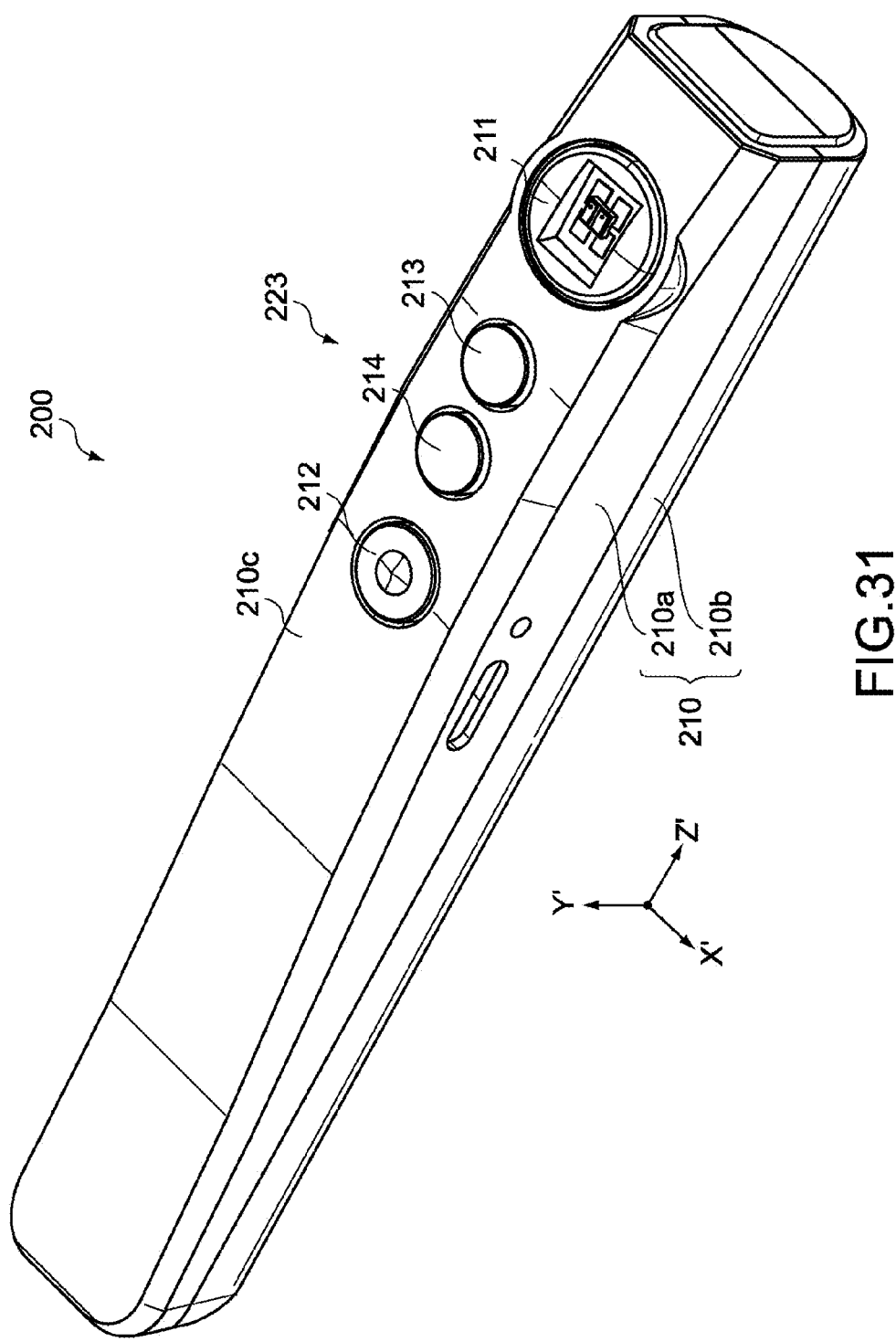
[FIG. 31] A perspective view showing an input apparatus according to still another embodiment.
Figure 32:
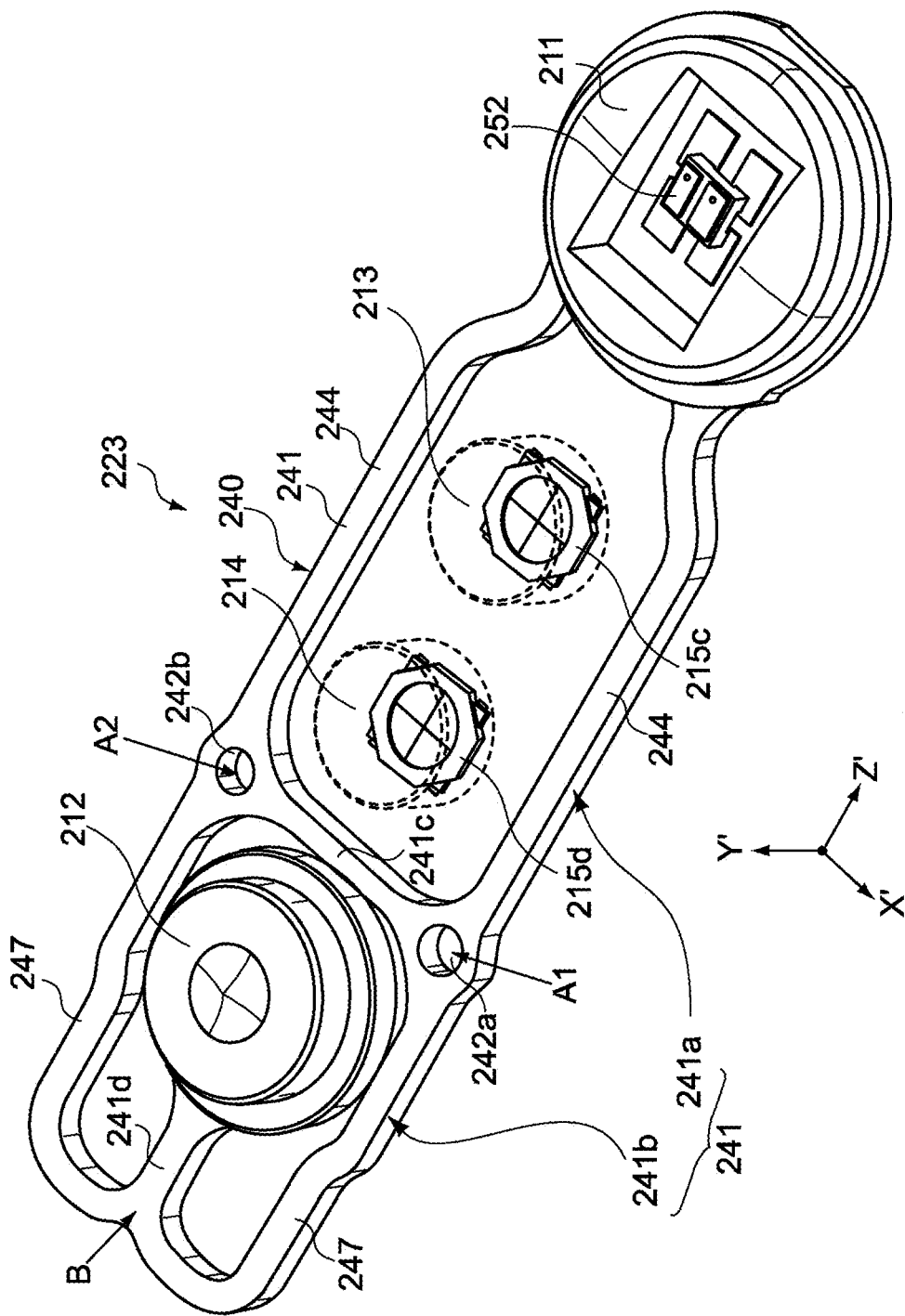
[FIG. 32] A diagram showing an operation section of the input apparatus shown in FIG. 31.
Figure 33:
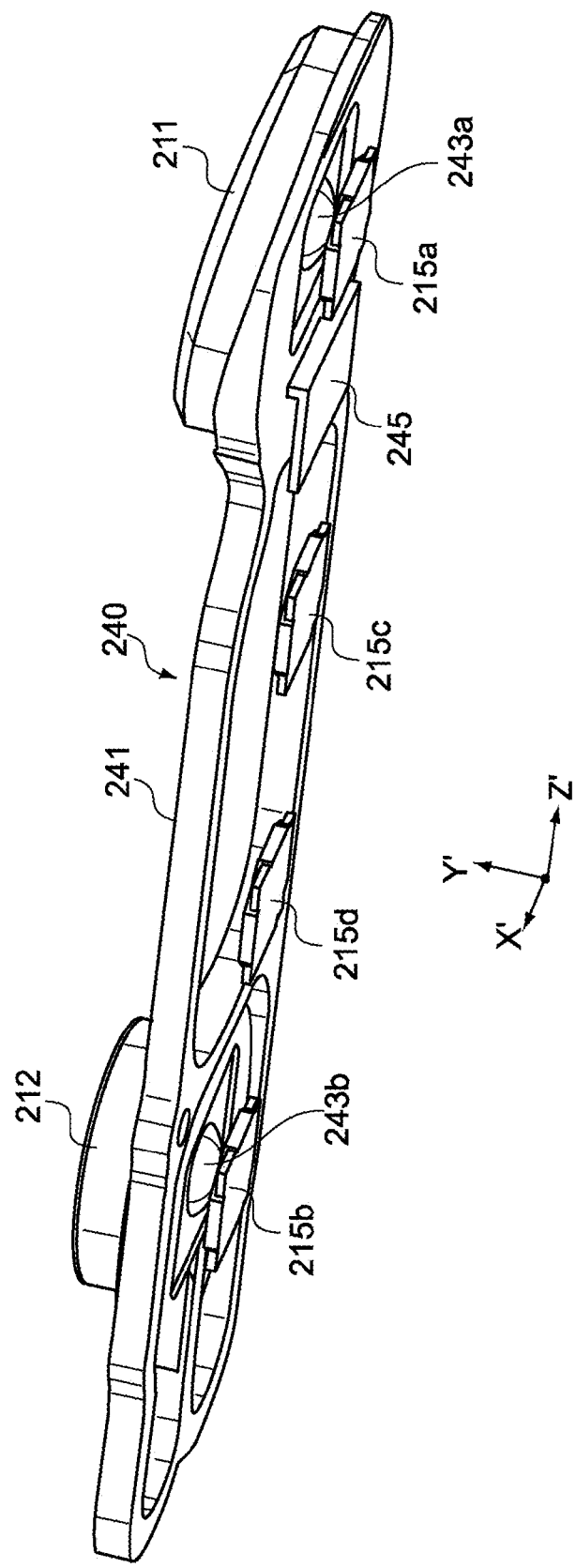
[FIG. 33] A diagram showing the operation section shown in FIG. 32 from a lower side.
Figure 34:
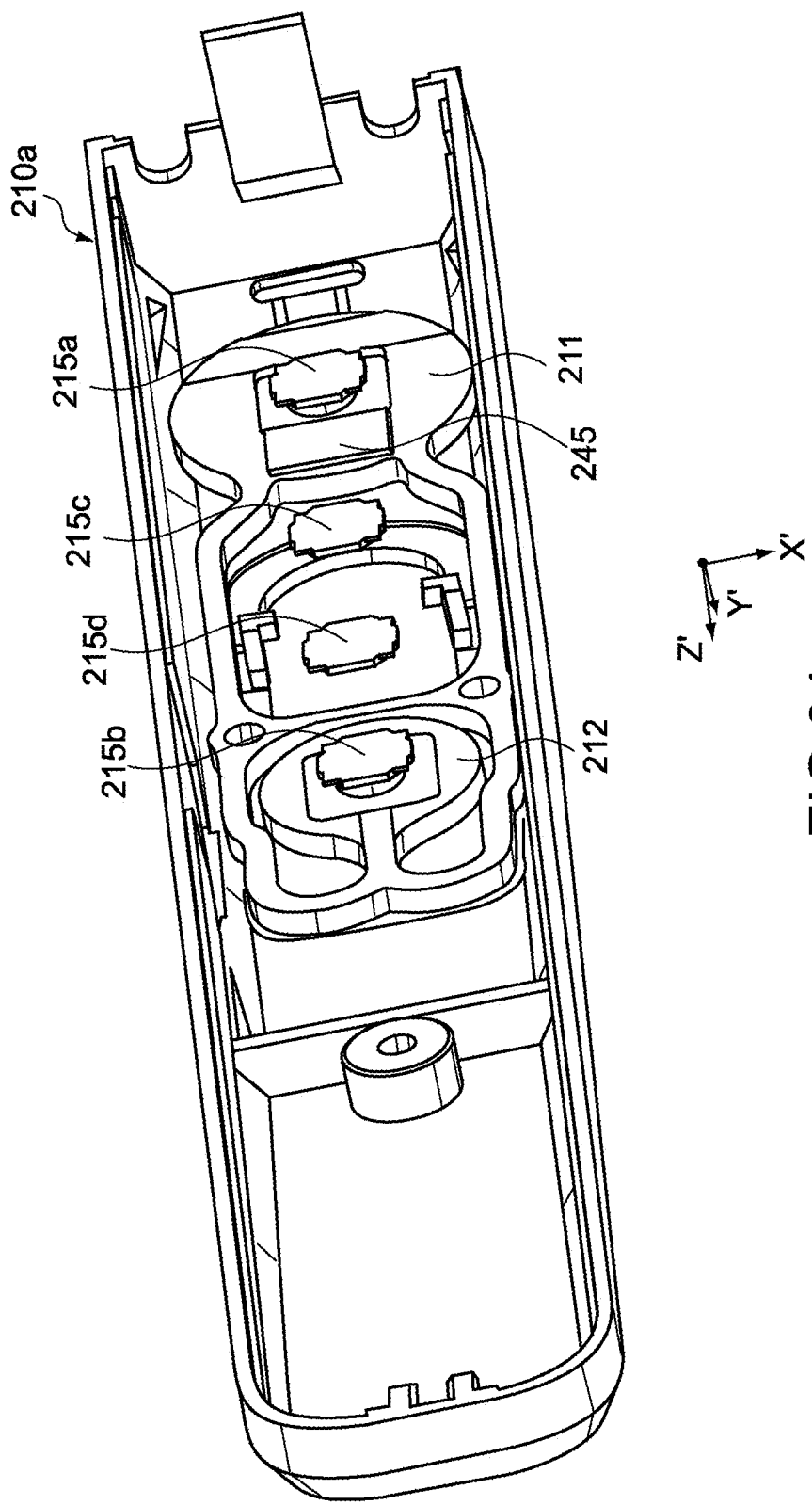
[FIG. 34] A diagram showing, from a lower side, an operation section provided inside an upper casing of the input apparatus.
Figure 35:
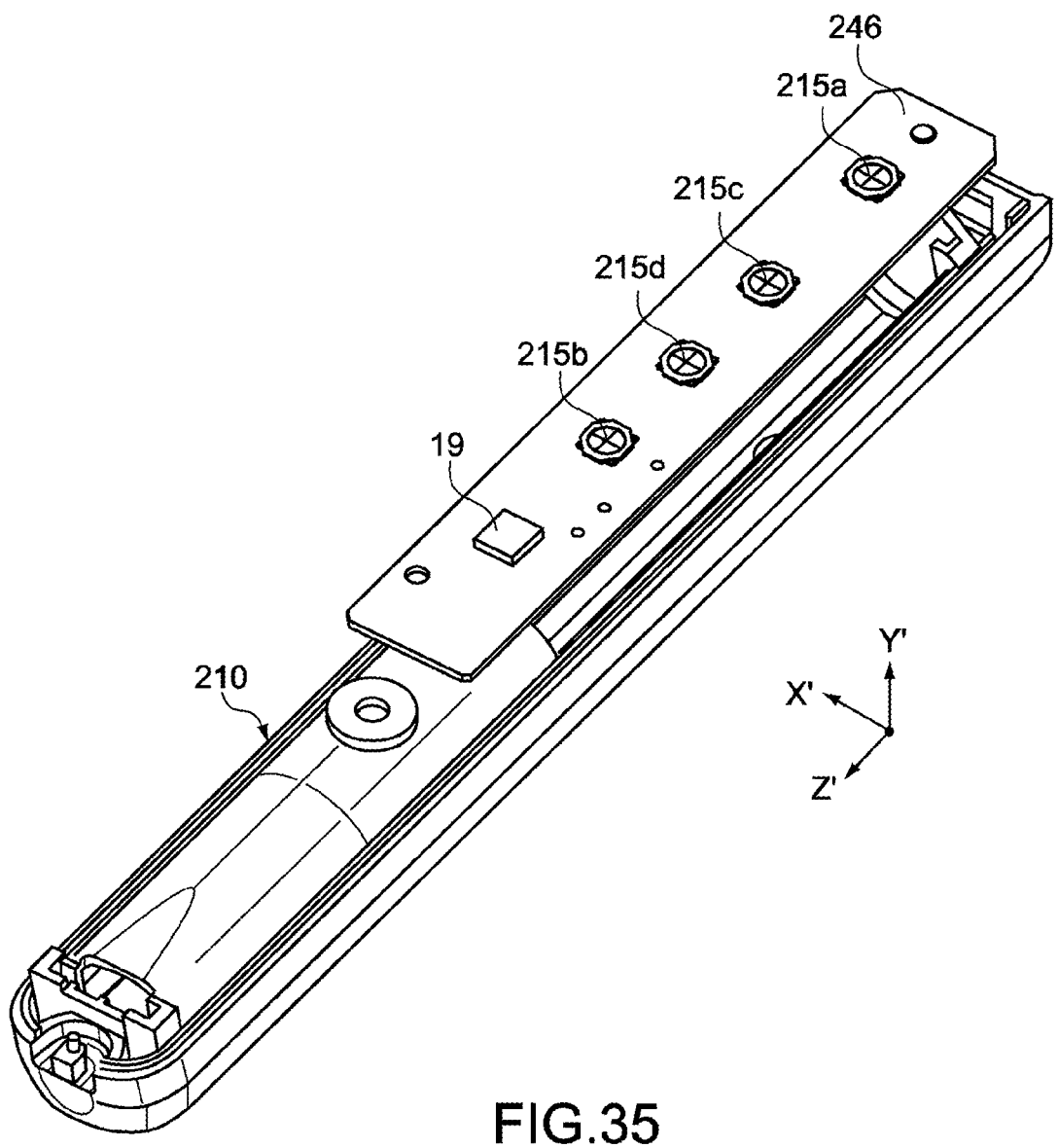
[FIG. 35] A diagram showing a lower casing and a main substrate from an upper side.
Figure 36:
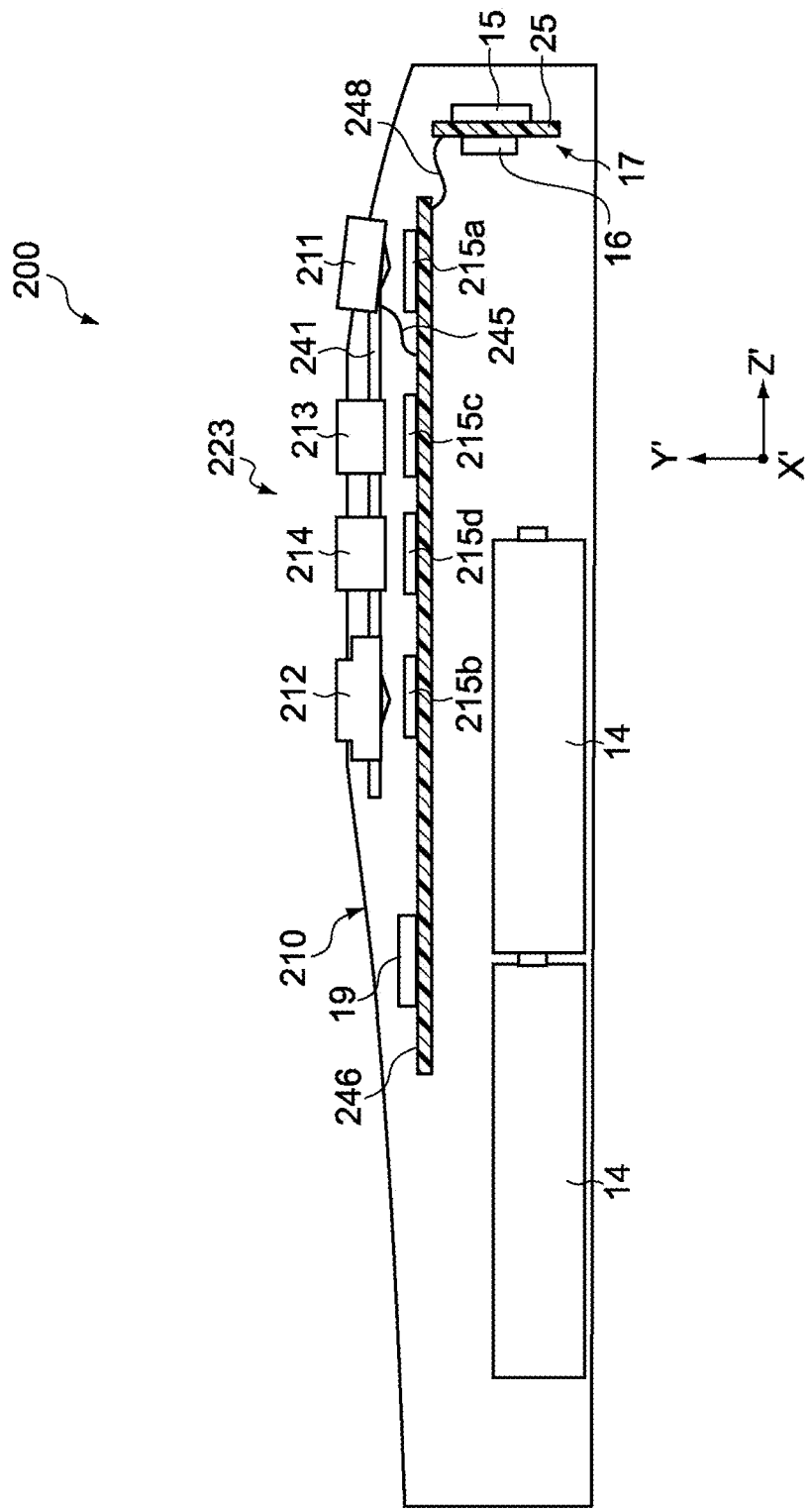
[FIG. 36] A schematic diagram showing an internal structure of the input apparatus.
Figure 37:
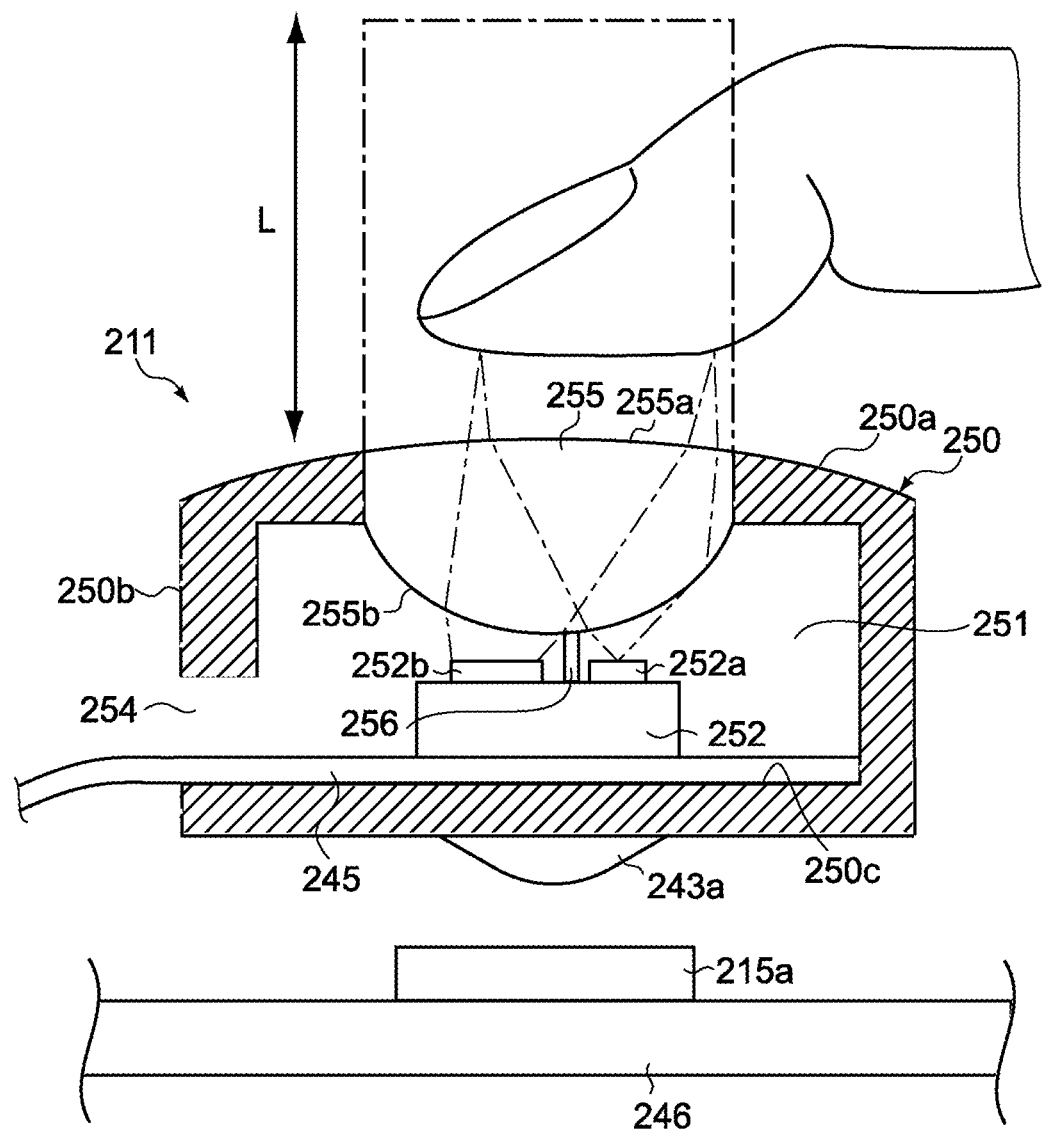
[FIG. 37] A cross-sectional diagram of a determination button.
Figure 38:
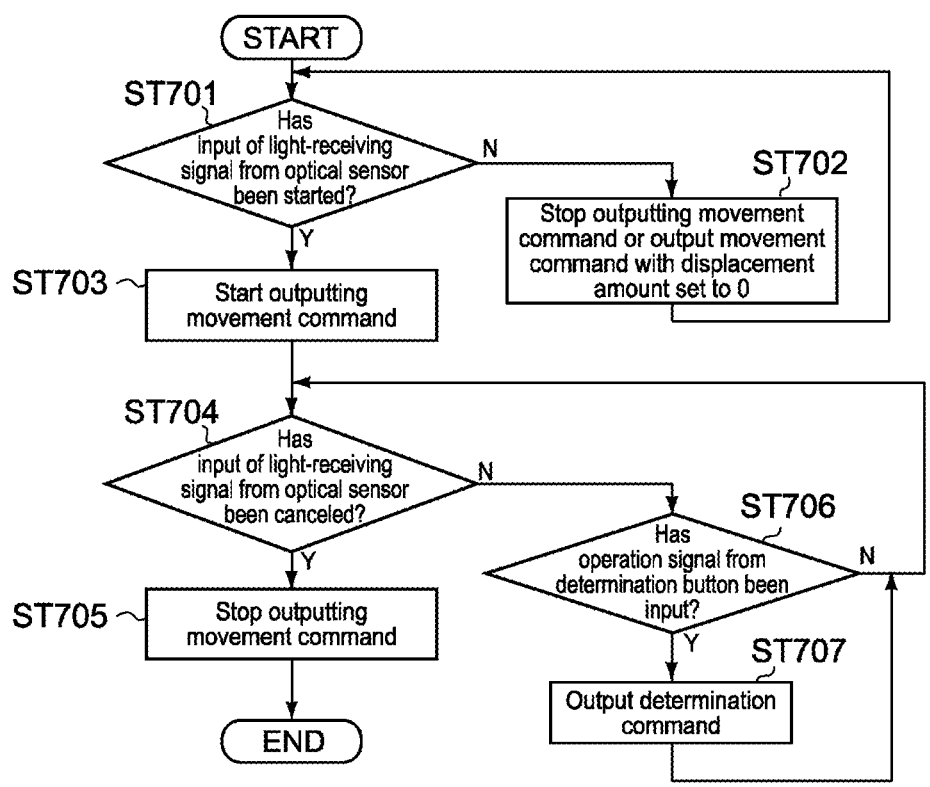
[FIG. 38] A flowchart showing an operation of the input apparatus.
Figure 39:
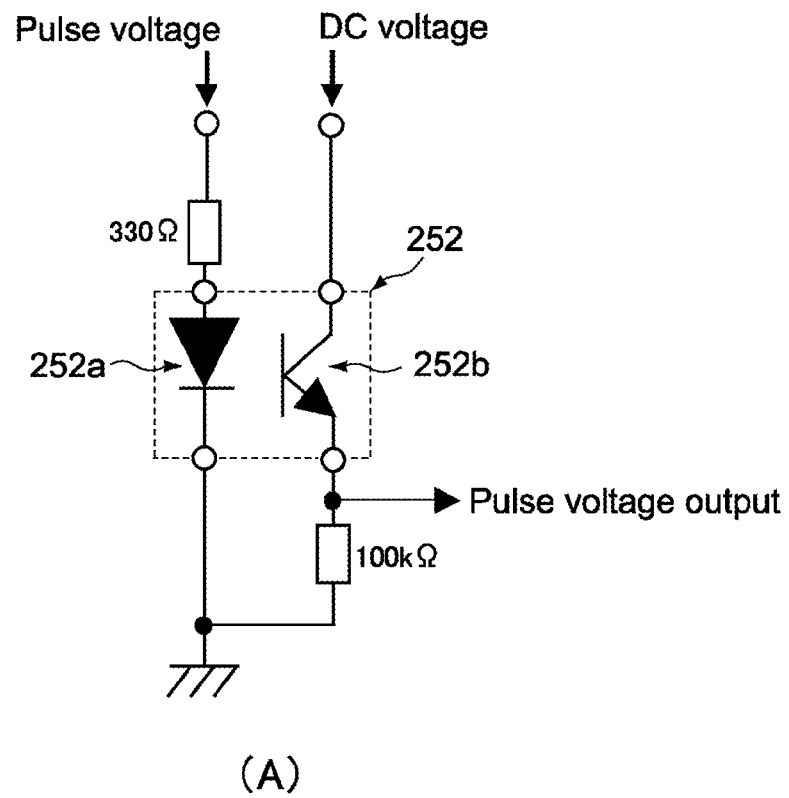
[FIG. 39] Circuit diagrams of an optical sensor of the input apparatus.
Figure 39:
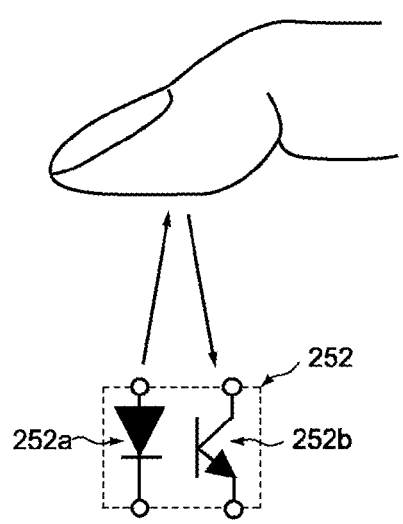
Figure 40:
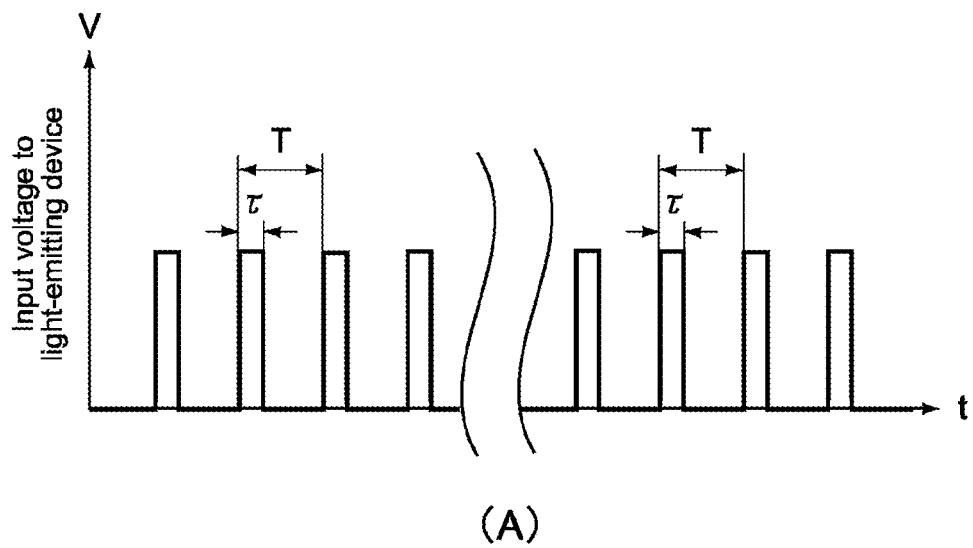
[FIG. 40] Diagrams showing a relationship between a voltage supplied to a light-emitting device and a voltage output from a light-receiving device.
Figure 40:
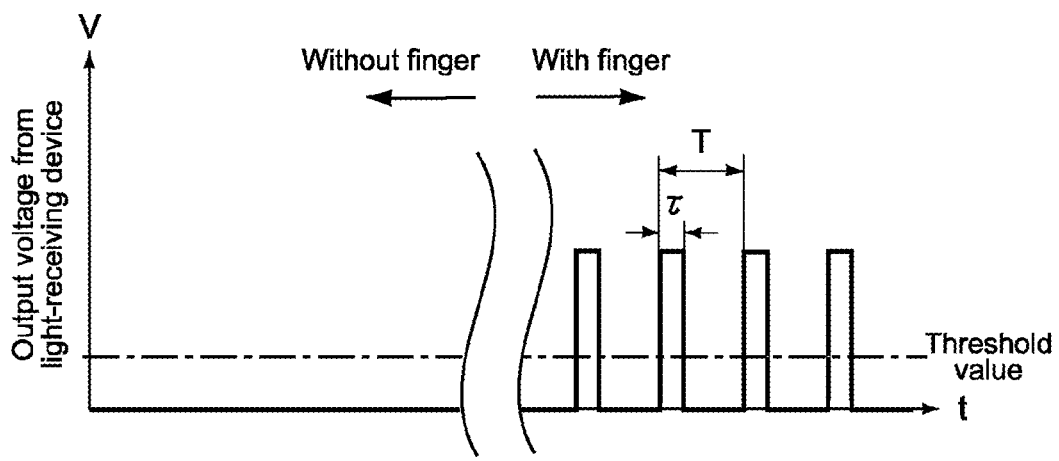
Figure 41:
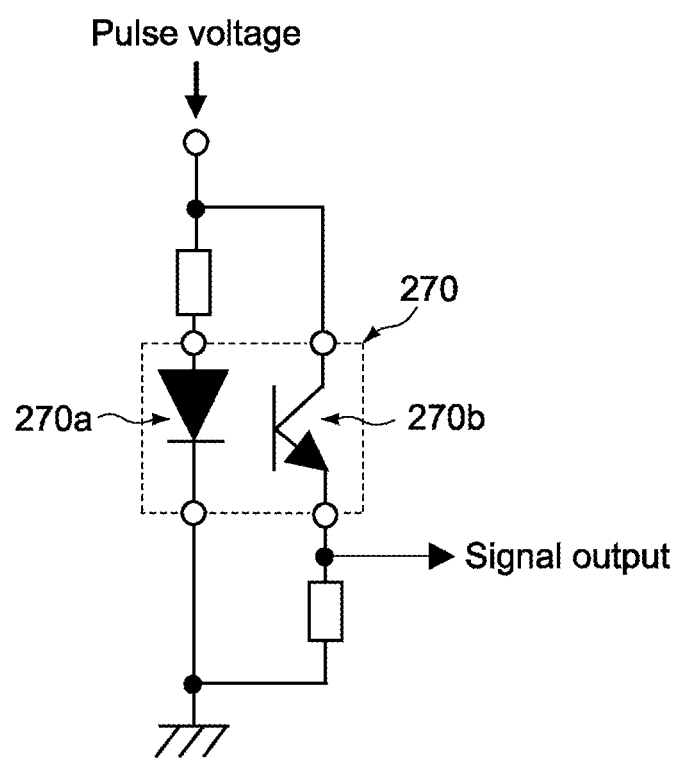
[FIG. 41] A circuit diagram of a general photo-reflector.
Figure 42:
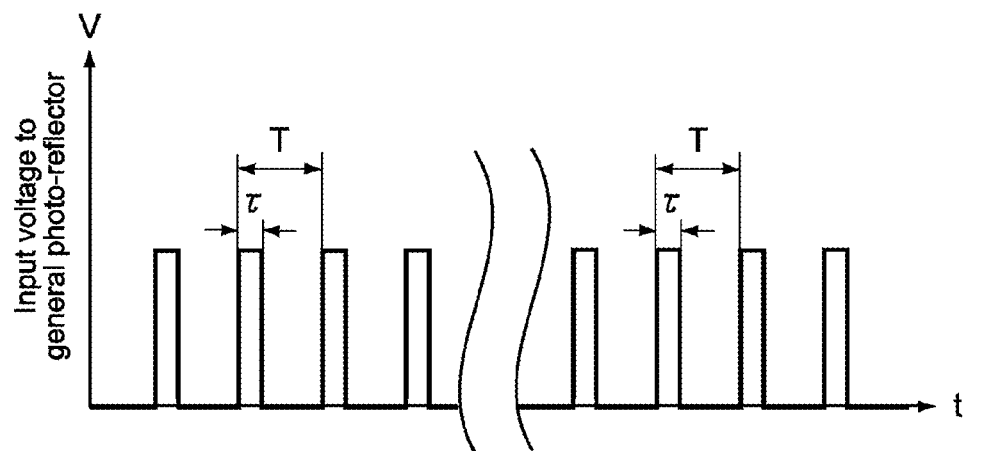
[FIG. 42] Diagrams showing an output voltage in a case where a pulse-like voltage is supplied to the photo-reflector.
Figure 42:
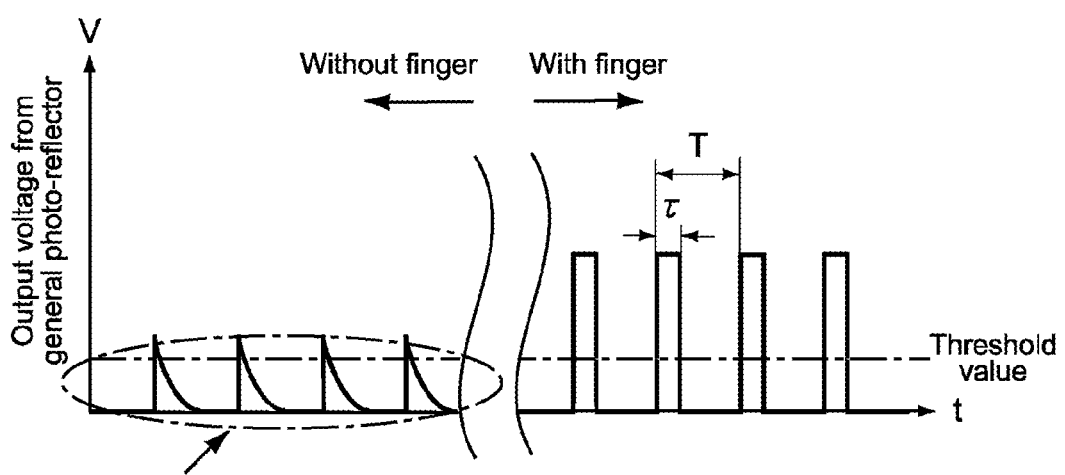
Figure 43:
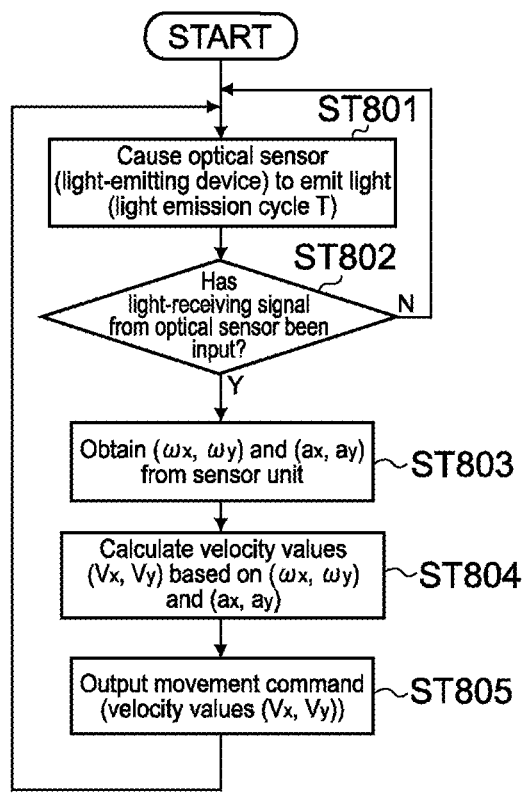
[FIG. 43] A flowchart showing an operation of the input apparatus according to still another embodiment.
Figure 44:
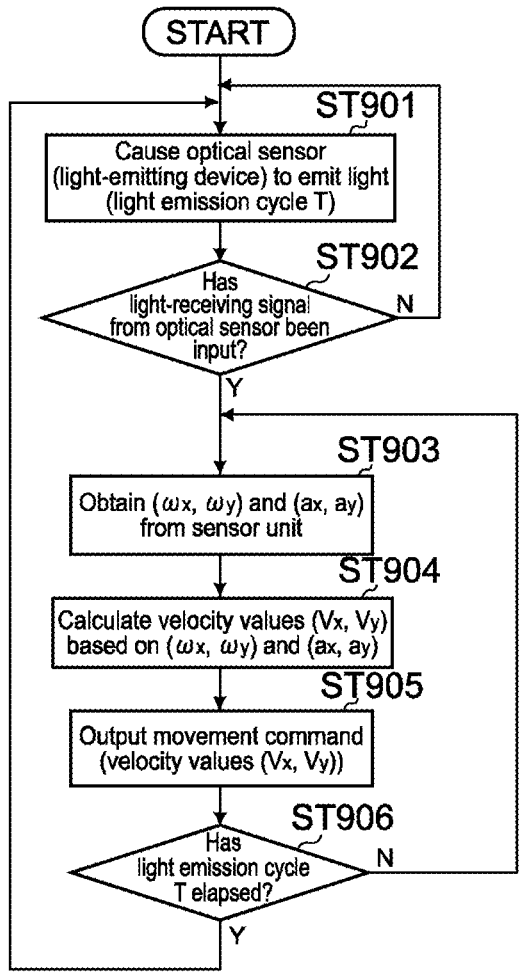
[FIG. 44] A flowchart showing an operation of the input apparatus according to still another embodiment.
Figure 45:
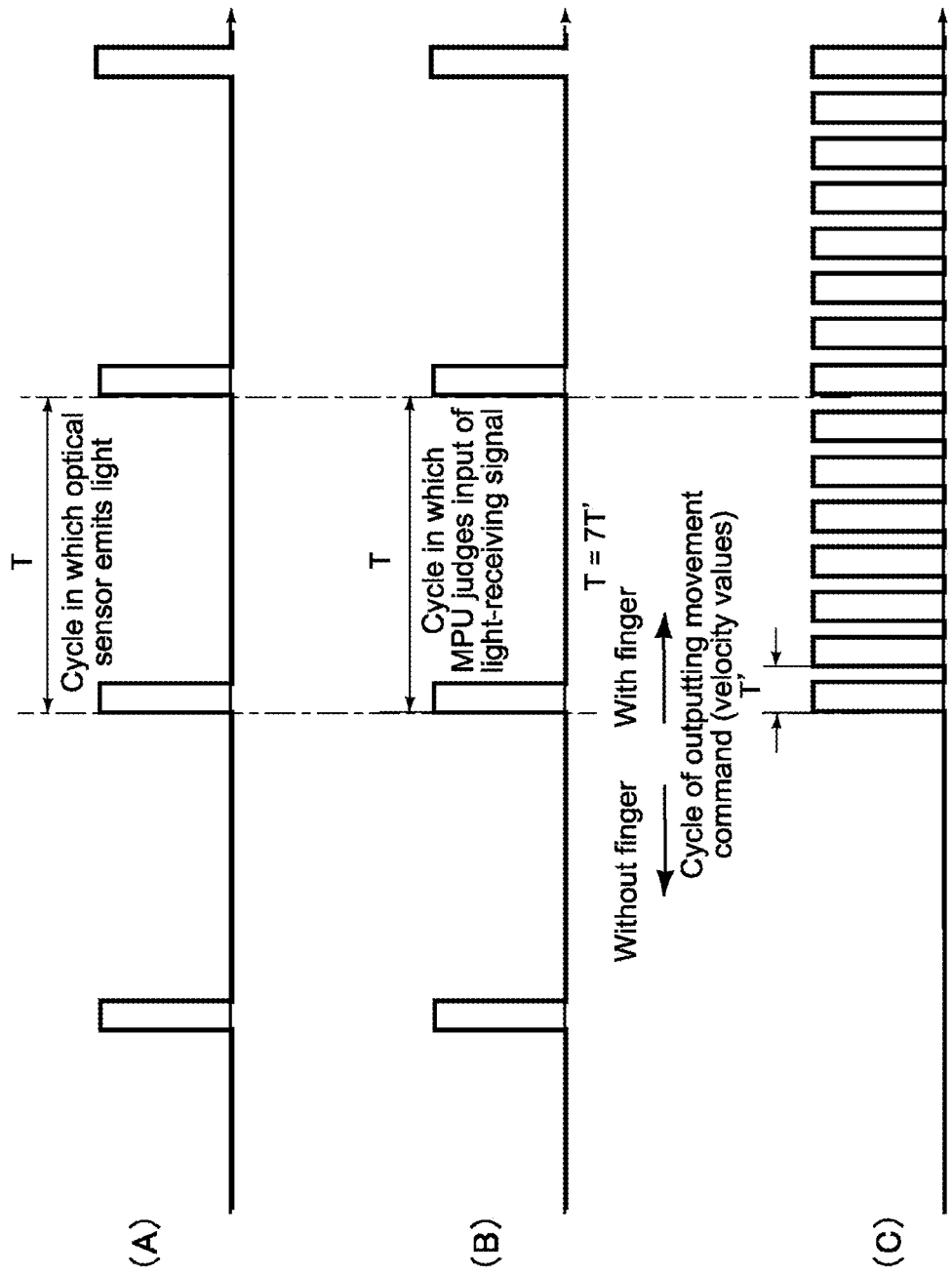
[FIG. 45] Timing charts for illustrating the operation shown in FIG. 44.
Figure 46:
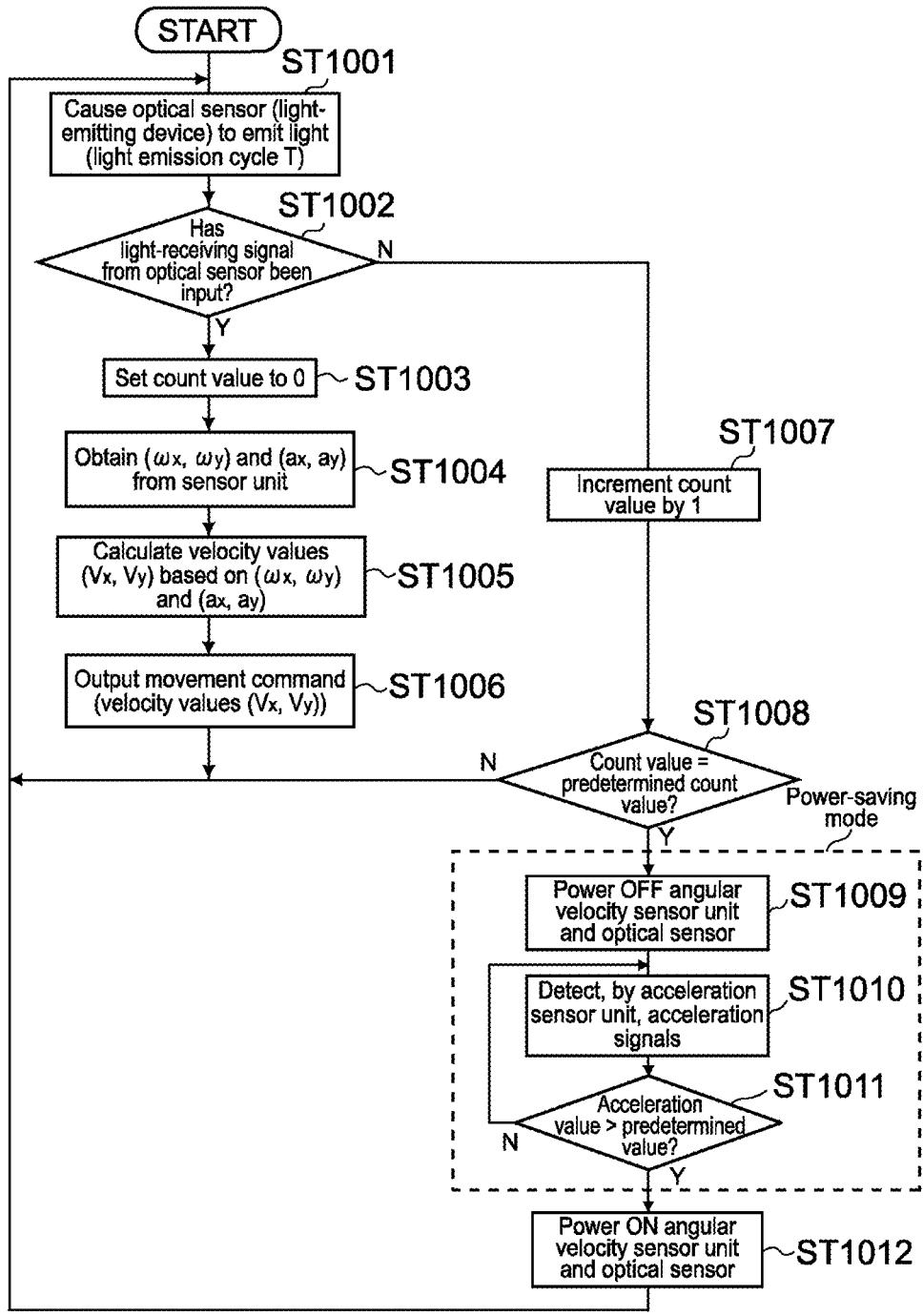
[FIG. 46] A flowchart showing an operation of the input apparatus according to still another embodiment.
Figure 47:
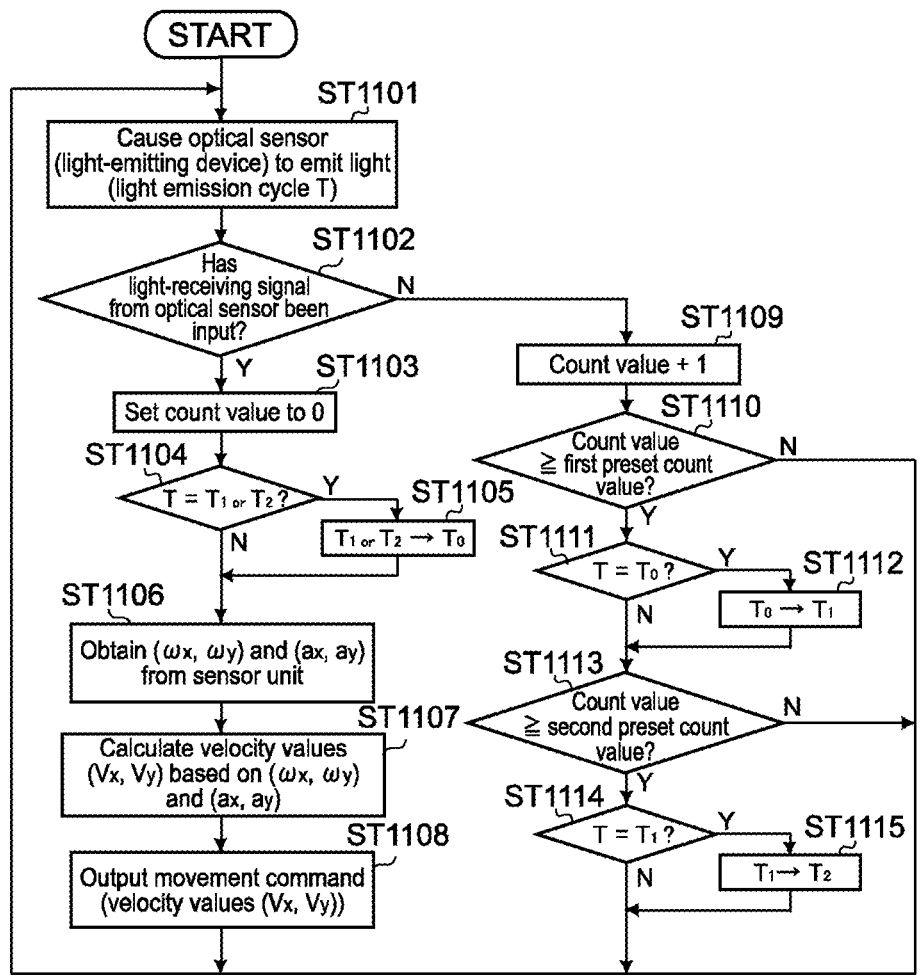
[FIG. 47] A flowchart showing an operation of the input apparatus according to still another embodiment.
Figure 48:
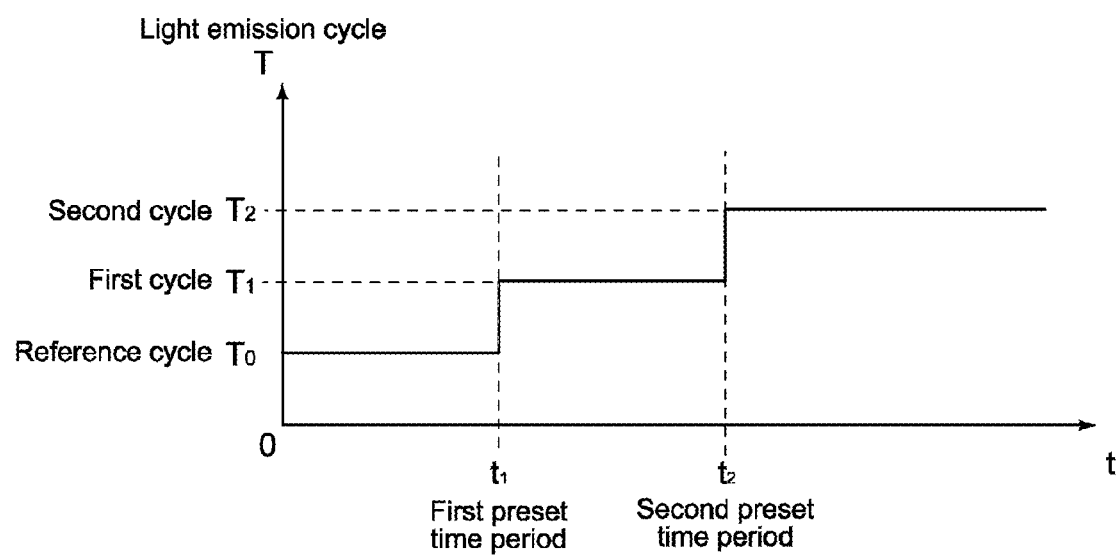
[FIG. 48] A diagram showing a relationship between a time period t from a time an input of a first operation signal from the optical sensor is canceled and a light emission cycle T of the optical sensor 252.
Figure 49:
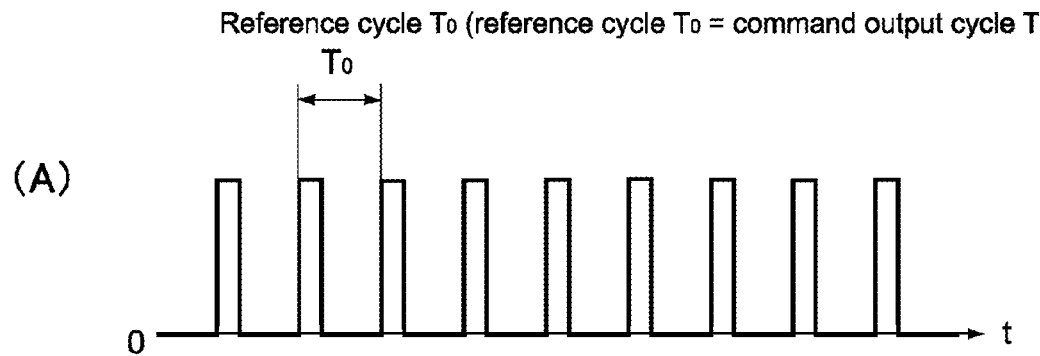
[FIG. 49] Diagrams each showing a light emission cycle T of the optical sensor in a case where a predetermined time period has elapsed since the cancel of the input of the first operation signal.
Figure 49:
Figure 49:
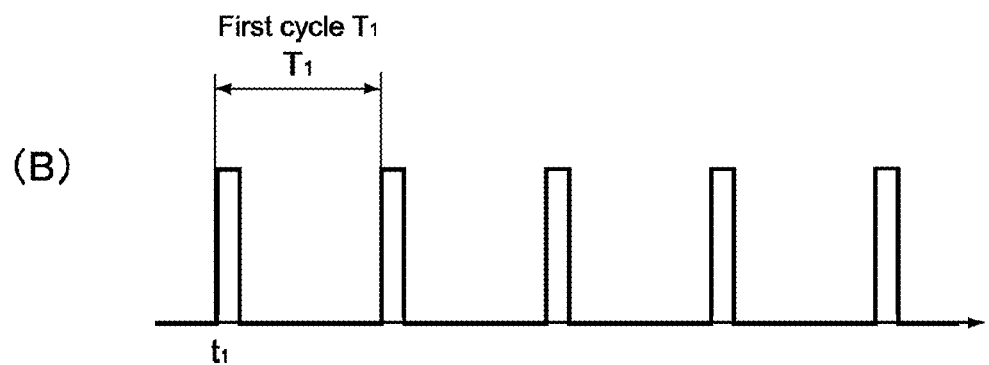
Figure 49:
Figure 49:
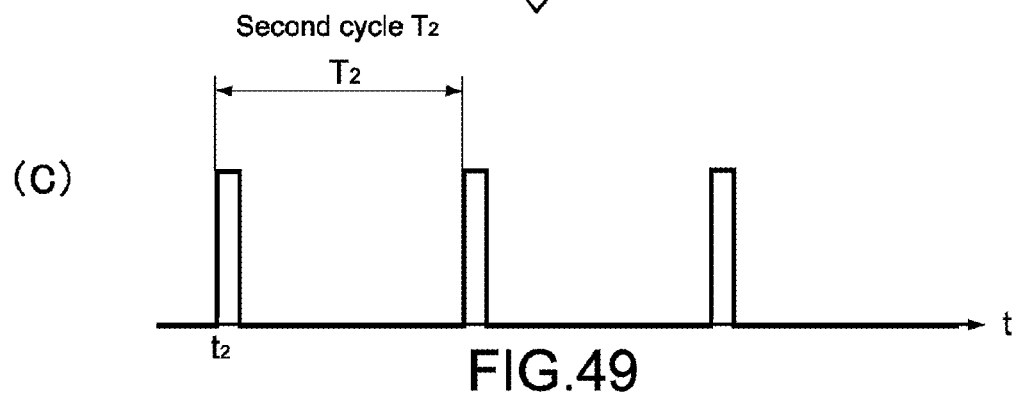
Figure 50:
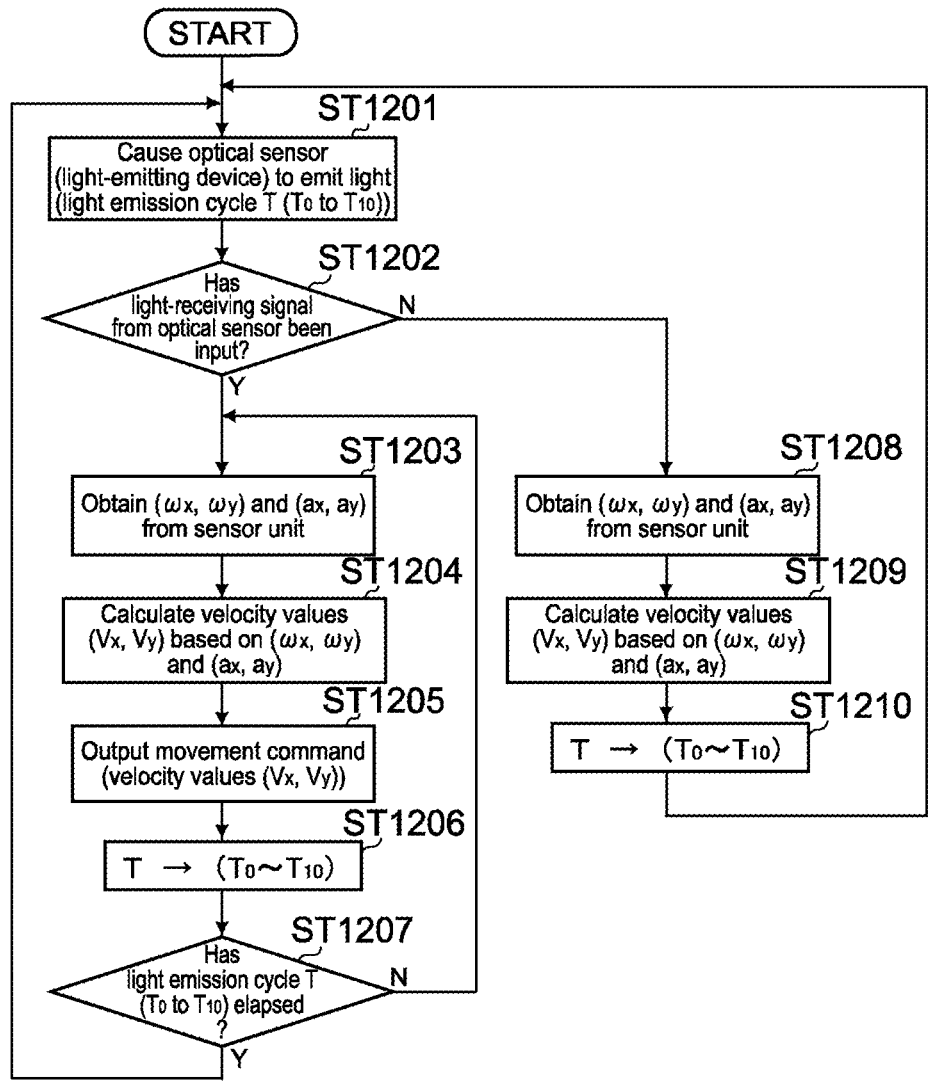
[FIG. 50] A flowchart showing an operation of the input apparatus according to still another embodiment.
Figure 51:
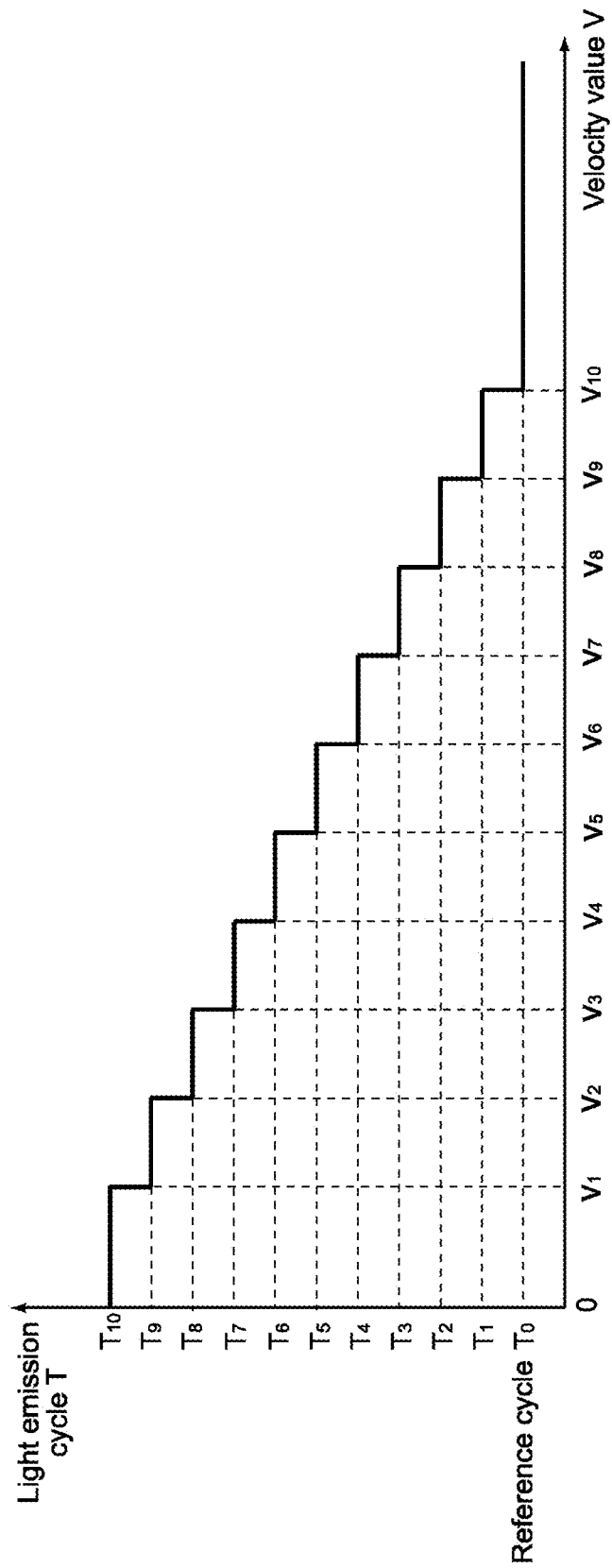
[FIG. 51] A diagram showing a relationship between the light emission cycle T of the optical sensor and a velocity value V.
Figure 52:
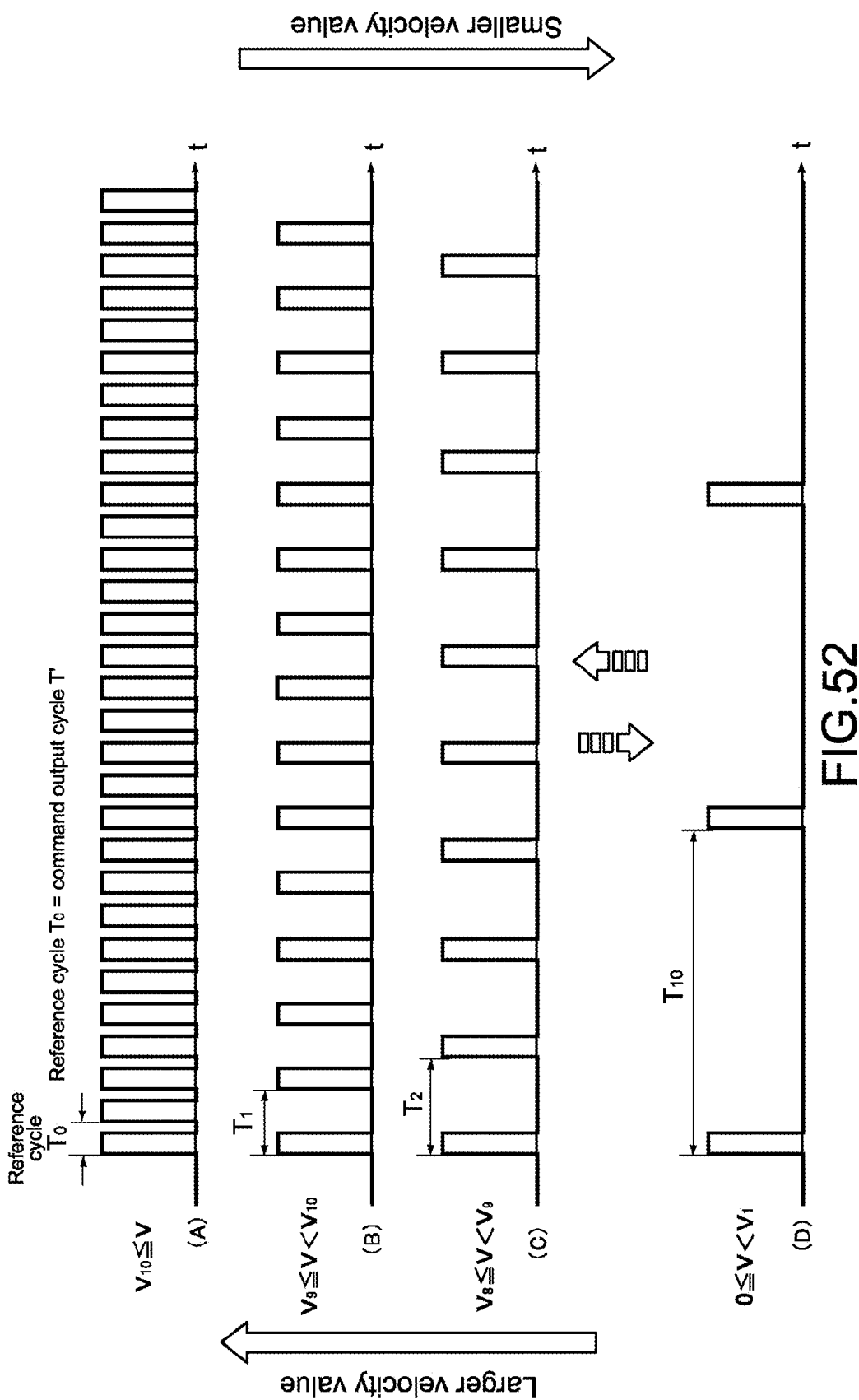
[FIG. 52] Diagrams each showing a relationship between the light emission cycle T of the optical sensor and the velocity value V.
Figure 53:
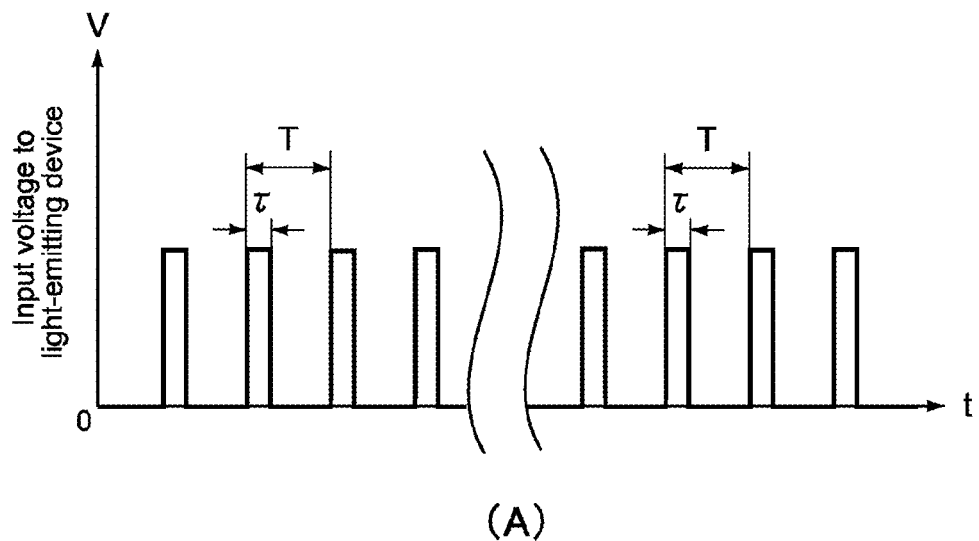
[FIG. 53] Diagrams showing a relationship between an input voltage to the light-emitting device and an output voltage from the optical sensor, for illustrating an influence of disturbance light.
Figure 53:
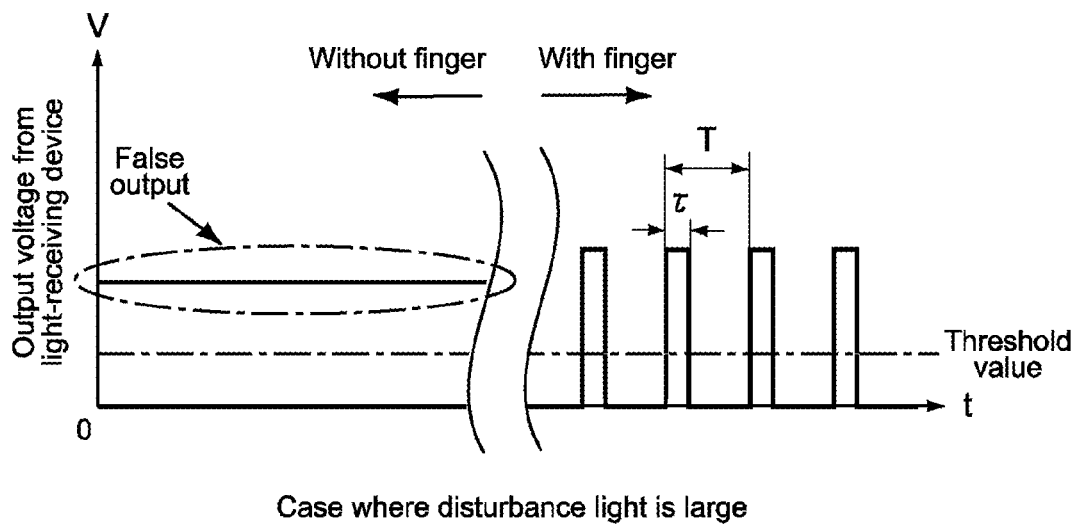
Figure 54:
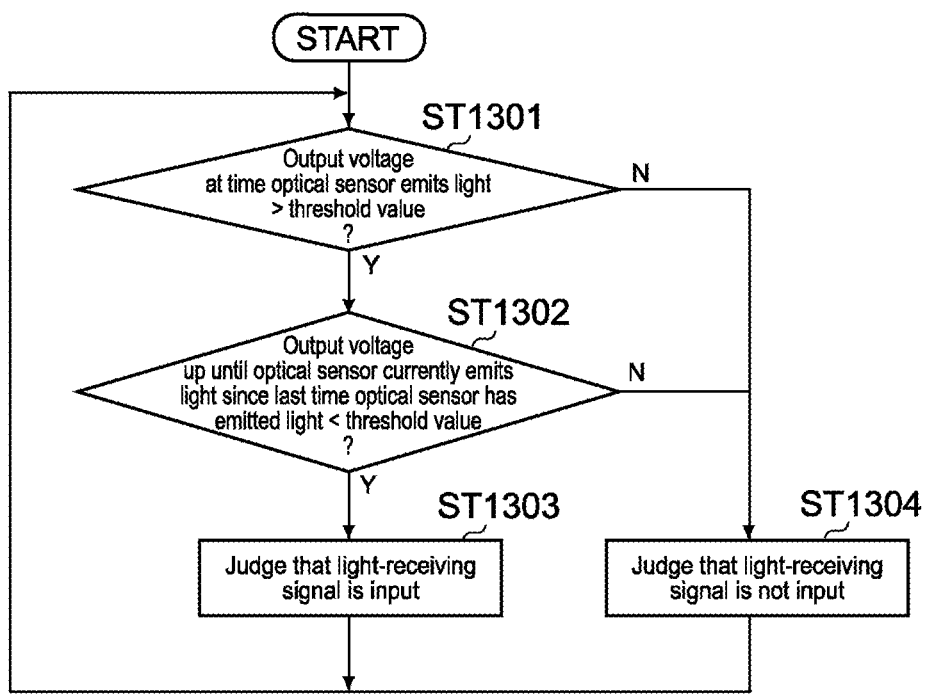
[FIG. 54] A flowchart showing an operation of the input apparatus according to still another embodiment.
Figure 55:
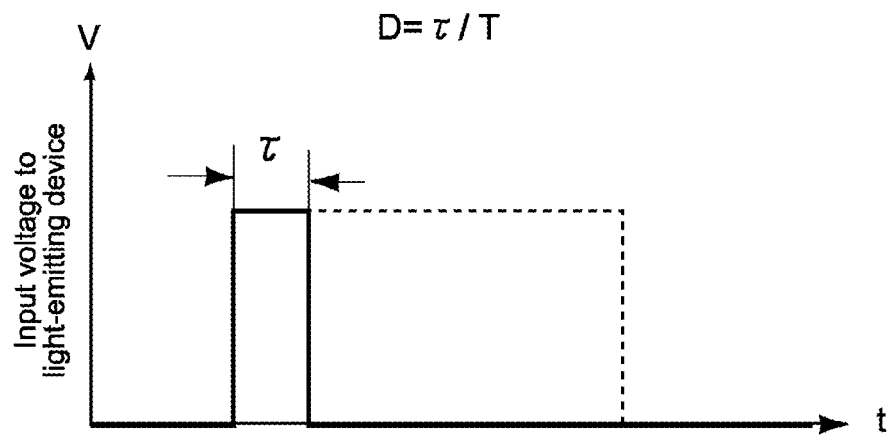
[FIG. 55] Enlarged diagrams showing the relationship between the input voltage to the light-emitting device and the output voltage from the optical sensor.
Figure 55:
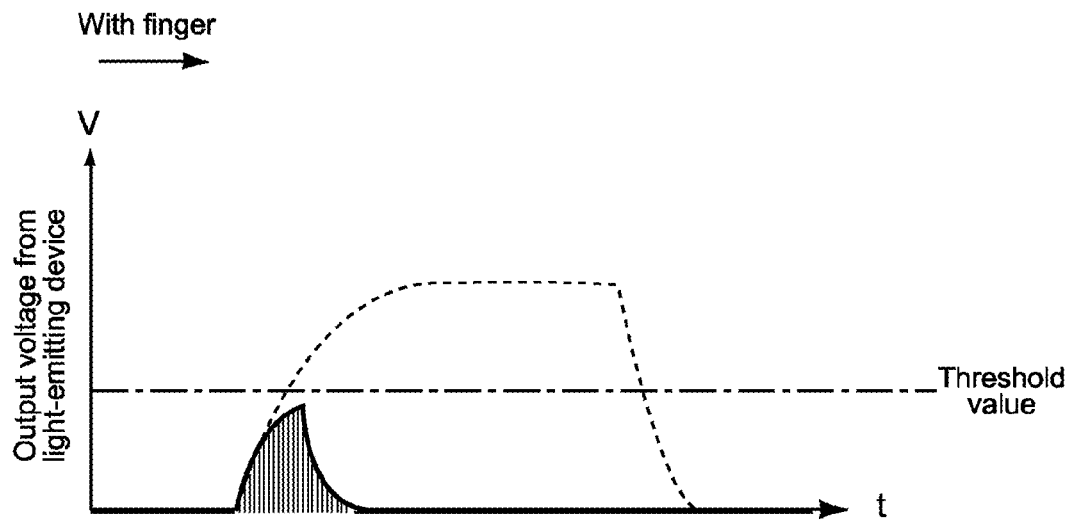
Figure 56:
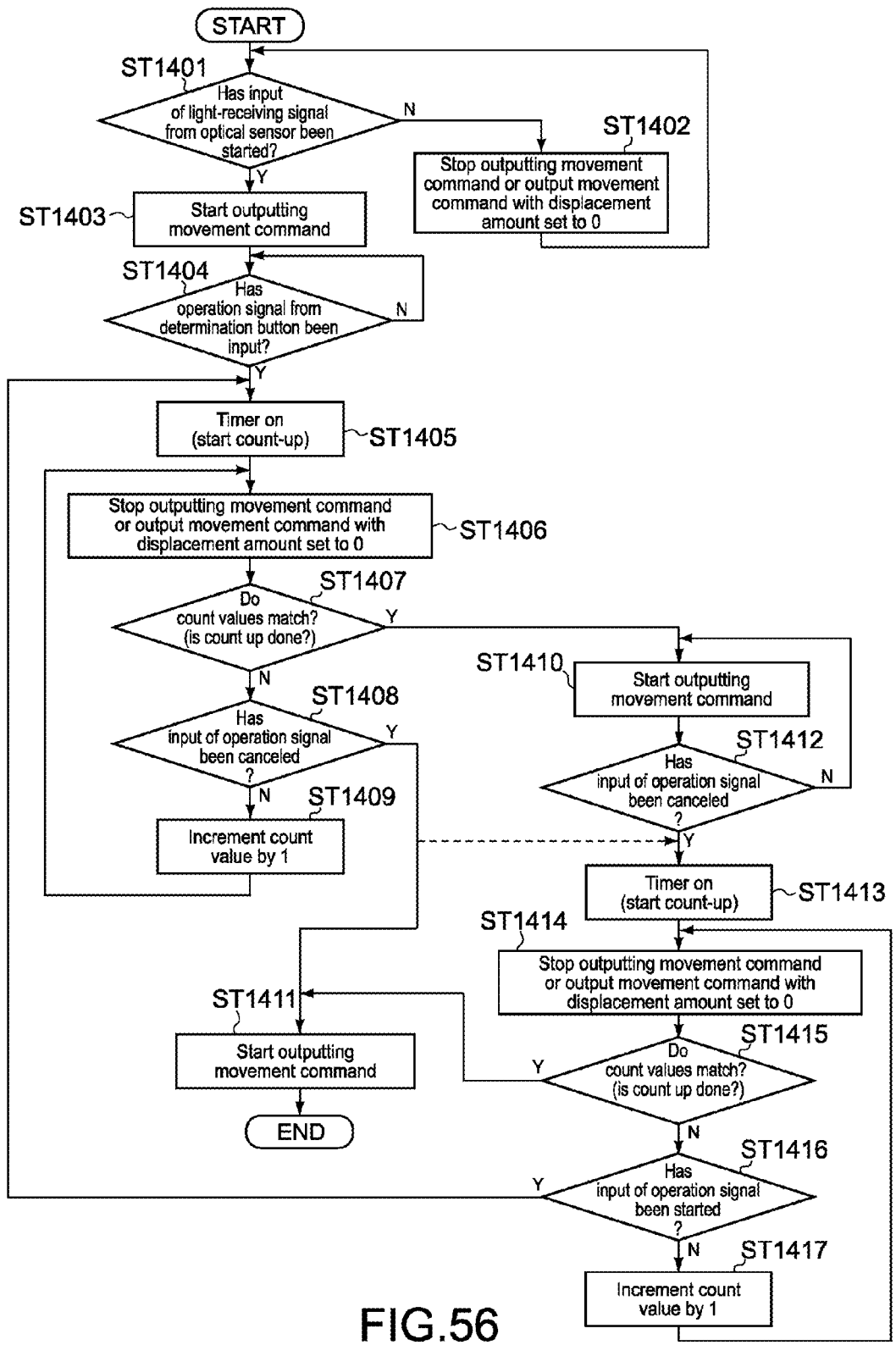
[FIG. 56] A flowchart showing an operation of the input apparatus according to still another embodiment.
Figure 57:
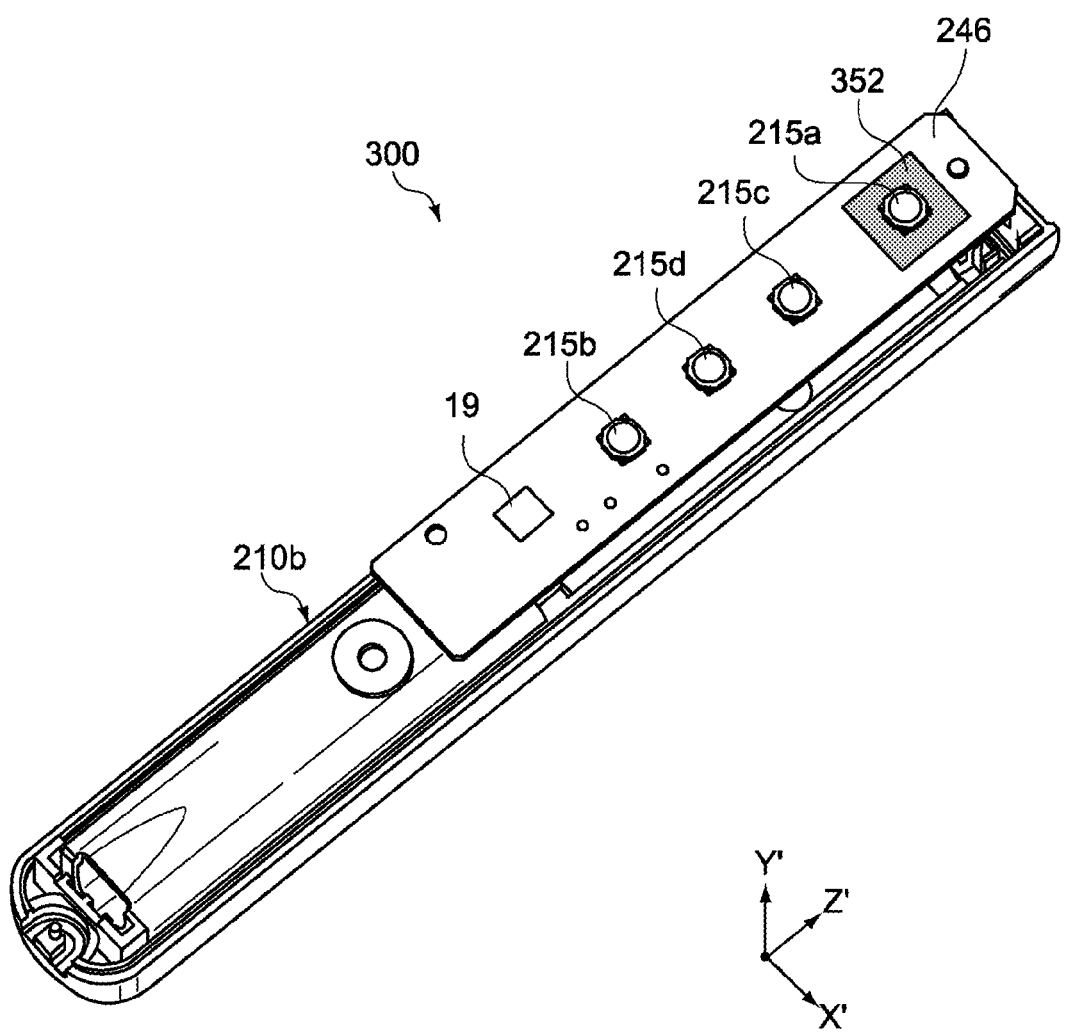
[FIG. 57] A diagram showing, from an upper side, a lower casing and a main substrate of an input apparatus according to still another embodiment.
Figure 58:
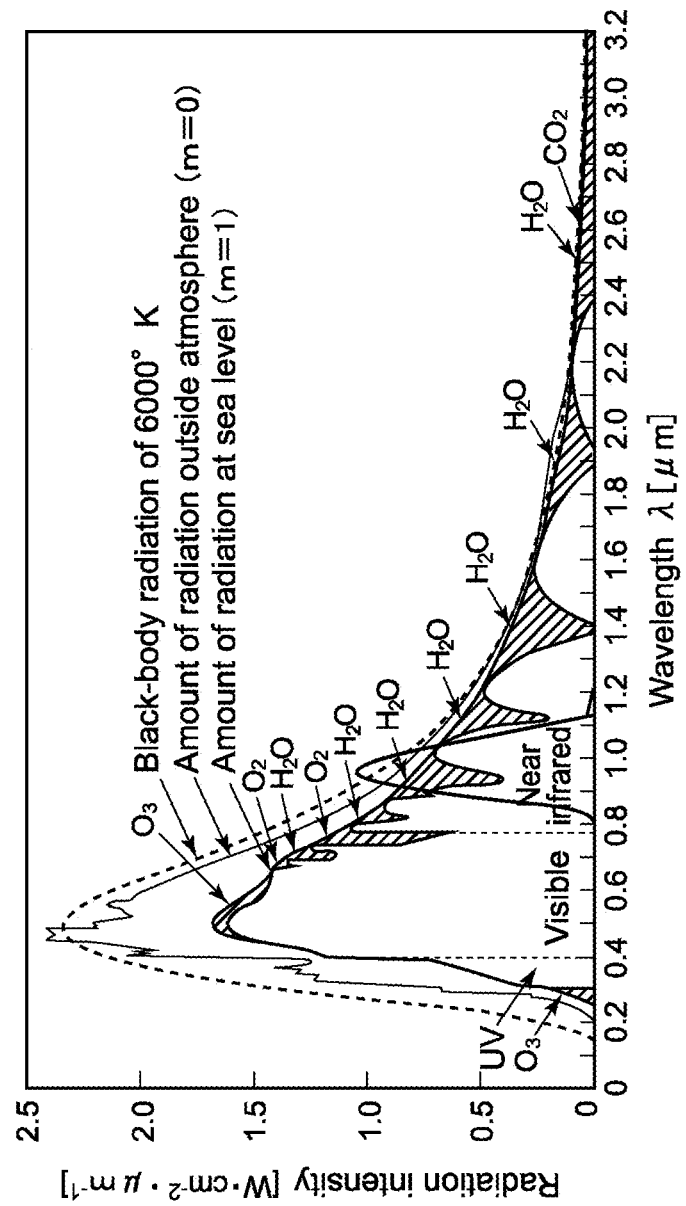
[FIG. 58] A diagram showing a wavelength distribution of sunlight.
Figure 59:
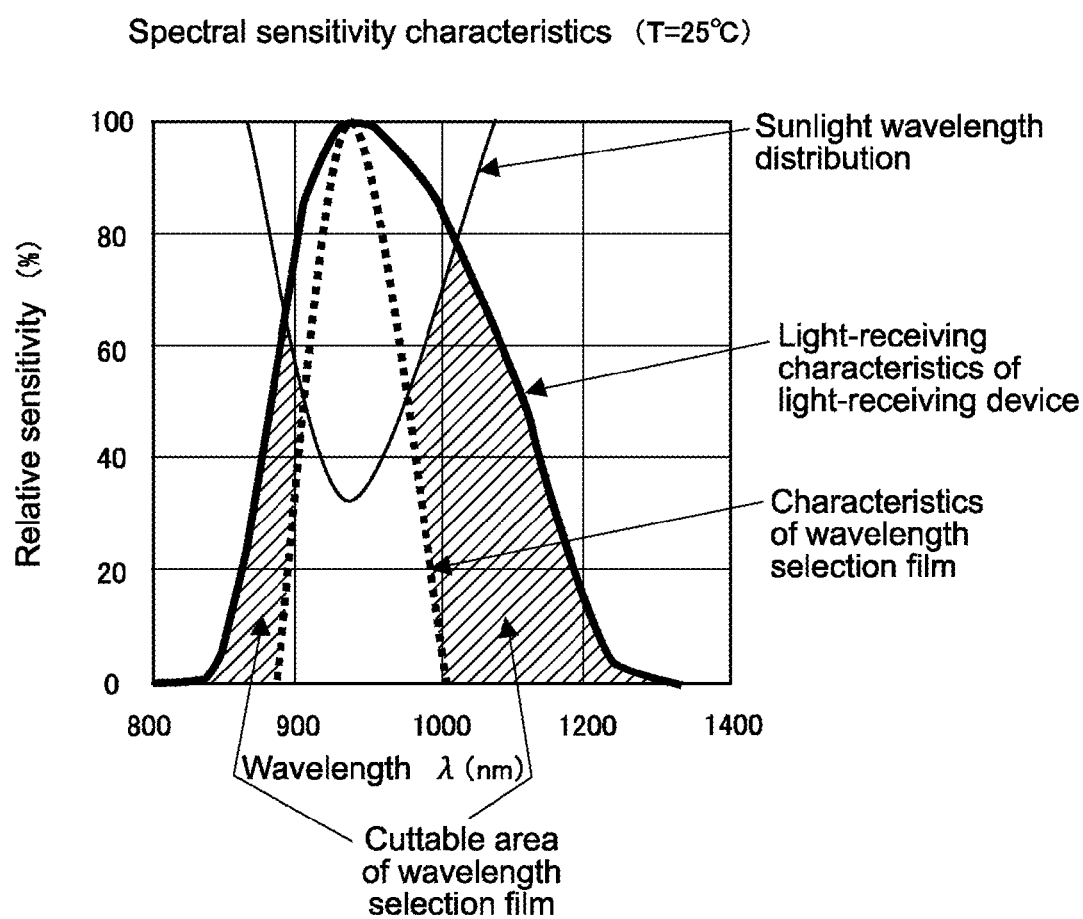
[FIG. 59] A diagram showing a relationship among the wavelength distribution of sunlight, spectral sensitivity characteristics of a light-receiving device, and characteristics of an optical thin film.
Figure 60:
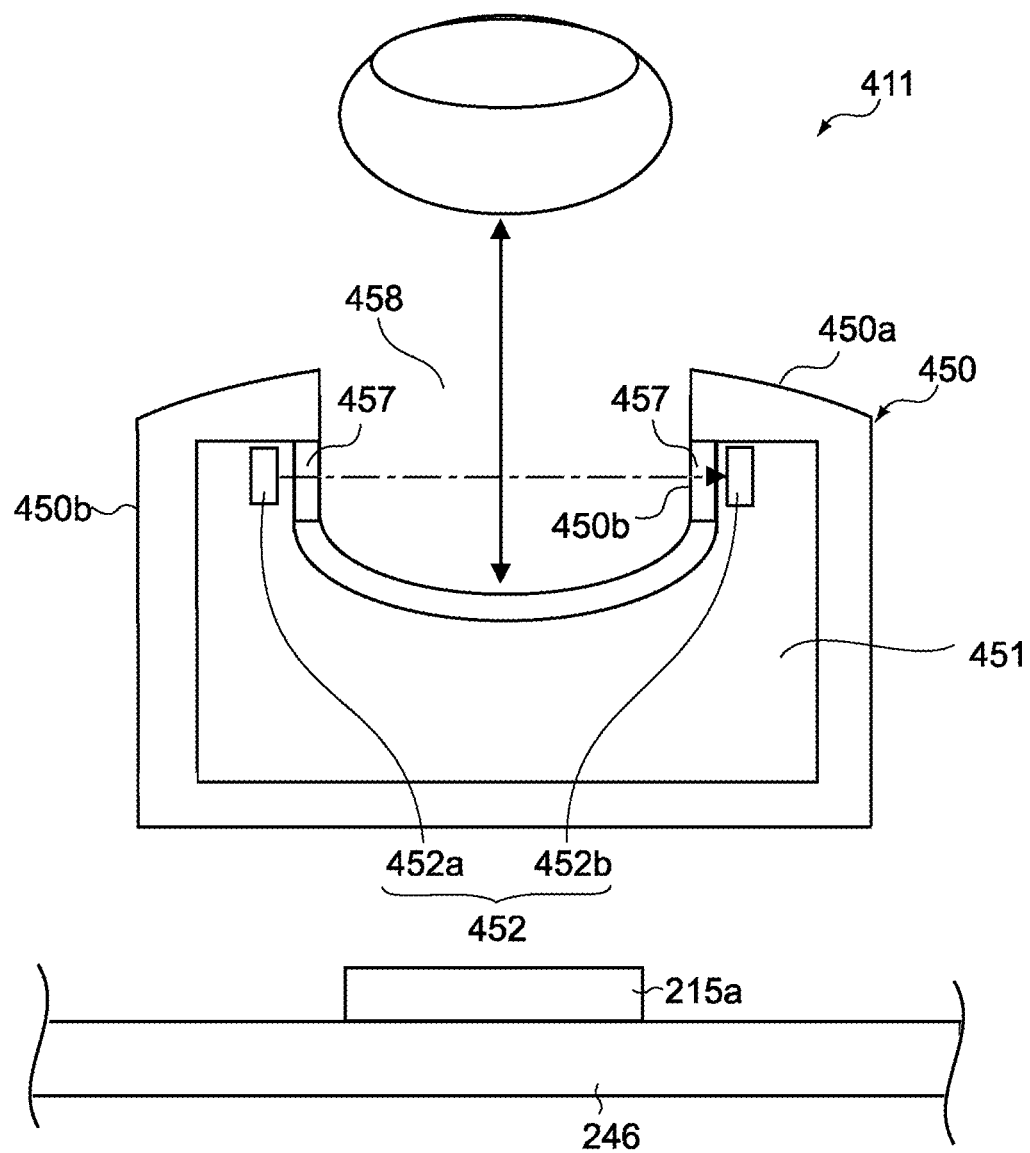
[FIG. 60] A cross-sectional diagram of a determination button of an input apparatus according to still another embodiment.
Figure 61:
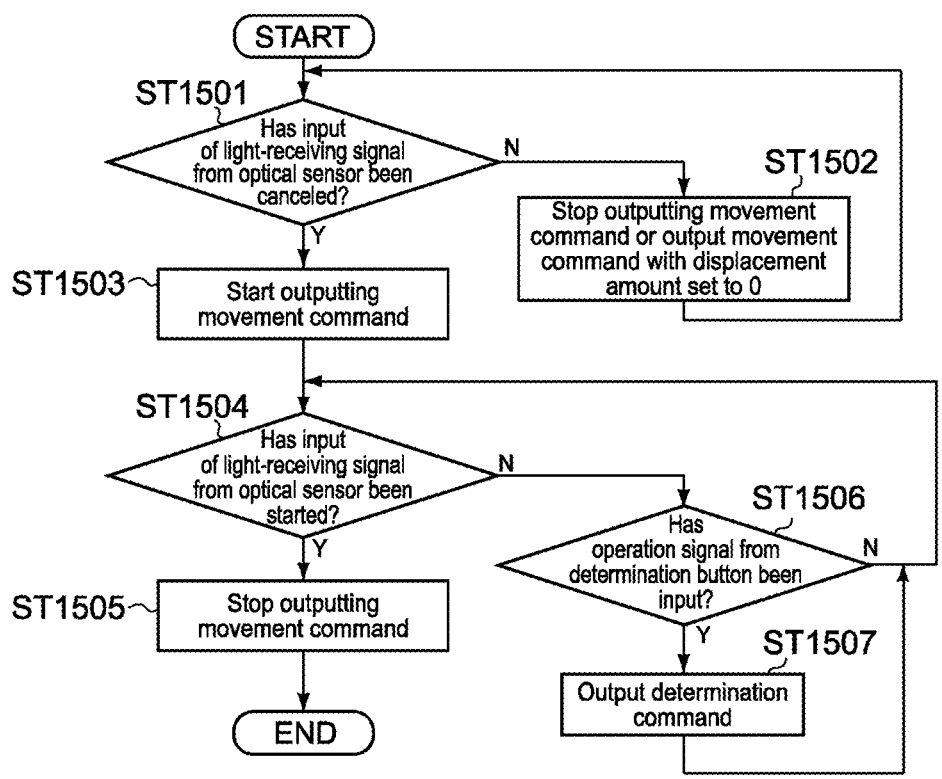
[FIG. 61] A diagram showing an embodiment of an operation of the input apparatus according to still another embodiment.
Figure 62:
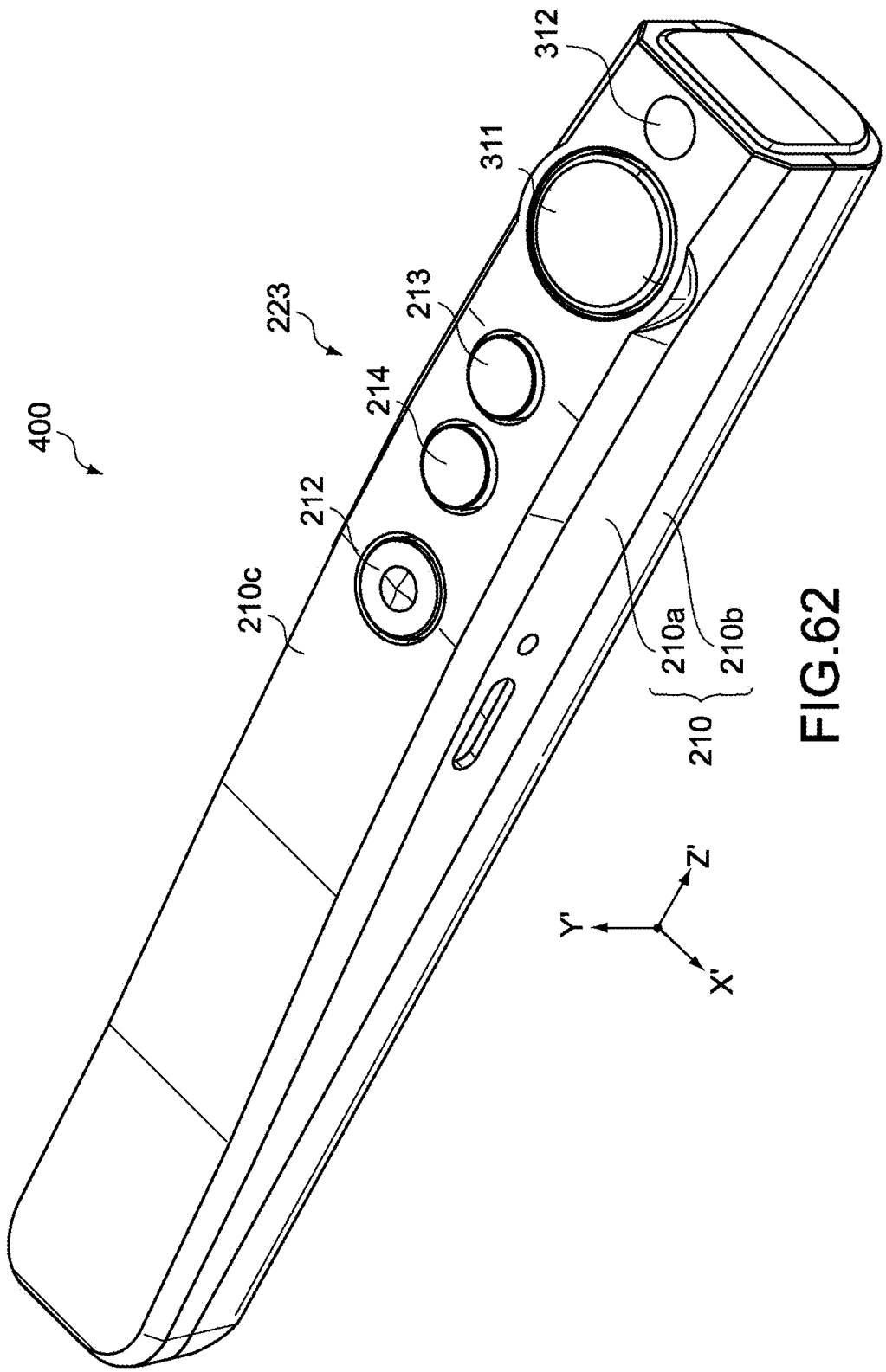
[FIG. 62] A perspective view showing an input apparatus according to yet another embodiment.
Figure 63:
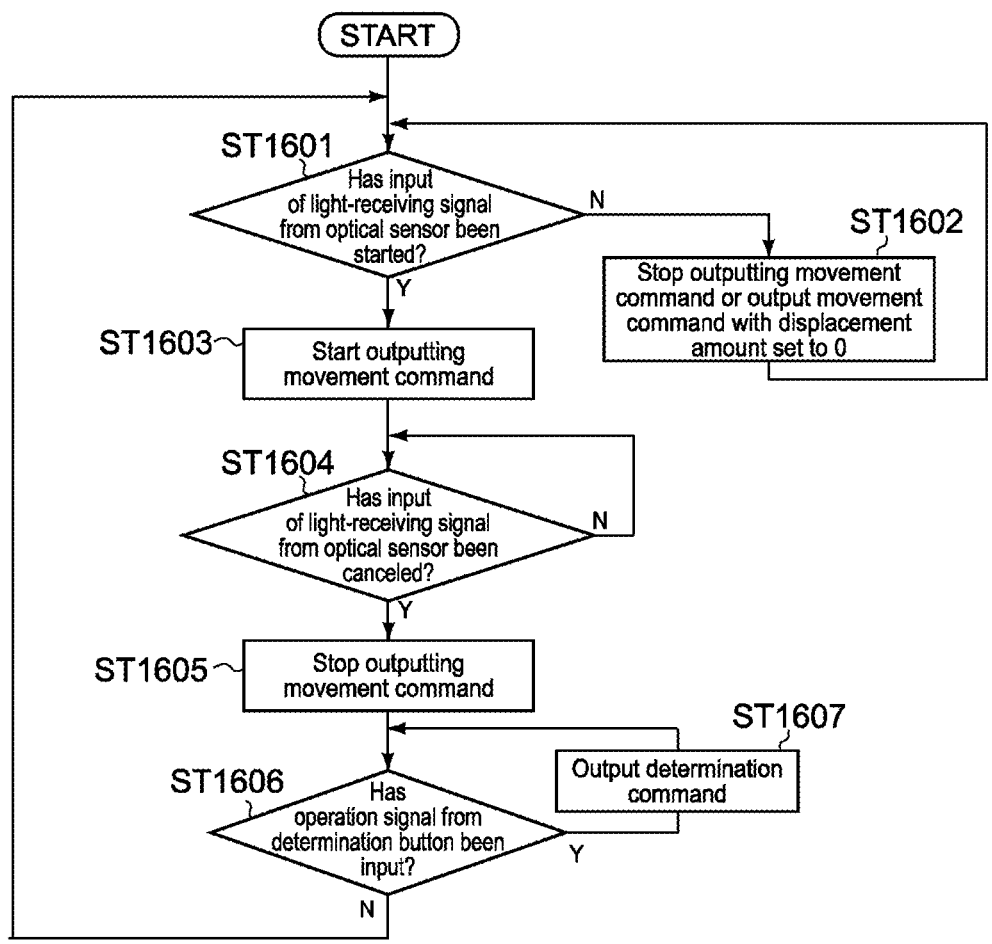
[FIG. 63] A flowchart showing an operation of the input apparatus according to yet another embodiment.
Figure 64:
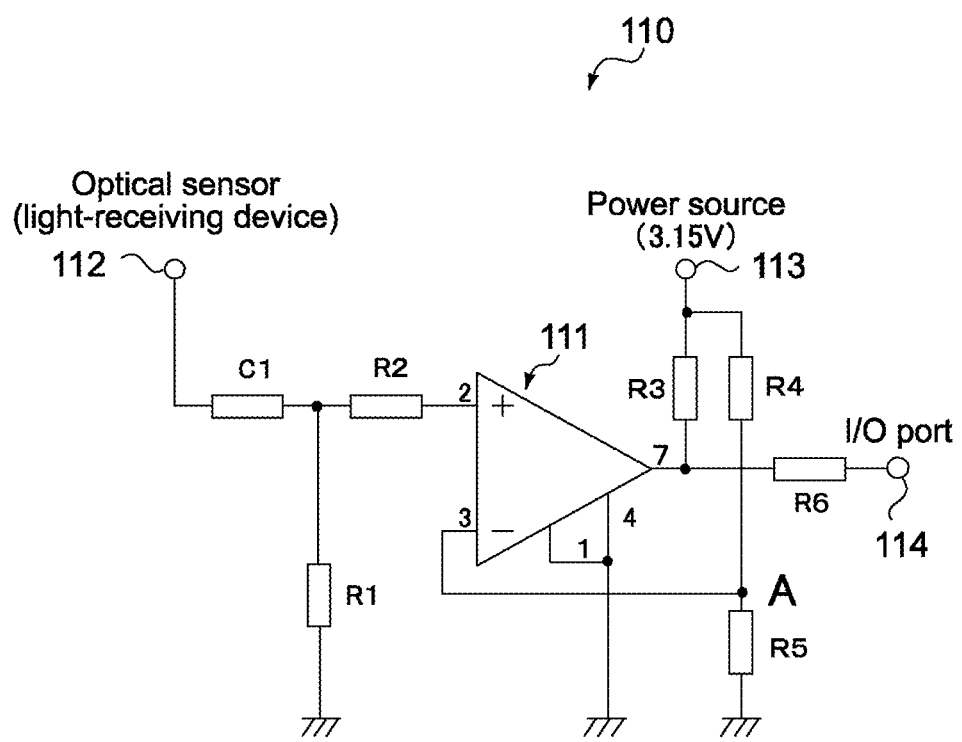
[FIG. 64] A diagram showing a circuit of an input apparatus according to still another embodiment.
Figure 65:
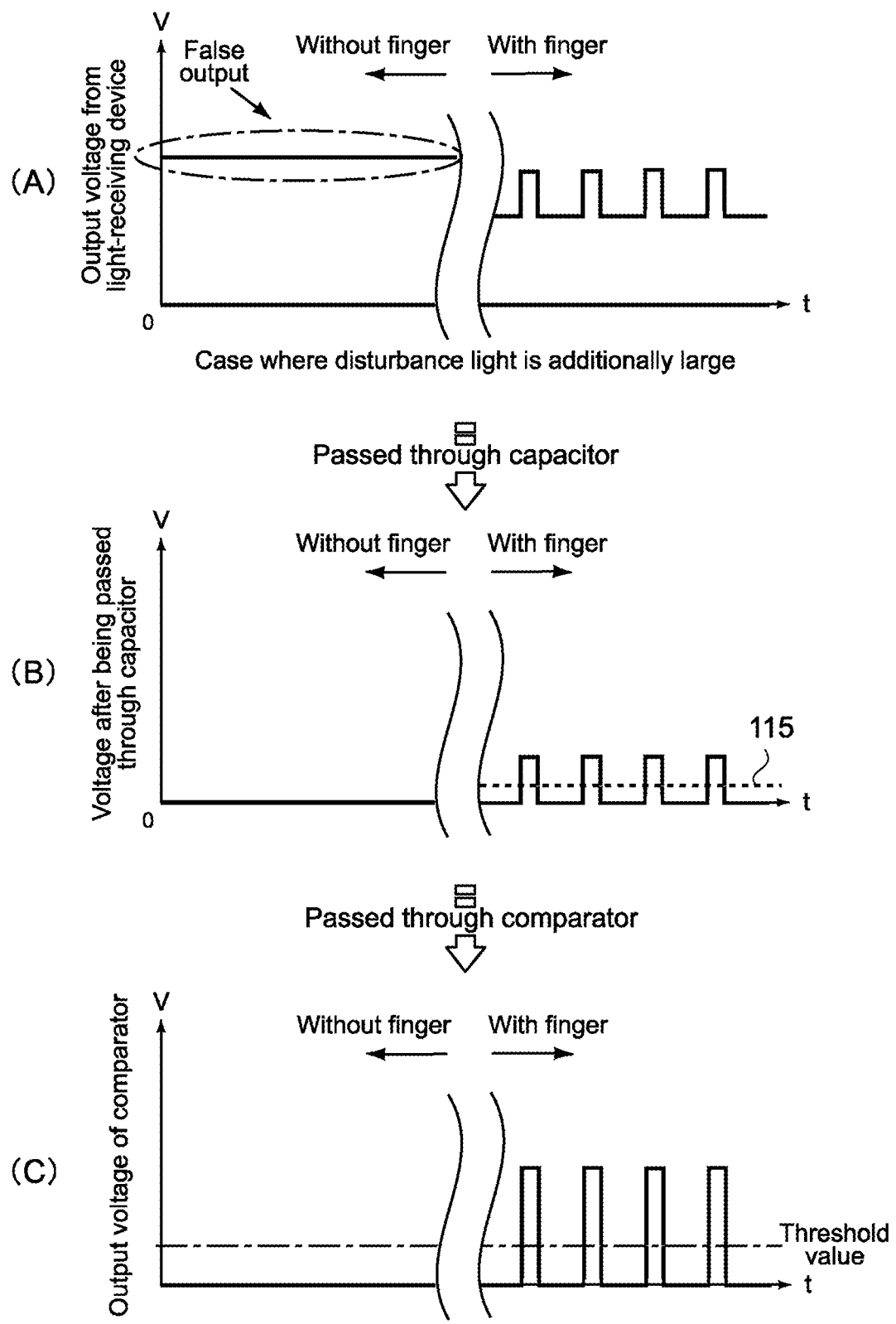
[FIG. 65] Diagrams showing a relationship between an output waveform of the optical sensor at a time disturbance light is strong and a signal whose waveform has been shaped by the circuit shown in FIG. 64.
Figure 66:
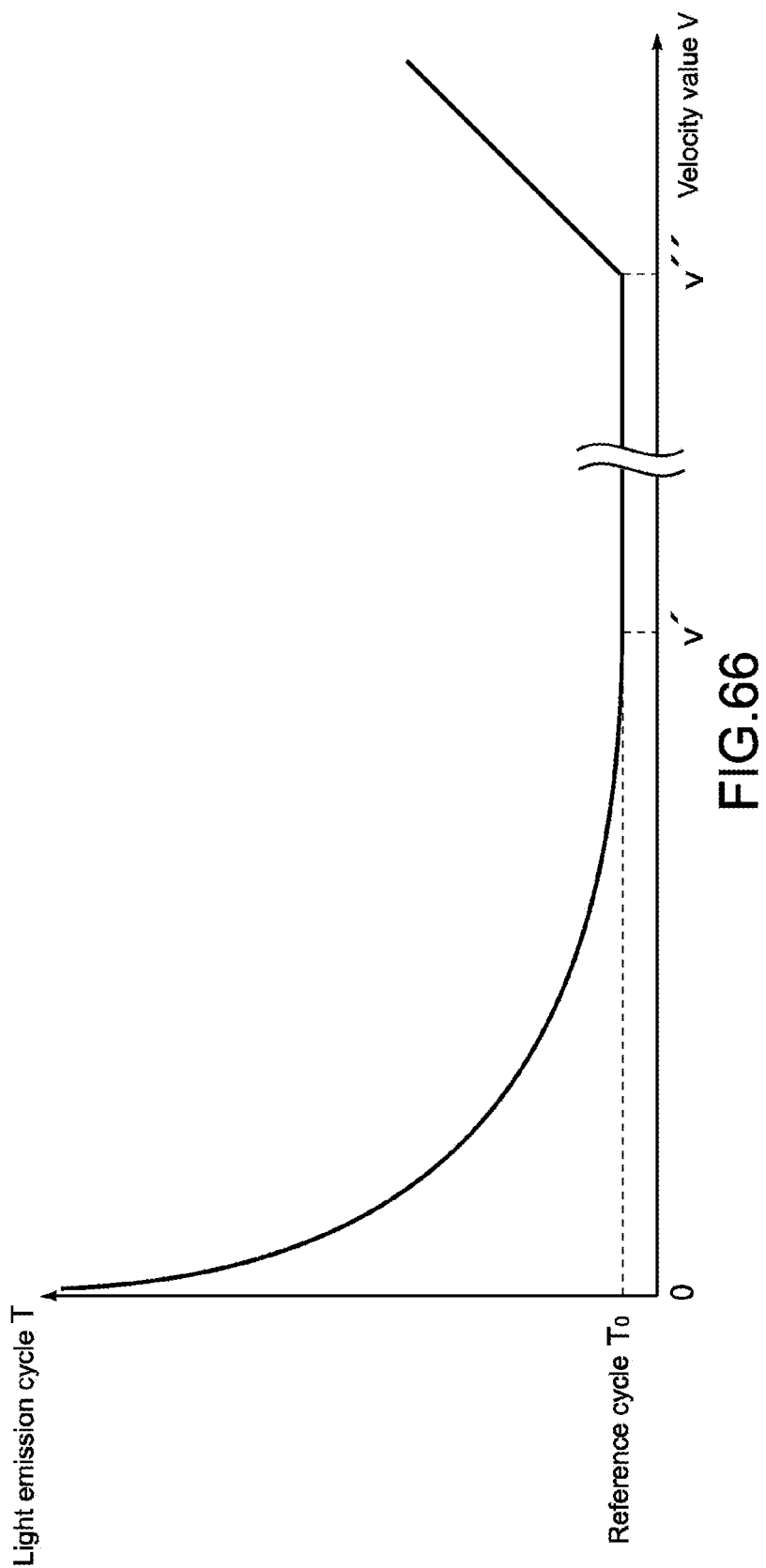
[FIG. 66] A diagram showing an example of a case where the light emission cycle T changes exponentially in accordance with the velocity values.
Figure 67:
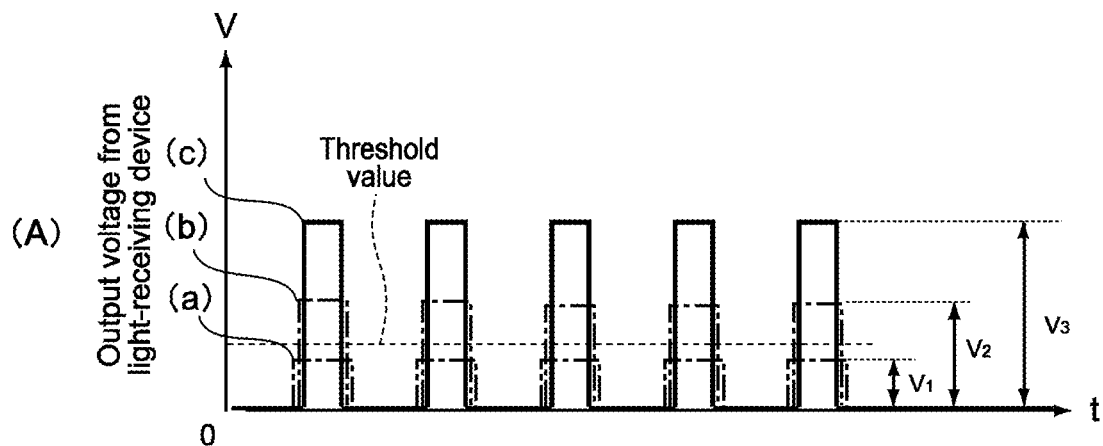
[FIG. 67] Diagrams for illustrating a relationship between a distance from the optical sensor to a finger of a user and an output voltage from the light-receiving device.
Figure 67:
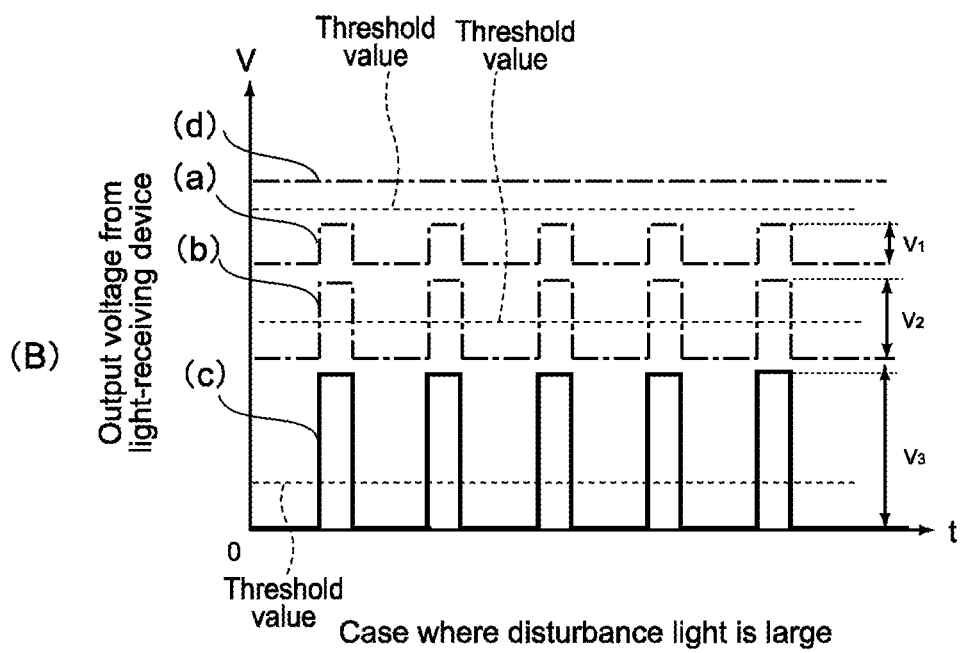
Figure 68:
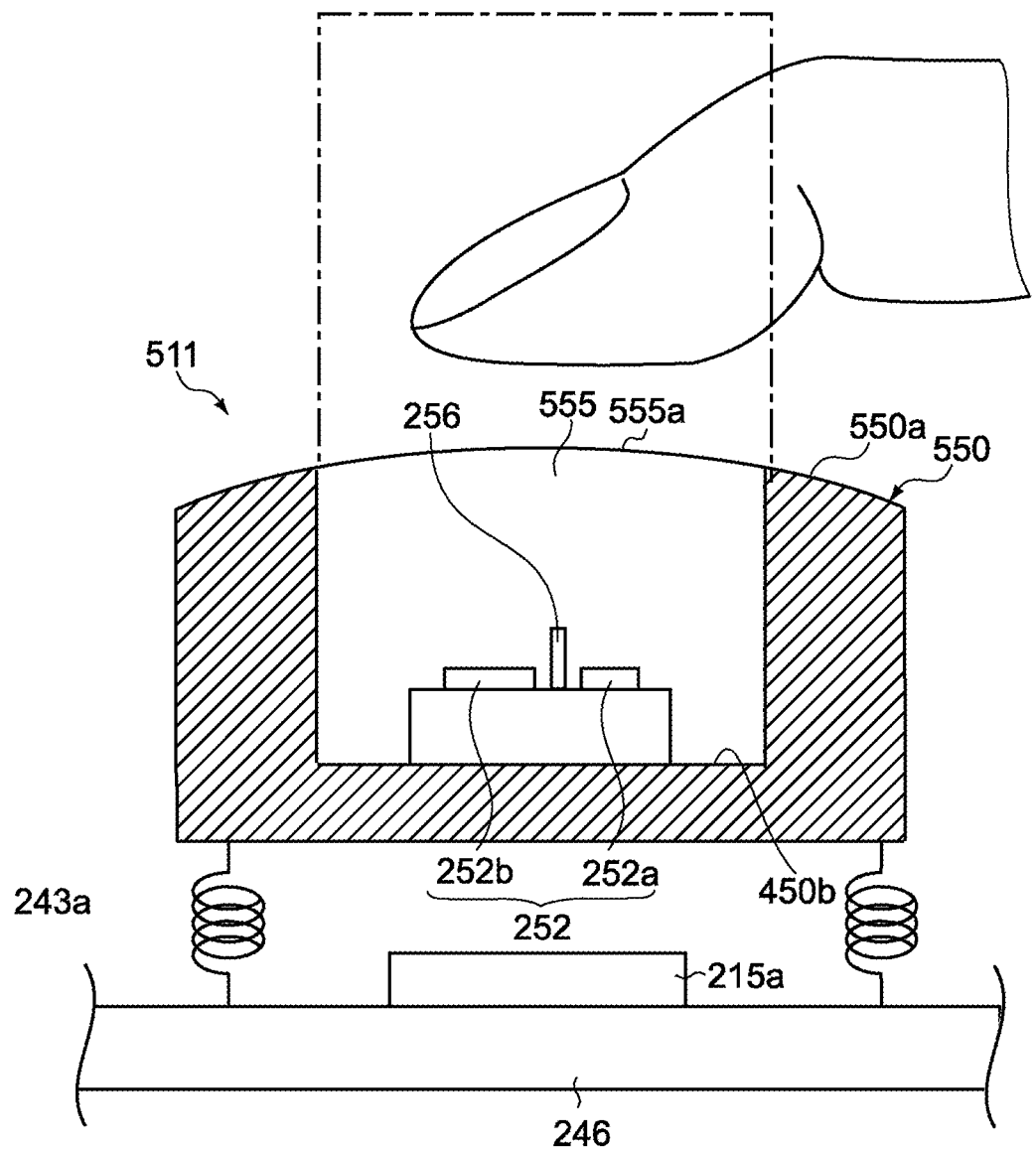
[FIG. 68] A cross-sectional diagram of a determination button of an input apparatus according to another embodiment.
Figure 69:
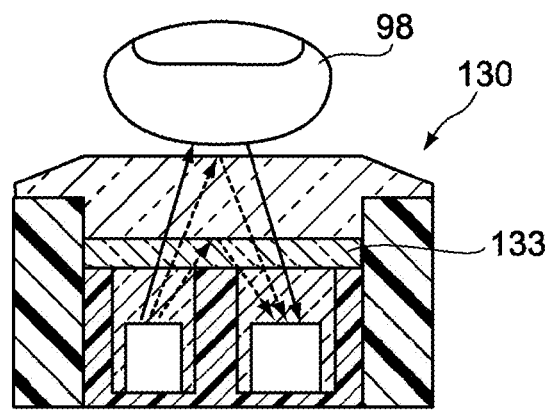
[FIG. 69] A cross-sectional diagram showing a switch module according to an embodiment of the present invention.
Figure 70:
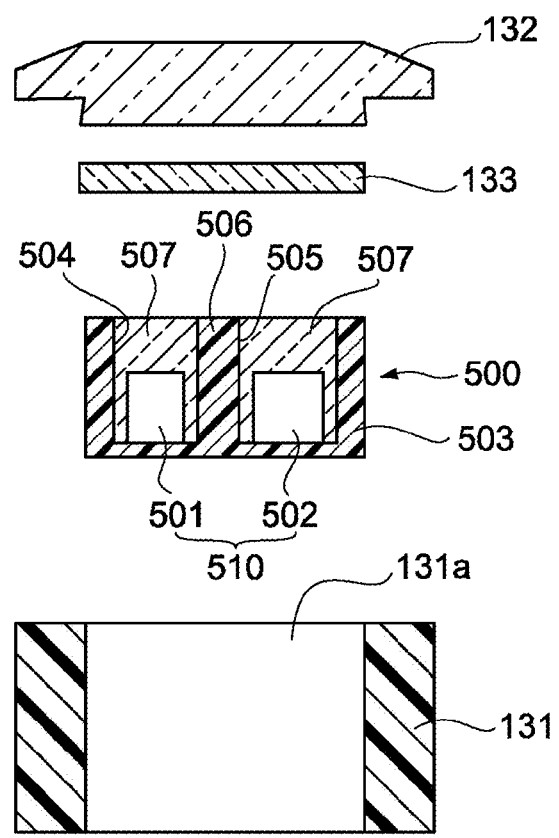
[FIG. 70] An exploded cross-sectional diagram of the switch module shown in FIG. 69.
Figure 71:
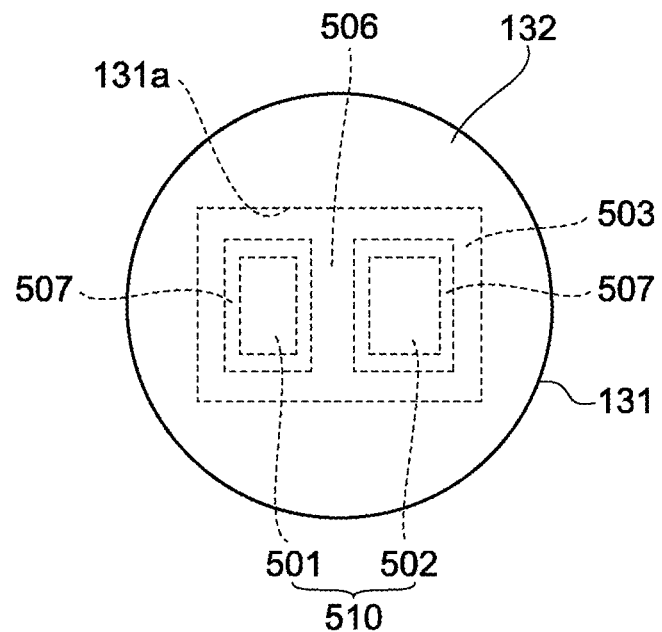
[FIG. 71] A plan view of the switch module shown in FIG. 69.
Figure 72:
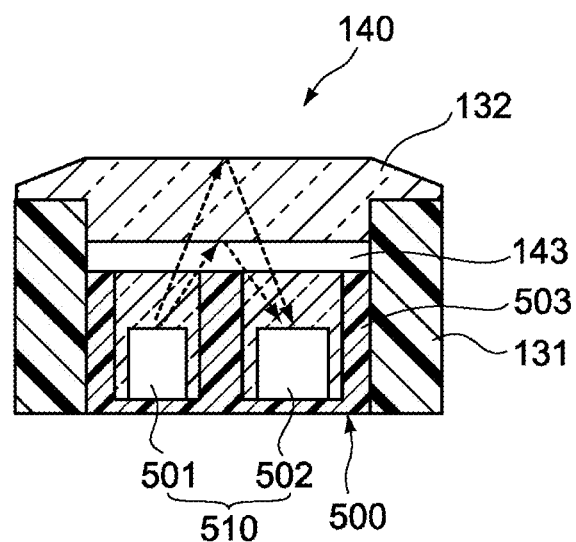
[FIG. 72] A cross-sectional diagram showing a switch module according to another embodiment.
Figure 73:
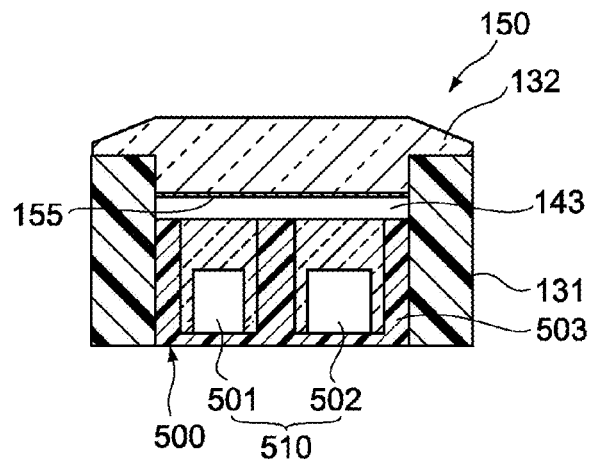
[FIG. 73] A cross-sectional diagram showing a switch module according to still another embodiment.
Figure 74:
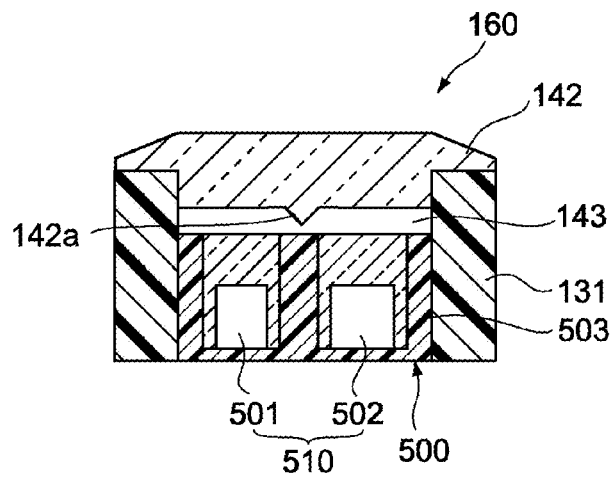
[FIG. 74] A cross-sectional diagram showing a switch module according to still another embodiment.
Figure 75:
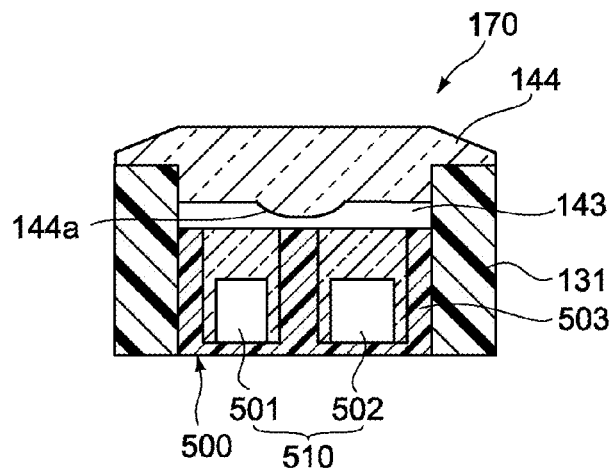
[FIG. 75] A cross-sectional diagram showing a switch module according to still another embodiment.
Figure 76:
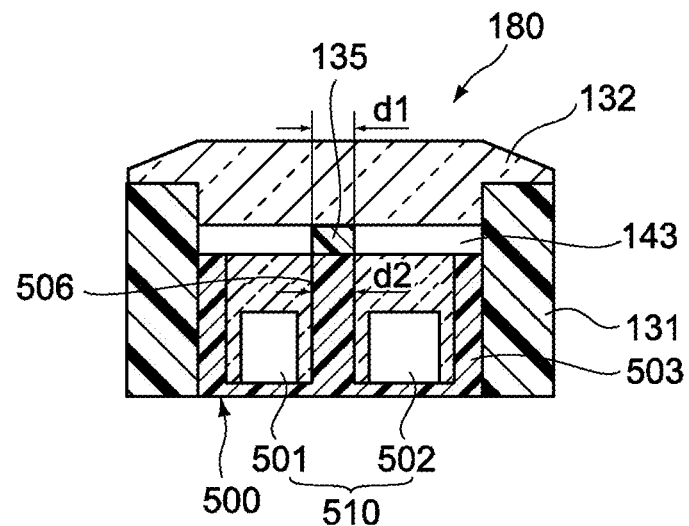
[FIG. 76] A cross-sectional diagram showing a switch module according to still another embodiment.
Figure 77:
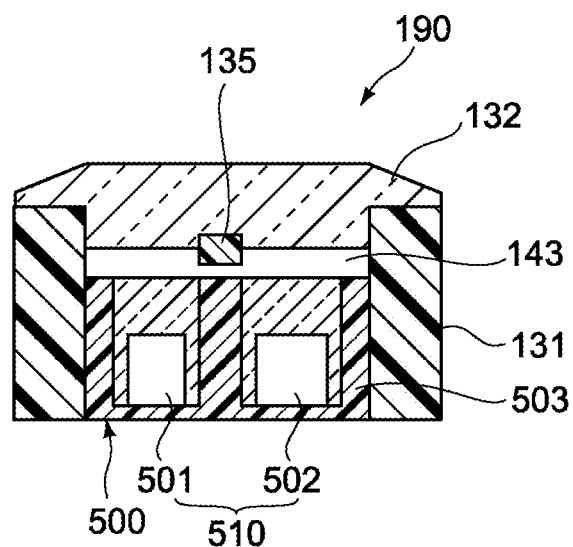
[FIG. 77] A cross-sectional diagram showing a switch module according to still another embodiment.
Figure 78:
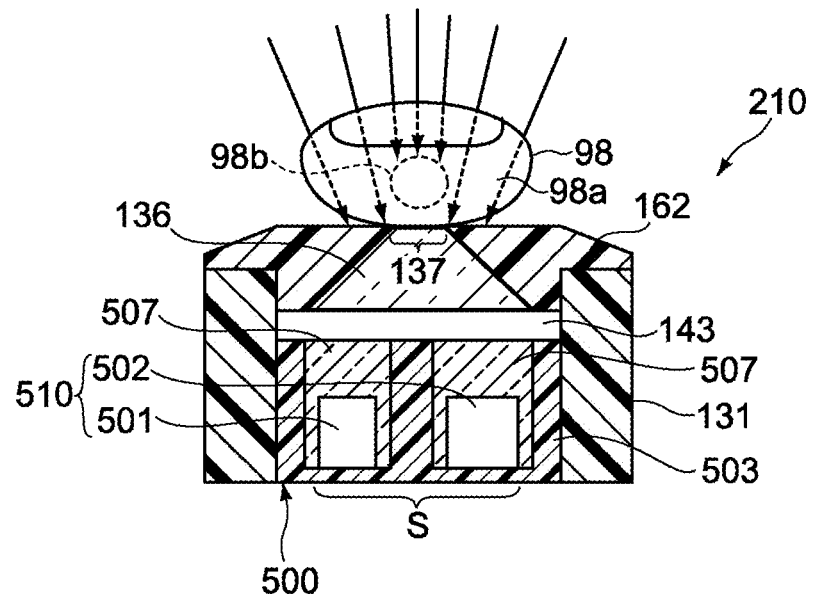
[FIG. 78] A cross-sectional diagram showing a switch module according to still another embodiment.
Figure 79:
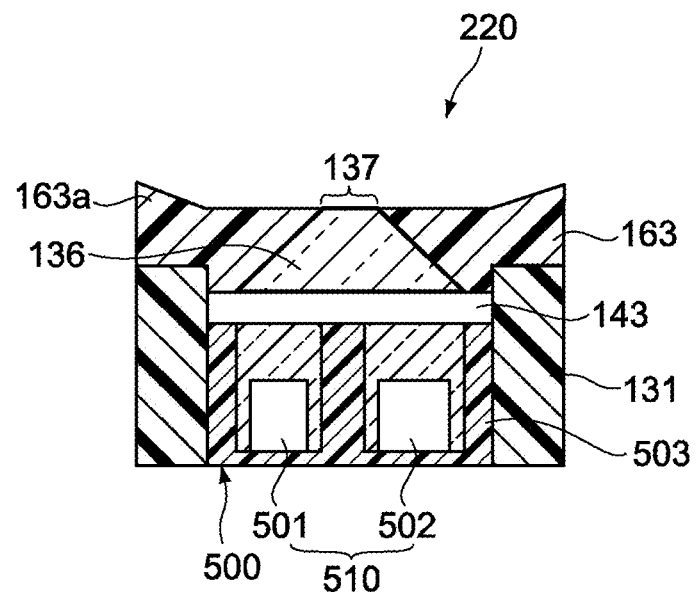
[FIG. 79] A cross-sectional diagram showing a switch module according to still another embodiment.
Figure 80:
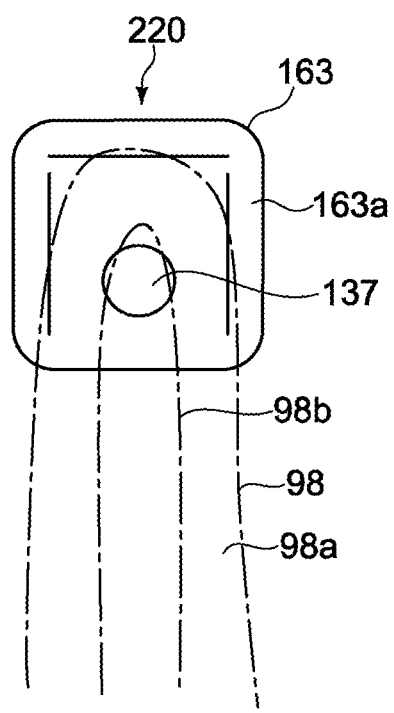
[FIG. 80] A plan view of the switch module shown in FIG. 79.

DESCRIPTION OF SYMBOLS 1, 51, 61, 71, 81, 91, 200, 300, 400 input apparatus
2 pointer
3 screen
6 surface button
7 movement button
8, 211, 311, 411, 511 determination button
11 operation button
10, 50, 60, 70, 80, 90, 210 casing
15 angular velocity sensor unit
16 acceleration sensor unit
19 MPU
20 crystal oscillator
21 transmitting device
22 antenna
23, 95, 223 operation section
40 control apparatus
54, 154 connecting wire
58A, 59A, 58B, 58C terminal
97 push button
100 control system
110 circuit
130, 140, 150, 160, 170, 180, 190, 210, 220 switch module
133, 135 elastic member
143 space
151 first angular velocity sensor
152 second angular velocity sensor
161 first acceleration sensor
162 second acceleration sensor
215a, 215b, 215c, 215d switch
252 reflection-type optical sensor
252a light-emitting device
252b light-receiving device
256 light shield plate
352 capacitance sensor
452 transmission-type optical sensor
500 sensor module body

The invention claimed is:

1. An input apparatus controlling a movement of a pointer on a screen, comprising:
a casing;
a sensor to detect a movement of the casing in space and output a detection signal corresponding to the movement of the casing;
a movement command output means for outputting a movement command that corresponds to a displacement amount of the pointer on the screen based on the detection signal;
a first switch capable of being switched in accordance with a first operational input to the input apparatus;
a second switch capable of being switched in accordance with a second operational input to the input apparatus;
a determination command output means that outputs, while the first operation input is being received, a determination command corresponding to the second operation input provided by the second switch;
a first timer to begin counting for a first time period when the first switch is switched and stop counting when the second switch is switched;
a second timer to begin counting for a second time period when the second switch is switched; and
an output control means for controlling the output of the movement command so that the movement command is outputted:
(i) before the first switch is switched,
(ii) after the first switch is switched and the first timer has reached an end of the first time period, and
(iii) after the first and second switches are switched and the second timer has reached an end of the second time period.

2. The input apparatus according to claim 1,
wherein the output control means controls the output of the movement command so that, when a first operation input from the first switch is input, the pointer can be moved or the movement of the pointer can be stopped.

3. The input apparatus according to claim 1, further comprising
an operation section that includes a two-step action for successively inputting the first operation input and the second operation input.

4. The input apparatus according to claim 1, further comprising
a movement command control means for controlling the movement command output means to stop outputting the movement command or output the movement command with the displacement amount set to 0 during the first time period.

5. The input apparatus according to claim 4,
wherein the movement command control means controls, when the input of the second operation input from the second switch is canceled within the first time period since the input of the second operation input, the movement command output means to stop outputting the movement command or output the movement command with the displacement amount set to 0 during a second time period since the cancel of the input of the second operation input.

6. The input apparatus according to claim 4,
wherein the output control means controls the movement command output means to start outputting the movement command after an elapse of a third time period since the input of the first operation input for moving the pointer.

7. A control method, comprising:
detecting a movement of a casing of an input apparatus in space and outputting a detection signal corresponding to the movement of the casing;
outputting a movement command that corresponds to a displacement amount of a pointer on a screen based on the detection signal;
controlling the output of the movement command in accordance with a switch by a first switch based on a first operational input to the input apparatus and a second switch based on a second operational input to the input apparatus, the first switch and the second switch being provided in the input apparatus;

counting for a first time period starting when a switch by a first switch occurs and stop counting when the second switch is switched;

counting for a second time period starting when a switch by the switch occurs;

controlling a display position of the pointer on the screen based on the movement command; and controlling a movement of the pointer and a stop of the movement of the pointer based on the control of the output of the movement command, wherein the movement command is output:
- (i) before the first switch is switched,
- (ii) after the first switch is switched and the first timer has reached an end of the first time period, and
- (iii) after the first and second switches are switched and the second timer has reached an end of the second time period.

8. The control method of claim 7, wherein the controlling the movement of the pointer and the stop of the movement of the pointer enables a double-click operation of the pointer on the screen to be performed without the pointer moving on the screen during the first or second time period.

9. The control method of claim 8, wherein the controlling the movement of the pointer and the stop of the movement of the pointer enables a drag operation of the pointer on the screen to be performed.

10. The control method of claim 7, wherein controlling the movement of the pointer is to resume after an expiration of the first or the second time period.

\* \* \* \* \*